US006712984B2

(12) United States Patent
Sasaki

(10) Patent No.: US 6,712,984 B2
(45) Date of Patent: Mar. 30, 2004

(54) METHOD OF MANUFACTURING THIN FILM MAGNETIC HEAD

(75) Inventor: Yoshitaka Sasaki, Tokyo (JP)

(73) Assignee: TDK Corporation, Tokyo (JP)

( * ) Notice: Subject to any disclaimer, the term of this patent is extended or adjusted under 35 U.S.C. 154(b) by 217 days.

(21) Appl. No.: 09/812,553

(22) Filed: Mar. 21, 2001

(65) Prior Publication Data

US 2001/0028917 A1 Oct. 11, 2001

(30) Foreign Application Priority Data

Mar. 22, 2000 (JP) .................................... 2000-084756

(51) Int. Cl.[7] .................... B44C 1/22; G11B 5/127; H04R 31/00
(52) U.S. Cl. ................... 216/22; 29/603.07; 29/603.12; 29/603.13; 29/603.15; 29/603.16
(58) Field of Search ..................... 216/22; 360/121, 360/123, 125, 126, 317, 319; 438/3; 29/603.07, 603.12, 603.13, 603.15, 603.16

(56) References Cited

U.S. PATENT DOCUMENTS

| | | | | |
|---|---|---|---|---|
| 4,791,719 A | * | 12/1988 | Kobayashi et al. | 29/603.14 |
| 6,072,671 A | * | 6/2000 | Gill | 360/126 |
| 6,130,805 A | * | 10/2000 | Sasaki et al. | 360/126 |
| 6,183,656 B1 | * | 2/2001 | Ide et al. | 216/85 |
| 6,303,392 B1 | * | 10/2001 | Matsukuma | 438/3 |
| 6,329,211 B1 | * | 12/2001 | Terunuma et al. | 438/3 |

FOREIGN PATENT DOCUMENTS

| JP | 11-312303 | * 11/1999 | ............ G11B/5/31 |
|---|---|---|---|

* cited by examiner

Primary Examiner—Gregory Mills
Assistant Examiner—Roberts Culbert
(74) Attorney, Agent, or Firm—Oliff & Berridge PLC

(57) ABSTRACT

Disclosed is a method of manufacturing a thin film magnetic head, which enables a magnetic pole portion to be formed with high precision in a short time. After forming a mask precursor pattern by patterning an alumina layer, the mask precursor pattern is subjected to an etching process of ion milling, thereby forming a first mask. The width of a portion in the first mask is narrower than the width of the minimum pattern which can be formed by a photolithography process. Consequently, by performing the etching process, the width of the portion of the first mask can be narrowed.

46 Claims, 35 Drawing Sheets

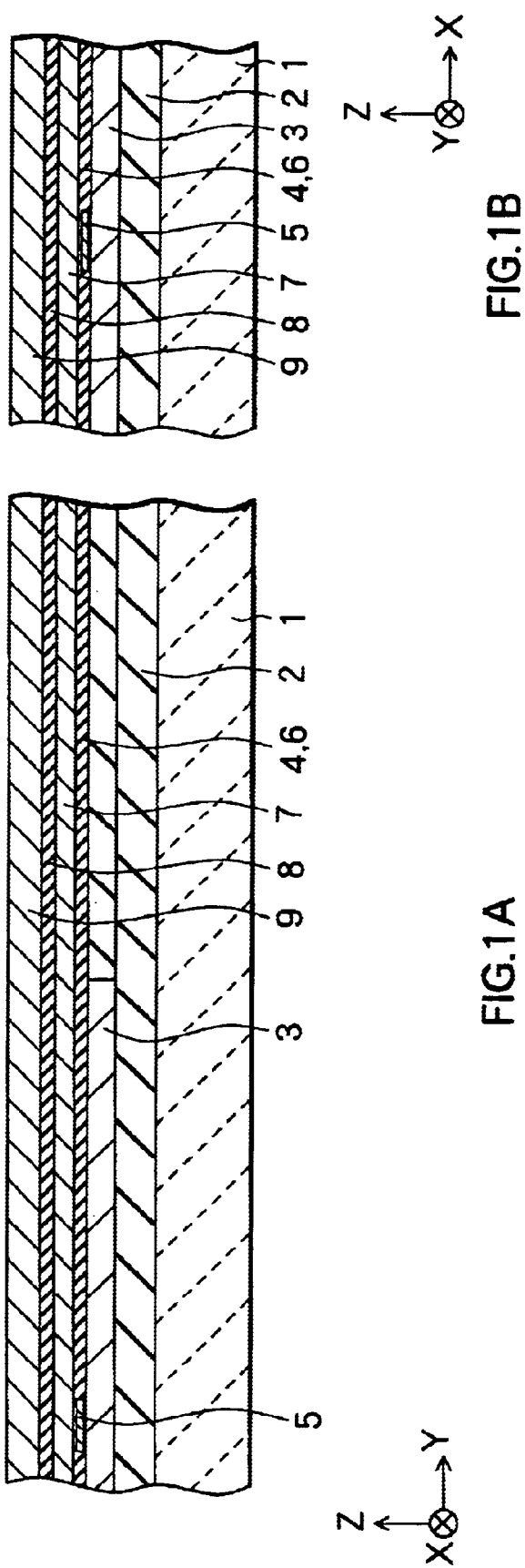

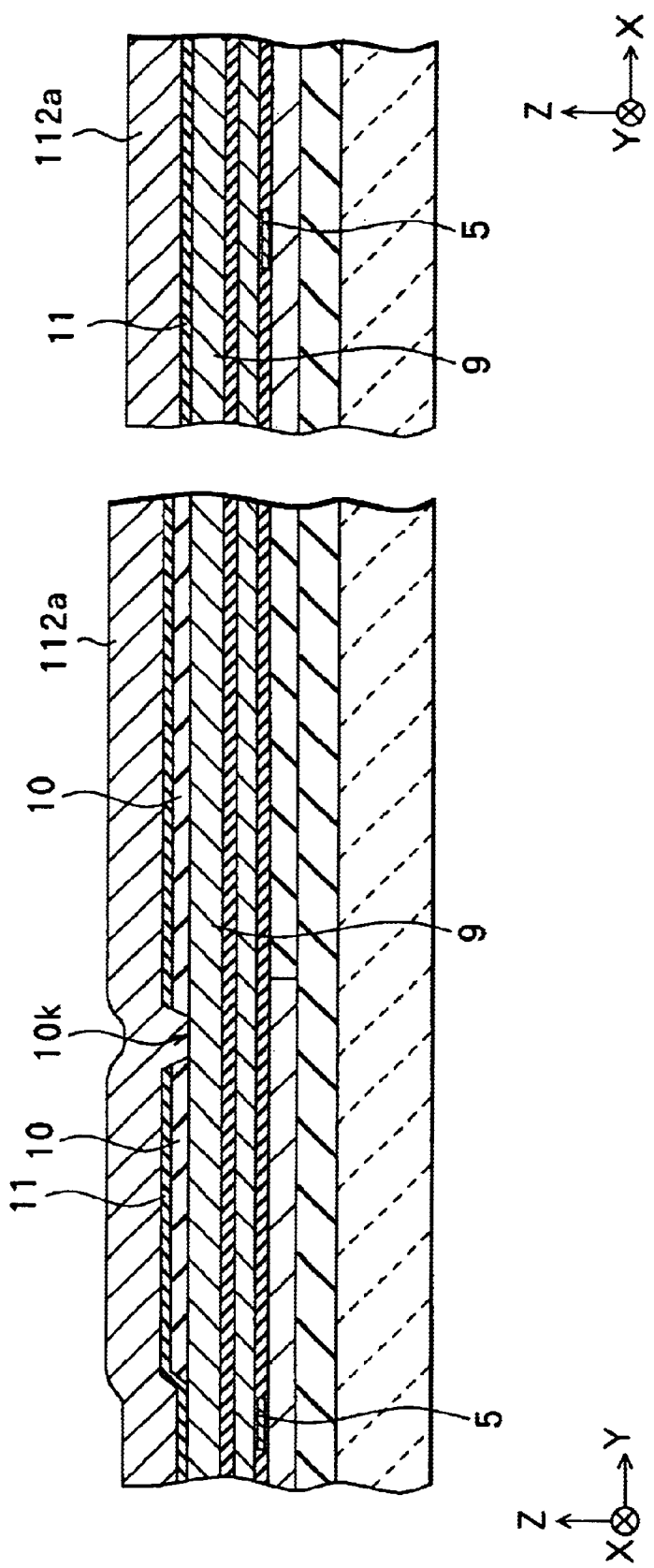

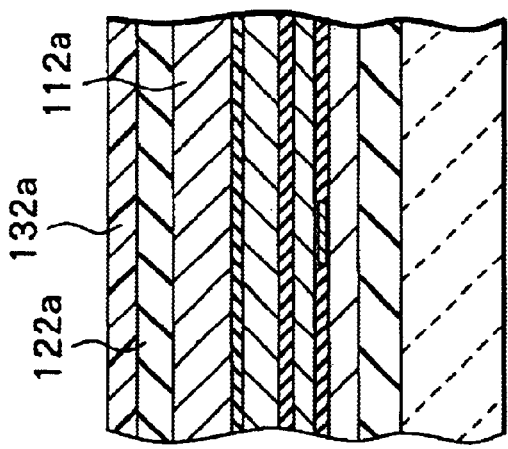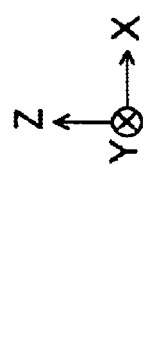
FIG.3B
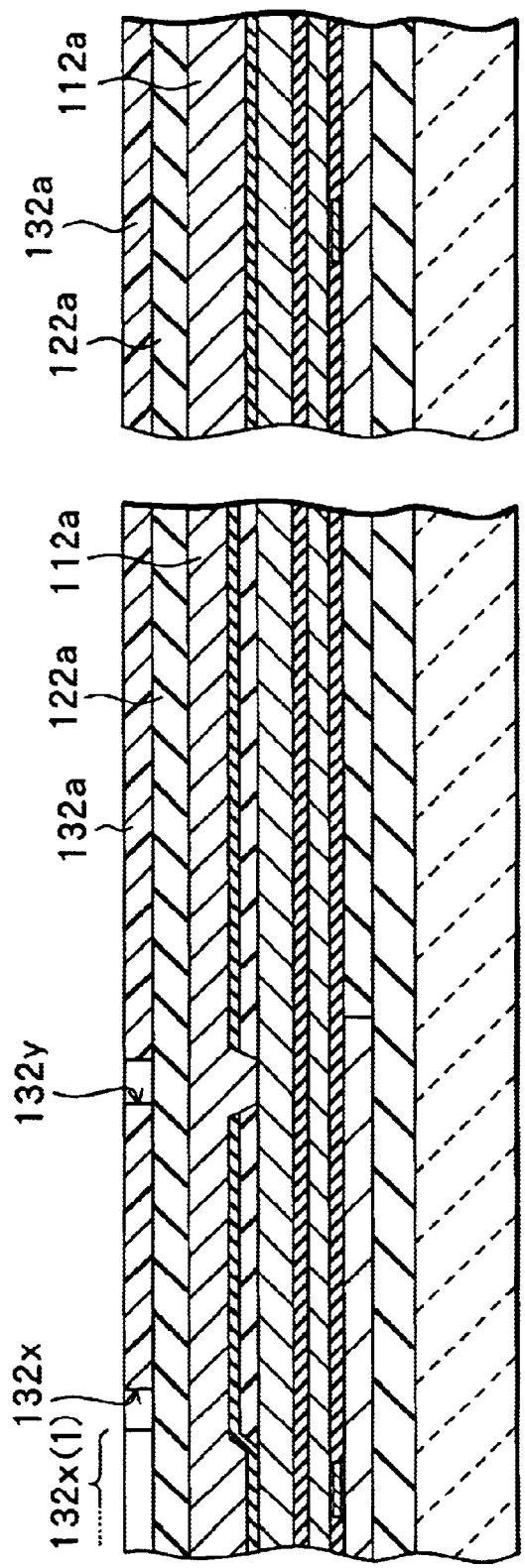
FIG.3A

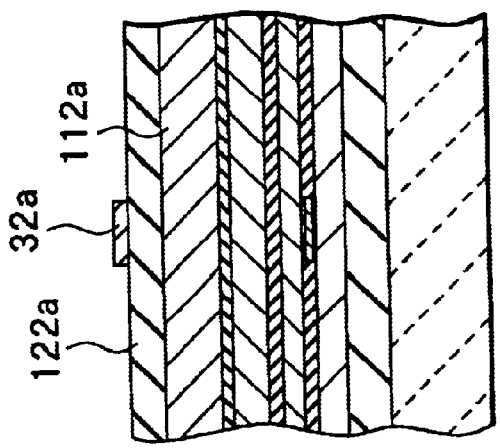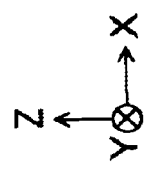
FIG.4B
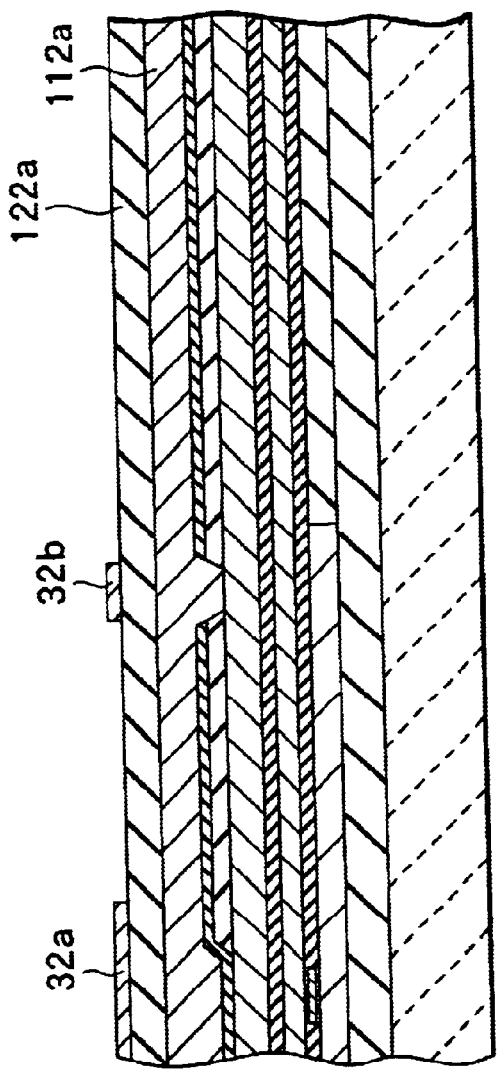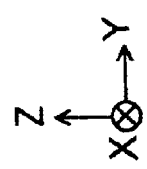
FIG.4A

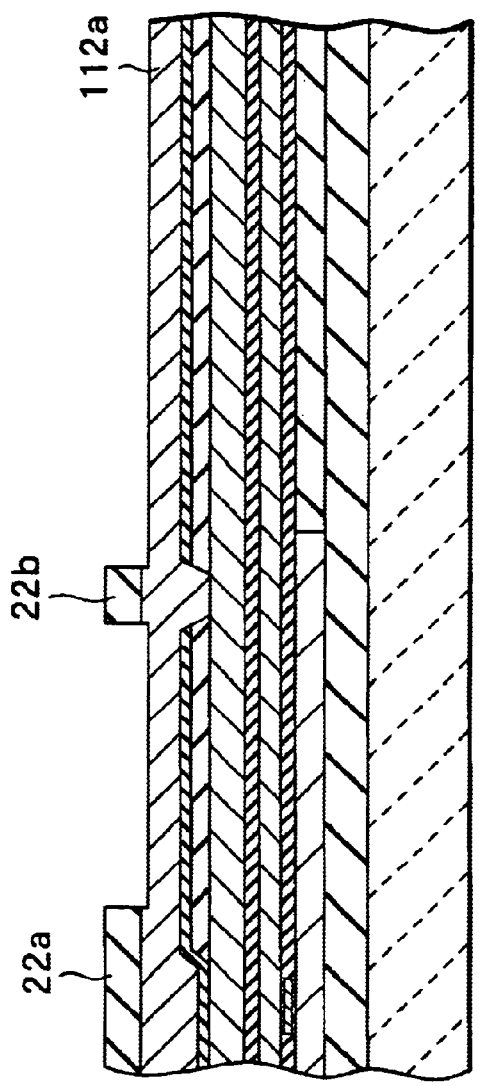
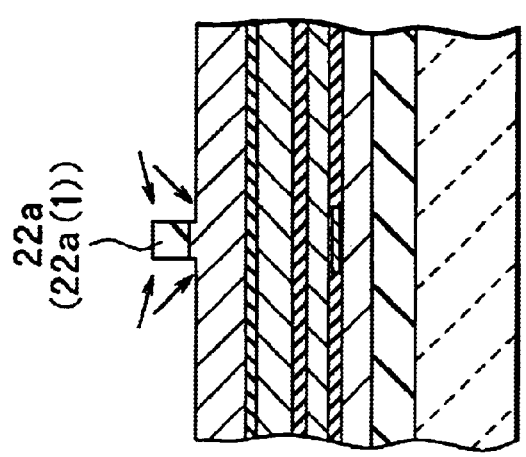
FIG.6A
FIG.6B

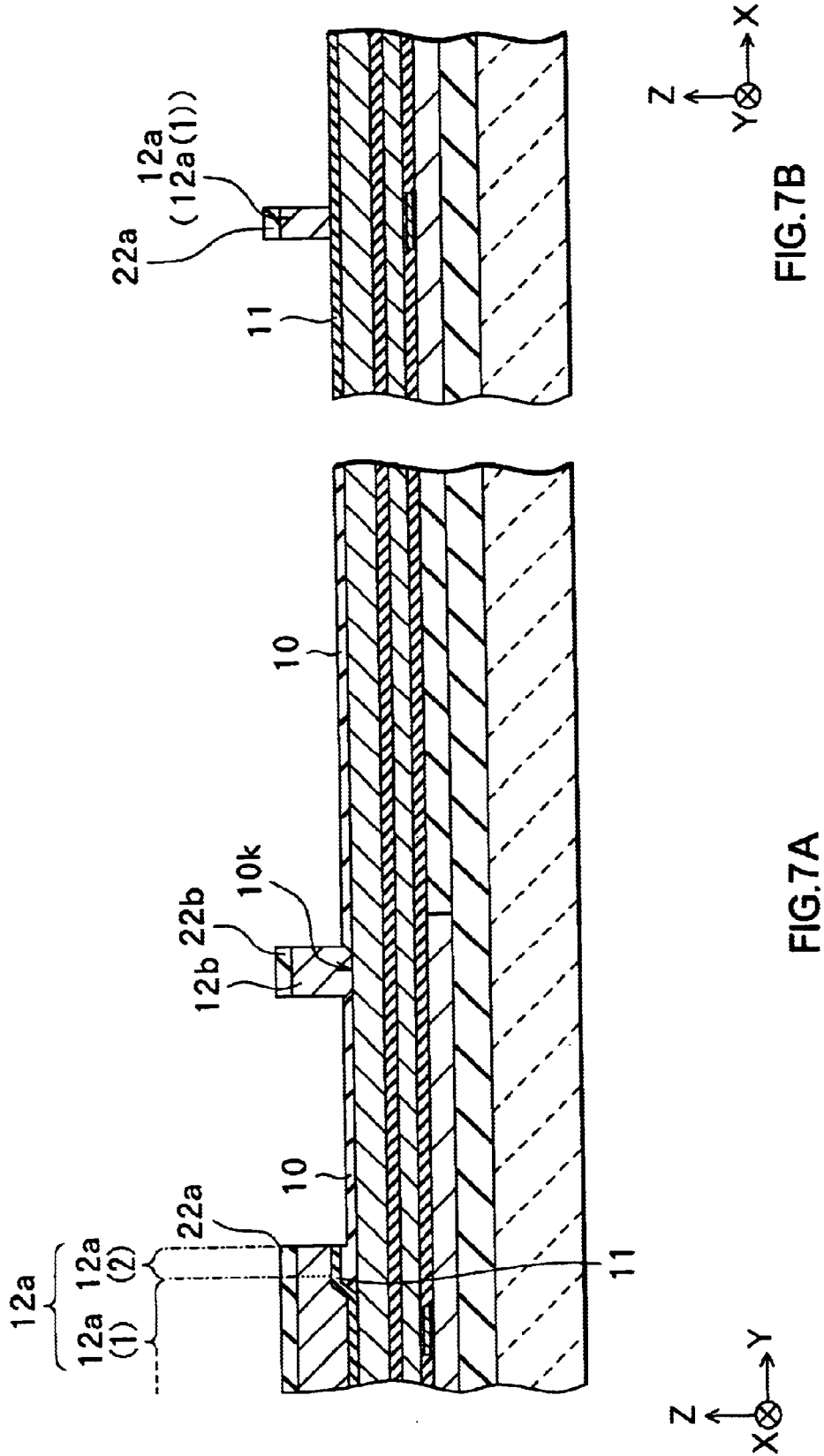

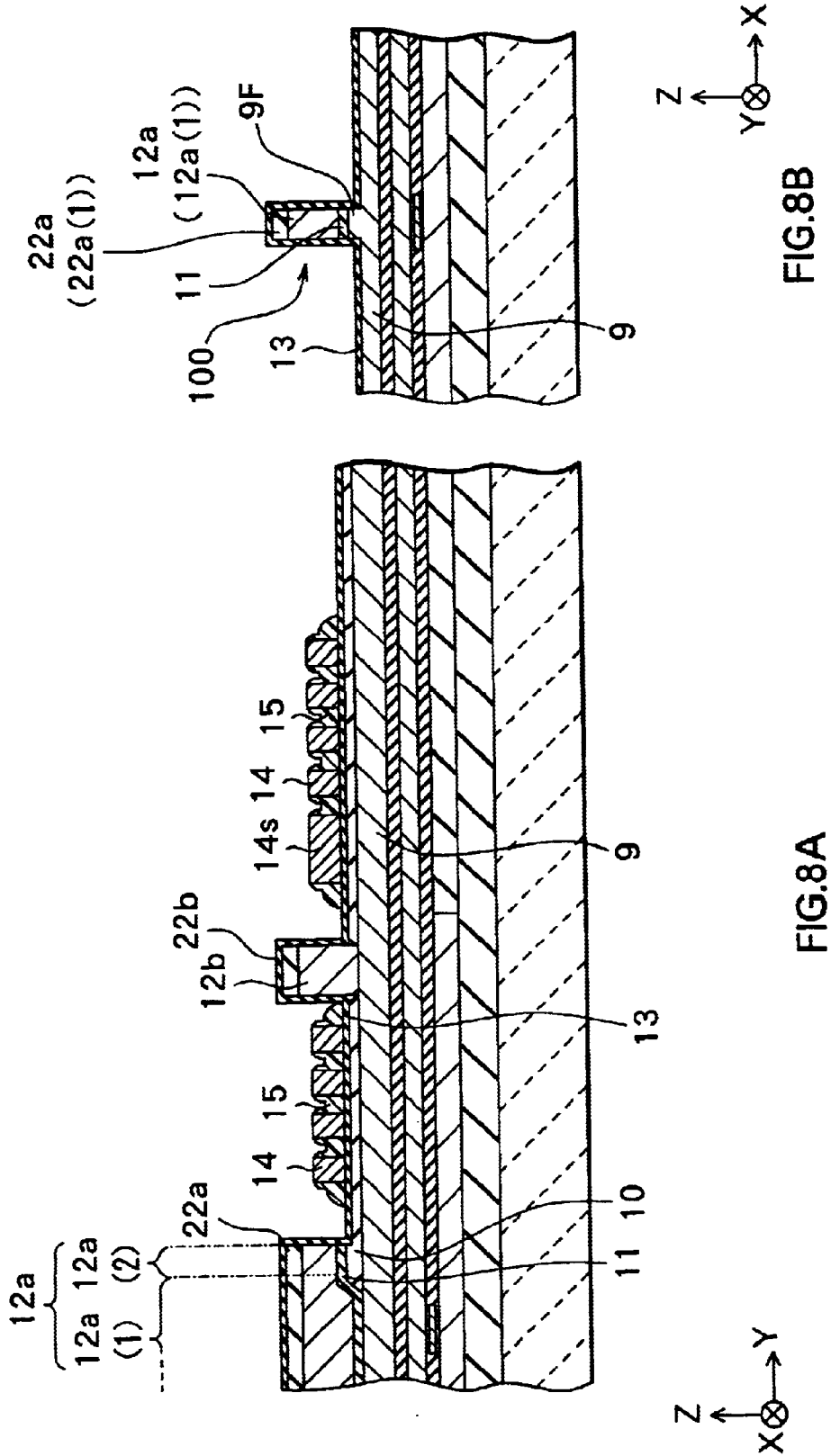

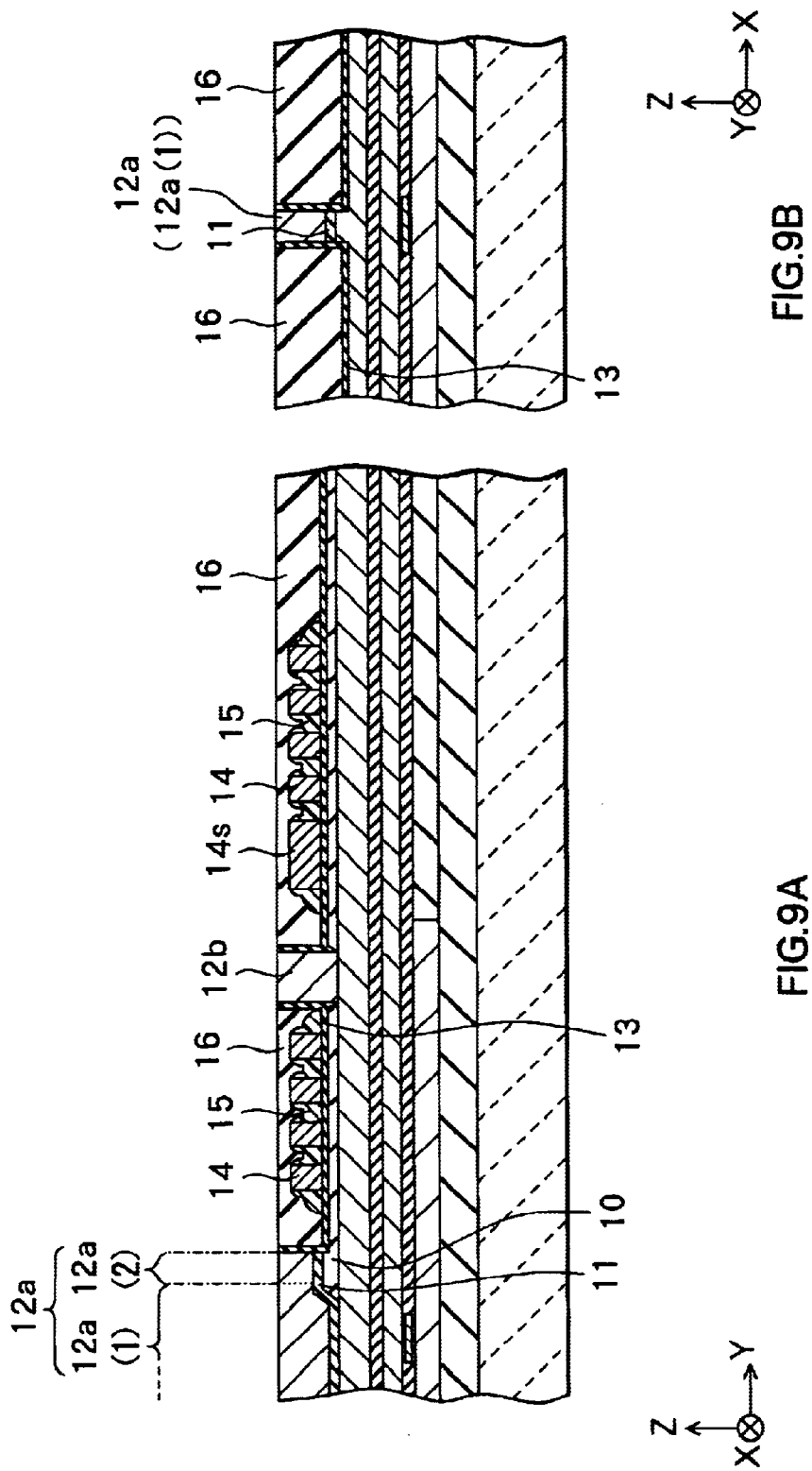

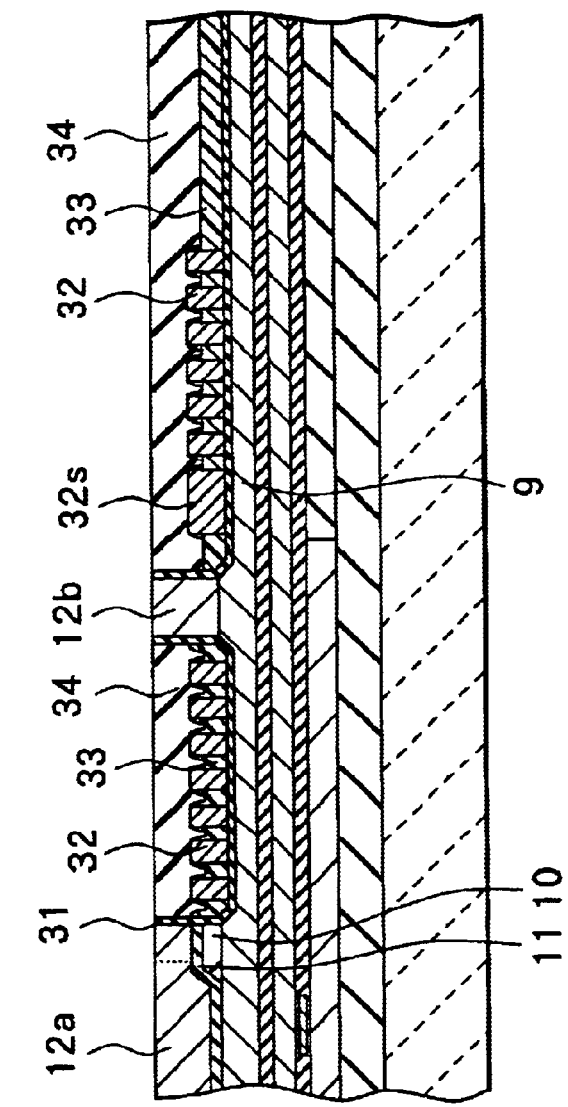
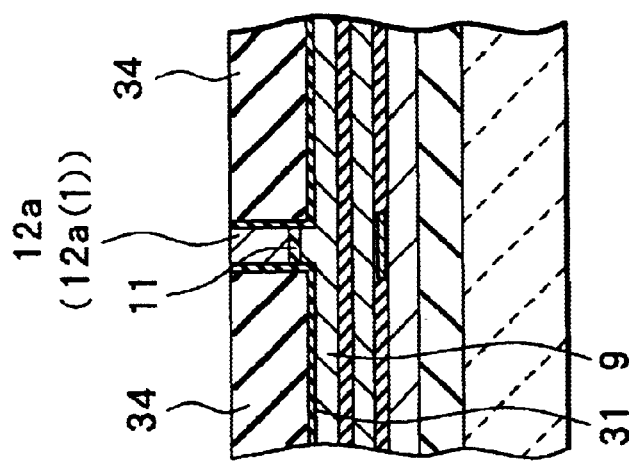
FIG.27A
FIG.27B

METHOD OF MANUFACTURING THIN FILM MAGNETIC HEAD

BACKGROUND OF THE INVENTION

1. Field of the Invention

The present invention relates to a method of manufacturing a thin film magnetic head having at least an inductive magnetic transducer for writing.

2. Description of the Related Art

In recent years, an improvement in performance of a thin film magnetic head is demanded in association with an increase in surface recording density of a hard disk drive. As a thin film magnetic head, a composite thin film magnetic head of a structure in which a recording head having an inductive magnetic transducer for writing and a reproducing head having a magnetoresistive (hereinbelow, referred to as MR) element for reading are stacked is widely used.

In order to improve the recording density in the performances of a recording head, it is necessary to increase track density of a magnetic recording medium. For this purpose, it is necessary to realize a recording head of a narrow track structure in which the width on the air bearing surface of each of a bottom pole and a top pole formed sandwiching a write gap is reduced to the order of a few microns to submicrons. In order to achieve this, semiconductor processing techniques are used.

Referring to FIGS. 37 to 42, as an example of a method of manufacturing a conventional thin film magnetic head, a method of manufacturing a composite thin film magnetic head will be described.

According to the manufacturing method, first, as shown in FIG. 37, an insulating layer 102 made of, for example, aluminium oxide ($Al_2O_3$, hereinafter referred to as "alumina") is deposited in thickness of about 5 to 10.0 $\mu$m on a substrate 101 made of altic ($Al_2O_3$.TiC) or the like. Subsequently, a bottom shield layer 103 for a reproducing head is formed on the insulating layer 102. For example, alumina is then deposited by sputtering in thickness of 100 to 200 nm on the bottom shield layer 103 to form a shield gap film 104. An MR film 105 for constructing an MR device for reproduction is deposited in thickness of tens nm on the shield gap film 104 and is patterned in a desired shape by high-precision photolithography. Then lead layers (not shown) as lead electrode layers which are electrically connected to the MR film 105 are formed on both sides of the MR film 105. After that, a shield gap film 106 is formed on the lead layers, the shield gap film 104, and the MR film 105, so that the MR film 105 is buried in the shield gap films 104 and 106. An top shield-cum-bottom pole (hereinafter referred to as a bottom pole) 107 made of a magnetic material such as a nickel iron alloy (NiFe, hereinafter also simply referred to as Permalloy (trademark)) used for both of the reproducing head and the recording head is formed on the shield gap film 106.

As shown in FIG. 38, on the bottom pole 107, a write gap layer 108 made of an insulating material such as alumina is formed. Further, a photoresist film 109 is formed in a predetermined pattern on the write gap film 108 by high-precision photolithography. On the photoresist film 109, a thin film coil 110 for an inductive recording head made of copper (Cu) or the like is formed by, for example, plating. A photoresist film 111 is formed in a predetermined pattern by high-precision photolithography so as to cover the photoresist film 109 and the thin film coil 110. In order to insulate turns of the thin film coil 110 from each other, a heat treatment is performed at, for example, 250° C. on the photoresist film 111.

As shown in FIG. 39, in a position rearward of the thin film coil 110 (right side in FIG. 39), to form a magnetic path, an opening 108a is formed by partially etching a part of the write gap layer 108 to expose a part of the bottom pole 107. A magnetic material having high saturated flux density, for example, Permalloy is selectively formed so as to cover the exposed face of the bottom pole 107, the photoresist film 111, and the write gap layer 108 by electrolyte plating. A photoresist film is formed on this plating film made of Permalloy and, after that, the photoresist film is subjected to a selective exposure process (photolithography process), thereby forming a photoresist film pattern (not shown) having a predetermined plane shape. By using the photoresist film pattern as a mask, the plating film is selectively etched by ion milling, thereby forming a top yoke-cum-top magnetic pole (hereinbelow, called top pole) 112. The top pole 112 has a plane shape as shown in FIG. 42 which will be described hereinlater, and includes a yoke portion 112a and a pole tip portion 112b. The top pole 112 is in contact with and magnetically coupled to the bottom pole 107 via the opening 108a. By using a part (pole tip portion 112b) of the top pole 112 as a mask, both the write gap layer 108 and the bottom pole 107 are selectively etched about 0.5 $\mu$m by ion million (refer to FIG. 41). After that, an overcoat layer 113 made of, for example, alumina is formed on the top pole 112. Finally, a track surface, namely, an air bearing surface 120 of the recording head and the reproducing head is formed by a mechanical process and a polishing process. In such a manner, a thin film magnetic head is completed.

FIGS. 40 to 42 show the structure of the thin film magnetic head in a completed state. FIG. 40 is a cross section of the thin film magnetic head perpendicular to the air bearing surface 120. FIG. 41 is an enlarged cross section parallel to the air bearing surface 120 of the pole portion. FIG. 42 is a plan view of the structure. FIG. 39 is a cross section taken along line XXXIX—XXXIX of FIG. 42. In FIGS. 40 to 42, the overcoat layer 113 and the like are not shown. In FIG. 42, with respect to the thin film coil 110 and the photoresist film 111, only the outlines are shown.

FIGS. 40 and 42, "TH" denotes throat height. "MRH" denotes an MR height. The "throat height (TH)" is one of factors determining the performances of the recording head and is a length from a position of the end on the side closest to the air bearing surface 120, of the insulating layer (photoresist film 111) for electrically isolating the thin film coil 110 from the other conductive portion, that is, the throat height zero position (TH0 position) to the position of the air bearing surface 120. In order to improve the performances of the recording head, it is necessary to optimize the throat height TH. The throat height (TH) is controlled according to a polishing amount at the time of processing the air bearing surface 120. An "MR height (MRH)" denotes a length from the position of the end on the side furthest from the air bearing surface 120, of the MR film 105, that is, the MR height zero position (MRH0 position) to the position of the air bearing surface 120. The MR height (MRH) is also controlled by the polishing amount at the time of processing the air bearing surface 120.

Factors determining the performances of the thin film magnetic head include not only the throat height (TH) and the MR height (MRH) but also an apex angle $\theta$ shown in FIG. 40. The apex angle $\theta$ is an average inclination angle of an inclined face on the side close to the air bearing surface 120 of the photoresist film 111.

As shown in FIG. 41, a structure in which a part of the write gap layer 108 and a part of the bottom pole 107 are etched in a self-aligned manner with respect to the pole tip portion 112b of the top pole 112 is called a trim structure. According to the trim structure, an increase in effective track width due to expansion of the magnetic flux generated at the time of writing data to a narrow track can be prevented. "P2W" shown in FIG. 41 denotes a width of the portion having the trim structure (hereinbelow, simply called "pole tip portion 500"), that is, a pole width (hereinbelow, also called "track width"). The process dimension of the pole width P2W depends on the width of the portion corresponding to the pole tip portion 500, of the mask (photoresist film pattern in the above case) used to perform an etching process for forming the trim structure. "P2L" shown in the diagram indicates the thickness of the pole tip portion 112b as a part of the pole tip portion 500, that is, a pole length. As shown in FIG. 41, lead layers 121 as a lead electrode layer electrically connected to the MR film 105 are provided on both sides of the MR film 105. In FIGS. 37 to 40, the lead layers 121 are not shown.

As shown in FIG. 42, the top pole 112 has a yoke portion 112a which occupies a major part of the top pole 112 and a pole tip portion 112b having an almost constant width as the pole width P2W. In the coupling portion between the yoke portion 112a and the pole tip portion 112b, the outer periphery of the yoke portion 112a forms an angle α to a plane parallel to the air bearing surface 120. In the coupling portion, the outer periphery of the pole tip portion 112b forms an angle β to a plane parallel to the air bearing surface 120. For example, α is about 45 degrees and β is about 90 degrees. As described above, the pole tip portion 112b is a portion serving as a mask at the time of forming the trim structure of the pole tip portion 500. As understood from FIGS. 40 and 42, the pole tip portion 112b extends on the flat write gap layer 108, and the yoke portion 112a extends on a coil portion (hereinbelow, called an apex portion) which is covered with the photoresist film 111 and is raised like a hill.

The detailed structural characteristics of the top pole are described in, for example, Japanese Unexamined Patent Application No. 8-249614.

Since the pole width P2W of the pole tip portion 500 determines the recording track width on a recording medium, to increase the recording density, it is necessary to form the pole tip portion 500 with high accuracy and to narrow the pole width P2W. Especially, in recent years, in order to address a request of higher recording density, narrower pole width P2W which is, for example, about 0.3 μm or less is desired. When the pole width P2W is too wide, a phenomenon such that data is written not only in a predetermined recording track area on the recording medium but also a neighboring area, that is, a side erase phenomenon occurs, so that the recording density cannot be improved. Consequently, it is important to make the pole width P2W of the pole tip portion 500 very narrow and constant over the whole area.

Methods of forming the top pole 112 include not only a wet process such as frame plating but also a dry process of selectively etching a plating film made of Permalloy by ion milling with a mask of a predetermined shape so as to be patterned.

In such a conventional dry process, however, the inventors of the present invention have recognized that the following problems occur.

1) For example, in the case of forming a mask used to pattern a plating film by a photolithography process, the minimum width of a portion corresponding to the pole tip portion 500 in a mask obtained is about 0.3 μm for the following reason. When the width of the portion is set to be narrower than 0.3 μm, the width becomes extremely too small with respect to the thickness (for example, 2 to 3 μm), so that the mask cannot be formed according to the design dimensions. Consequently, in the case of using the above-described method, the limit of the minimum pole width P2W of the pole tip portion 500 formed finally is about 0.3 to 0.4 μm. The very narrow pole width P2W (for example, 0.3 μm or less) cannot be achieved.

2) In the case of etching the plating film by ion milling, for example, when an ion beam is emitted from a direction almost perpendicular to the surface of the plating film (direction at an angle of about 0 to 30 degrees in the width direction to the perpendicular line with respect to the surface of the plating film), an etch product generated at the time of etching adheres again to side walls which are not etched, and the width of the pole tip portion 112b is partially expanded more than the design value. On the other hand, when an ion beam is emitted from the direction almost parallel to the surface of the plating film (direction at an angle of about 50 to 70 degrees in the width direction to the perpendicular line with respect to the surface of the plating film), a phenomenon that the etch product adheres again as described above can be avoided. As the process progresses, however, the etch amount increases, and the width of the pole tip portion 112b becomes partially narrower than the design value. Particularly, when the pole tip portion 500 is formed by performing the etching process under the latter conditions, as shown in FIG. 43, the pole width P2W varies according to the positions in the thickness direction and becomes non-uniform.

3) When a photoresist film for forming a mask (photoresist film pattern) used for patterning the plating film is formed on a rough underlayer (Permalloy layer), reflection light in the oblique or lateral direction occurs from the surface of the underlayer. The reflection light expands or reduces the exposure area, thereby deteriorating the accuracy of forming the mask. One of the causes of deterioration in accuracy of forming the mask is that Permalloy having relatively high reflectance is uses as the material of the plating film as the underlayer of the photoresist film.

4) Since the pole tip portion 500 is formed by ion milling of which etching speed is slow, the etching process takes long time. A considerably long time is required to complete the process of the pole tip portion 500. Such a tendency is not limited to the case of forming the pole tip portion 500 but similarly occurs in the case of forming the top pole 112 and other magnetic layer portions (bottom shield layer 103, bottom pole 107, and the like).

There are, conventionally, not only the above-described problems in the process but also problems in performances. Specifically, Permalloy is conventionally used as a magnetic material of the magnetic layer portion constructing the thin film magnetic head. Consequently, when the pole width P2W is extremely narrowed to, for instance, about 0.3 μm or narrower, a magnetic flux saturation phenomenon occurs particularly in the magnetic layer portion constructing the pole tip portion 500, so that a characteristic of overwriting data to a recording medium, that is, an overwrite characteristic deteriorates.

SUMMARY OF THE INVENTION

The invention has been achieved in consideration of the problems and its object is to provide a method of manufacturing a thin film magnetic head in which, particularly, the pole portion can be formed with high accuracy in a short time.

According to a first aspect of the invention, there is provided a method of manufacturing a thin film magnetic head including first and second magnetic layers magnetically coupled to each other and having first and second magnetic poles which face each other with a gap layer in between near and in a recording-medium-facing surface to be faced with a recording medium, a thin film coil portion provided between the two magnetic layers, and an insulating layer for insulating the thin film coil portion from the two magnetic layers, wherein at least one of a step of forming the first magnetic pole and a step of forming the second magnetic pole includes: a step of forming a magnetic material layer; a step of forming a mask precursor pattern on the magnetic material layer; a first etching step of forming a first mask having a narrower width by etching a part of the mask precursor pattern by ion beam etching and, simultaneously, etching the magnetic material layer to a depth in an area other than an area where the first mask is formed; and a second etching step of forming at least one of the first and second magnetic poles by selectively etching the magnetic material layer by reactive ion etching with the first mask.

In the method of manufacturing a thin film magnetic head according to the first aspect of the invention, in the first etching step, a part of the mask precursor layer is etched, thereby forming the first mask having a narrower width and, simultaneously, a layer near the surface of the magnetic material layer in an area other than the area of forming the first mask is partially etched. In the second step, the magnetic material layer is etched by reactive ion etching by using the first mask, thereby forming at least one of the first and second magnetic poles.

In the method of manufacturing a thin film magnetic head according to the first aspect of the invention, in the first etching step, an irradiation angle of an ion beam may be changed at least once. In such a case, during the first etching step, it is preferable to change an angle in the width direction between a direction orthogonal to an extending direction of the magnetic material layer and an irradiation direction of the ion beam from a first angle to a second angle which is larger than the first angle. Specifically, the first angle is set to an angle plus or minus 15 degrees of 45 degrees, and the second angle is set to an angle plus or minus 15 degrees of 75 degrees.

According to a second aspect of the invention, there is provided a method of manufacturing a thin film magnetic head including first and second magnetic layers magnetically coupled to each other and having first and second magnetic poles which face each other with a gap layer in between near and in a recording-medium-facing surface to be faced with a recording medium, a thin film coil provided between the two magnetic layers, and an insulating layer for insulating the thin film coil from the two magnetic layers, wherein at least one of a step of forming the first magnetic pole and a step of forming the second magnetic pole includes: a step of forming a magnetic material layer; a step of forming a mask precursor pattern on the magnetic layer; a first etching step of forming a first mask having a narrower width by etching a part of the mask precursor pattern by ion beam etching; and a second etching step of forming at least one of the first and second magnetic poles by etching the magnetic material layer by using the first mask by reactive ion etching.

In the method of manufacturing a thin film magnetic head according to the second aspect of the invention, in the first etching step, a part of the mask precursor layer is etched, thereby forming the first mask having a narrower width. In the second step, the magnetic material layer is etched by reactive ion etching by using the first mask, thereby forming at least one of the first and second magnetic poles.

In the method of manufacturing a thin film magnetic head according to the second aspect of the invention, preferably, in the first etching step, an ion beam is emitted from a direction at an angle plus or minus 15 degrees of 75 degrees in the width direction from a direction orthogonal to an extending direction of the magnetic material layer.

According to a third aspect of the invention, there is provided a method of manufacturing a thin film magnetic head including first and second magnetic layers magnetically coupled to each other and having first and second magnetic poles which face each other with a gap layer in between near and in a recording-medium-facing surface to be faced with a recording medium and each of which defines a recording track width of the recording medium, a thin film coil provided between the two magnetic layers, and an insulating layer for insulating the thin film coil from the two magnetic layers, wherein at least one of a step of forming the first magnetic pole and a step of forming the second magnetic pole includes: a step of forming a magnetic material layer; a step of forming a mask precursor pattern on the magnetic material layer; a first etching step of partially etching a layer near the surface of the magnetic material layer in an area other than an area of forming the mask precursor pattern by using the mask precursor pattern as a mask by ion beam etching; and a second etching step of forming at least one of the first and second magnetic poles by etching the magnetic material layer by using the mask precursor pattern as a first mask by reactive ion etching.

In the method of manufacturing a thin film magnetic head according to the third aspect of the invention, in the first etching step, a layer near the surface of the magnetic material layer in an area other than an area of forming the mask precursor pattern is partially etched. In the second step, the magnetic material layer is further etched by reactive ion etching by using the mask precursor pattern as the first mask, thereby forming at least one of the first and second magnetic poles.

In the method of manufacturing a thin film magnetic head according to the third aspect of the invention, in the first etching step, it is preferable to emit an ion beam from a direction at an angle plus or minus 15 degrees of 45 degrees in the width direction from a direction orthogonal to an extending direction of the magnetic material layer.

The method of manufacturing a thin film magnetic head of the invention may include a step of polishing the surface of the magnetic material layer so as to planarize the surface between the step of forming the magnetic material layer and the step of forming the mask precursor pattern.

In the method of manufacturing a thin film magnetic head according to the invention, a step of forming the mask precursor pattern may include: a step of forming a mask precursor layer on the magnetic material layer; and a third etching step of forming the mask precursor pattern by selectively etching the mask precursor layer by reactive ion etching. In this case, in the third etching step, a second mask having a shape corresponding to a plane shape of the mask precursor pattern may be used. In such a case, a photoresist film pattern having a predetermined plane shape may be formed on the mask precursor layer and used as the second mask., or a metal film pattern having a predetermined plane shape may be formed on the mask precursor layer and used as the second mask. Particularly, in the latter case, the metal film pattern may be formed by selectively growing a plating film on the mask precursor layer, or a metal layer may be formed on the mask precursor layer and selectively etched to thereby form the metal layer pattern. It is preferable to use any of nickel iron, nickel copper, iron nitride, cobalt iron, nickel boron and nickel phosphor as a material of the metal film pattern.

In the method of manufacturing a thin film magnetic head according to the invention, in the first etching step, the second mask may be also etched and removed.

In the method of manufacturing a thin film magnetic head according to the invention, the mask precursor layer may be deposited by chemical vapor deposition. In such a case, it is preferable to deposit the mask precursor layer under a pressure of 100 Pa or lower.

In the method of manufacturing a thin film magnetic head according to the invention, a predetermined inorganic material may be used as a material of the first mask. In such a case, as the inorganic material, it is preferable to use a material containing aluminum oxide or aluminum nitride.

In the method of manufacturing a thin film magnetic head according to the invention, in the case where the first magnetic pole extends in a direction apart from the recording medium facing surface and defines a recording track width of the recording medium, and the first magnetic layer includes a first magnetic layer portion having the first magnetic pole and a second magnetic layer portion which covers an area of the thin film coil and is magnetically coupled to the first magnetic layer portion, a plane shape of the first mask may include at least a portion corresponding to the plane shape of the first magnetic pole in the first magnetic layer portion.

In the method of manufacturing a thin film magnetic head according to the invention, in the case where the first magnetic layer portion further includes an expanded portion which is magnetically coupled to the first magnetic pole on the side far from the recording medium facing surface and is wider than the first magnetic pole, a step in the width direction is formed in a position where the first magnetic pole and the expanded portion are coupled to each other, and a corner is formed at a part where a side face of the first magnetic pole and a step face of the expanded portion in the step cross each other, preferably, the plane shape of the first mask further includes a part corresponding to a plane shape of the expanded portion, and an angle at a part corresponding to the corner of the first magnetic layer portion in the first mask lies in a range from 90 degrees to 120 degrees.

In the method of manufacturing a thin film magnetic head according to the invention, in the third etching step, it is preferable to perform an etching process in a gas atmosphere containing at least one of carbon tetrafluoride, sulfur hexafluoride, boron tribromide, chlorine, and boron trichloride at a temperature in a range from 50 degrees to 300 degrees.

In the method of manufacturing a thin film magnetic head according to the invention, in the second etching step, at least the first magnetic pole in the first magnetic layer may be formed, or the second magnetic pole in the second magnetic layer may be formed.

In the method of manufacturing a thin film magnetic head according to the invention, an area other than an area for forming the first magnetic pole in the gap layer may be selectively removed by reactive ion etching. In such a case, it is preferable to continuously perform formation of the first magnetic pole in the first magnetic layer, selective removal of the gap layer, and formation of the second magnetic pole in the second magnetic layer in the same step. In the case of processing the portions, preferably, the first magnetic pole in the first magnetic layer is formed by using a first mask made of a predetermined inorganic material, and the selective removal of the gap layer and formation of the second magnetic pole in the second magnetic layer are performed by using at least one of the first mask and the first magnetic pole as a mask.

In the method of manufacturing a thin film magnetic head according to the invention, in the step of forming the first magnetic layer, the second magnetic layer portion may be formed separately from the first magnetic layer portion by reactive ion etching. In such a case, it is preferable that the second magnetic layer portion is partially overlapped with a part of the first magnetic layer portion, and an end on the side near and in the recording medium facing surface, of the second magnetic layer portion is positioned apart from the position of the recording medium facing surface.

In the method of manufacturing a thin film magnetic head according to the invention, in the case where the thin film coil has a first thin film coil layer and the insulating layer has a first insulating layer portion which buries the first thin film coil layer, the method may include: a step of forming the first insulating layer portion so as to cover at least the first magnetic layer portion and the first thin film coil layer; and a step of forming a first planarized face by polishing a surface of the first insulating layer portion until at least the first magnetic layer portion is exposed. In such a case, the second magnetic layer portion may be formed on the first planarized face.

In the method of manufacturing a thin film magnetic head according to the invention, when the first magnetic layer further includes a third magnetic layer portion for magnetically coupling the first magnetic layer portion and the second magnetic layer portion between the first and second magnetic layer portions, the third magnetic layer portion may be formed on the first planarized face by reactive ion etching. In such a case, preferably, the third magnetic layer portion is overlapped with both a part of the first magnetic layer portion and a part of the second magnetic layer portion and an end on the side close to the recording medium facing surface, of the third magnetic layer portion is positioned apart from the position of the recording medium facing surface.

In the method of manufacturing a thin film magnetic head according to the invention, when the thin film coil portion further has a second thin film coil layer disposed in a layer different from the first thin film coil layer, and the insulating layer further has a second insulating layer portion for burying the second thin film coil layer, the method may include: a step of forming the second thin film coil layer and forming a first connection pattern serving as a part of the thin film coil portion integrally with the second thin film coil layer at an end of the second thin film coil layer; a step of forming a second connection pattern serving as a part of the thin film coil portion on the first connection pattern in the same step of forming the third magnetic layer portion; a step of forming the second insulating layer portion so as to cover at least the third magnetic layer portion, the second thin film coil layer, and the second connection pattern; a step of forming a second planarized face by polishing a surface of the second insulating layer portion until both at least the third insulating layer portion and the second connection pattern are exposed; and a step of forming a conductive layer pattern so as to be electrically connected to an exposed face of the second connection pattern on a part of the second planarized face. In such a case, the second magnetic layer portion may be formed in another part on the second planarized face.

In the method of manufacturing a thin film magnetic head according to the invention, when the head further has: a magnetic transducing function device film extending in a direction apart from the recording medium facing surface; and a third magnetic layer for magnetically shielding the magnetic transducing function device film, the third magnetic layer may be formed by an etching process of reactive ion etching.

In the method of manufacturing a thin film magnetic head according to the invention, the magnetic material layer may be deposited by sputtering by using a predetermined magnetic material. In such a case, as the magnetic material, it is preferable to use a material containing iron nitride or an amorphous alloy such as a material containing iron cobalt zirconium oxide alloy.

In the method of manufacturing a thin film magnetic head according to the invention, in the second etching step, it is preferable to perform an etching process in a gas atmosphere containing at least one of chlorine, boron trichloride, and hydrogen chloride at a temperature in a range from 50 degrees to 300 degrees.

Other and further objects, features and advantages of the invention will appear more fully from the following description.

BRIEF DESCRIPTION OF THE DRAWINGS

FIGS. 1A and 1B are cross sections for explaining a process in a method of manufacturing a thin film magnetic head according to a first embodiment of the invention.

FIGS. 2A and 2B are cross sections for explaining a process subsequent to FIGS. 1A and 1B, respectively.

FIGS. 3A and 3B are cross sections for explaining a process subsequent to FIGS. 2A and 2B, respectively.

FIGS. 4A and 4B are cross sections for explaining a process subsequent to FIGS. 3A and 3B, respectively.

FIGS. 6A and 6B are cross sections for explaining a process subsequent to FIGS. 5A and 5B, respectively.

FIGS. 7A and 7B are cross sections for explaining a process subsequent to FIGS. 6A and 6B, respectively.

FIGS. 8A and 8B are cross sections for explaining a process subsequent to FIGS. 7A and 7B, respectively.

FIGS. 9A and 9B are cross sections for explaining a process subsequent to FIGS. 8A and 8B, respectively.

FIGS. 27A and 27B are cross sections for explaining a process subsequent to FIGS. 26A and 26B, respectively.

DETAILED DESCRIPTION OF THE PREFERRED EMBODIMENTS

Figure 5B:
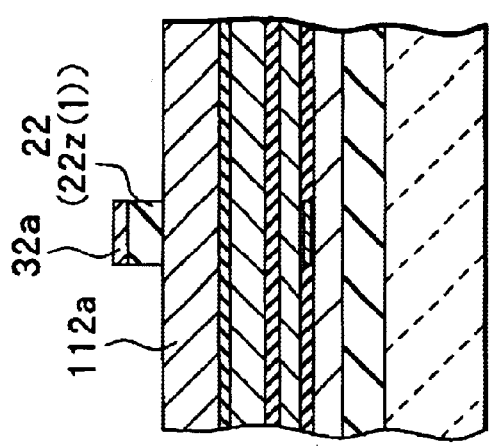
FIGS. 5A and 5B are cross sections for explaining a process subsequent to FIGS. 4A and 4B, respectively.

Embodiments of the invention will be described in detail hereinbelow by referring to the drawings.

First Embodiment

<Method of Manufacturing Thin Film Magnetic Head>

Reference to FIGS. 1A and 1B to FIG. 18, an example of a method of manufacturing a composite thin film magnetic head as a method of manufacturing a thin film magnetic head according to a first embodiment of the invention will be described. Since a thin film magnetic head according to the embodiment is embodied by the method of manufacturing the thin film magnetic head according to the embodiment, it will be also described hereinbelow.

Figure 17:
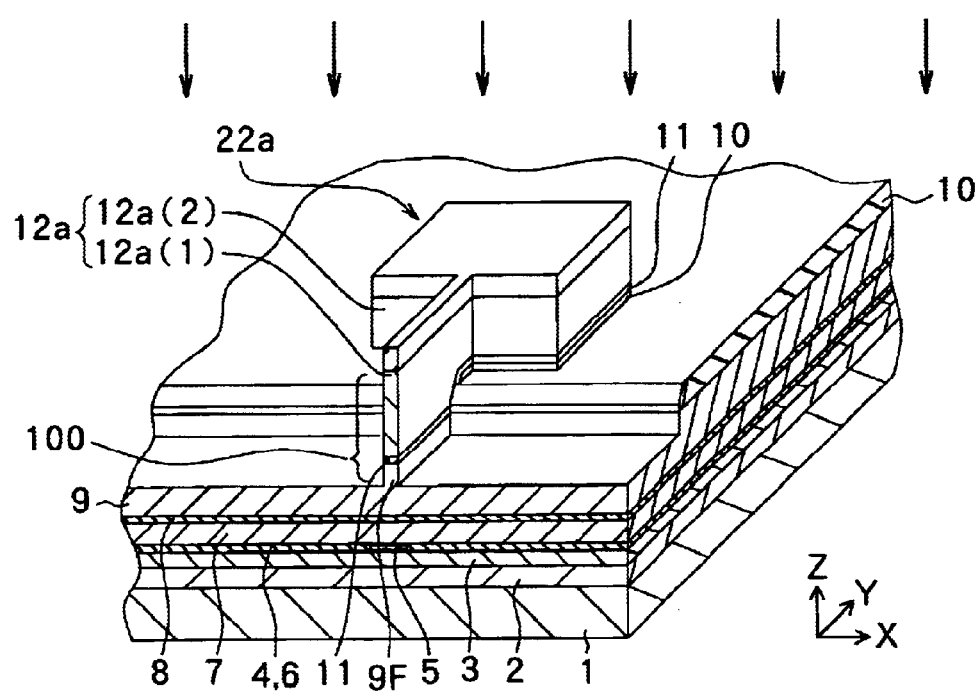
FIG. 17 is a perspective view corresponding to the cross sections of FIGS. 8A and 8B.
Figure 18:
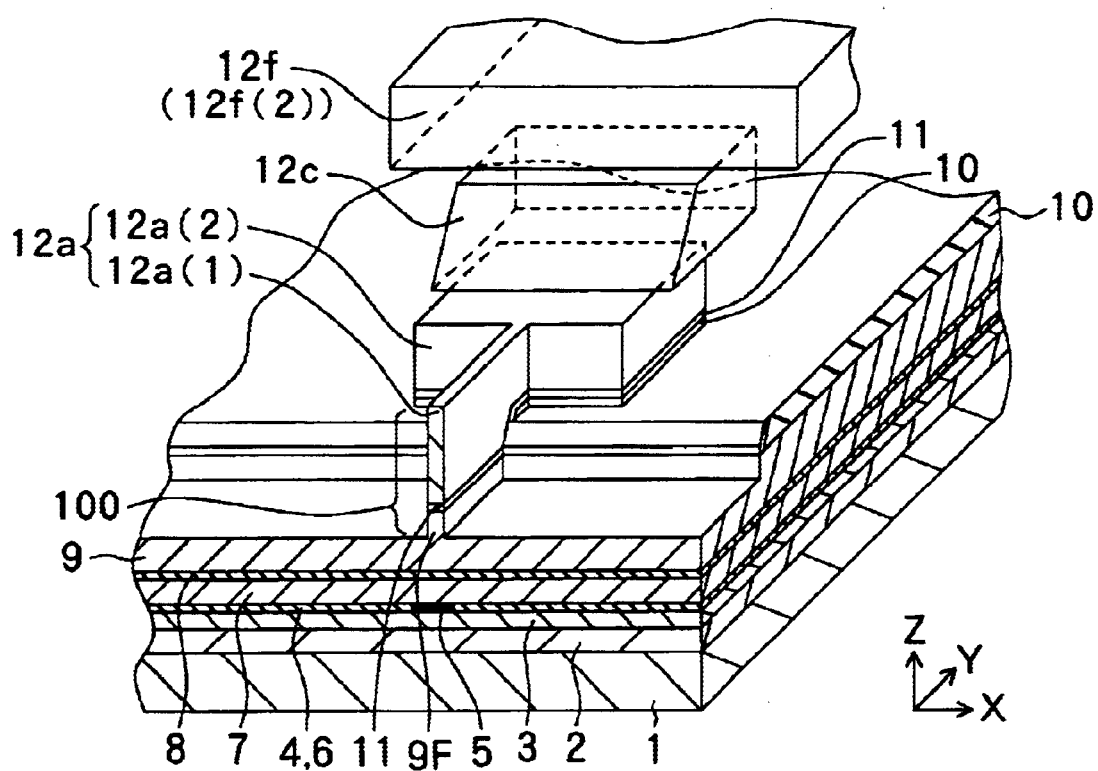
FIG. 18 is a perspective view corresponding to the cross sections of FIGS. 11A and 11B.

FIGS. 1A to 11A are cross sections perpendicular to the air bearing surface and FIGS. 1B to 11B are cross sections parallel to the air bearing surface of the pole portion. FIGS. 12 to 18 are perspective views corresponding to main manufacturing steps. FIGS. 12 to 17 correspond to states shown in FIGS. 3A and 3B to FIGS. 8A and 8B, respectively. FIG. 18 corresponds to the state shown in FIGS. 11A and 11B. In FIG. 17, insulating films 13 and 15, a thin film coil 14, and the like in FIGS. 8A and 8B are not shown. In FIG. 18, insulating films 13, 15, 16, 18, and 19, thin film coils 14 and 17, an overcoat layer 20, and the like in FIGS. 11A and 11B are not shown.

In the following description, the X axis direction in FIGS. 1A and 1B to FIG. 18 will be expressed as a "width direction", the Y axis direction will be expressed as a "length direction", and the Z axis direction will be expressed as a "thickness direction". An air bearing surface 80 side in the Y axis direction (or the side which becomes the air bearing surface 80 in a later step) will be expressed as a "front side (or forward)", and the opposite side will be expressed as a "rear side (or rearward)".

In the manufacturing method according to the embodiment, first, as shown in FIGS. 1A and 1B, an insulating layer 2 made of, for example, alumina is formed in thickness of about 3.0 to 5.0 μm on a substrate 1 made of, for example, altic ($Al_2O_3 \cdot TiC$). Then, a bottom shield layer 3 for a reproducing head is formed by selectively forming Permalloy (Ni: 80 percent by weight, Fe: 20 percent by weight) or the like in thickness of about 3.0 μon the insulating layer 2 by, for example, photolithography and plating. As the material of forming the bottom shield layer 3, instead of the above, Permalloy (Ni: 45 percent by weight, Fe: 55 percent by weight) may be also used. An insulating film made of, for example, alumina is formed in thickness of about 4.0 to 5.0 μm on the whole surface and, after that, the surface of the insulating film is polished by, for example, CMP (Chemical Mechanical Polishing) until the lower shield layer 3 is exposed, and the entire surface is planarized.

Subsequently, as shown in FIGS. 1A and 1B, a shield gap film 4 is formed by depositing alumina layer or the like in thickness of about 100 to 200 nm by sputtering on the bottom shield layer 3. An MR film 5 for constructing an MR device as a main portion of the reproduction head is formed on the shield gap film 4 in a desired shape by high-precision photolithography. Lead layers (not shown) as a lead electrode layer to be electrically connected to the MR film 5 are formed on both sides of the MR film 5 and, after that, a shield gap film 6 is formed on the lead layers, the shield gap film 4, and the MR film 5, thereby burying the MR film 5 in the shield gap films 4 and 6. The MR film 5 corresponds to an example of a "magnetic transducing function device film" in the invention.

As shown in FIGS. 1A and 1B, on the shield gap film 6, a top shield layer 7 is selectively formed in thickness of about 1.0 to 1.5 μm. The material, the forming method, and the like of the top shield layer 7 are similar to those of the bottom shield layer 3. Each of the bottom shield layer 3 and the top shield layer 7 corresponds to an example of a "third magnetic layer" in the invention.

As shown in FIGS. 1A and 1B, on the top shield layer 7, an insulating film 8 made of alumina or the like is formed in thickness of about 0.15 to 0.2 μm by, for example, sputtering. Subsequently, on the insulating film 8, a bottom pole 9 made of, for example, an iron nitride (FeN) alloy is selectively formed by a procedure as described hereinbelow. First, on the insulating film 8, an iron nitride layer or the like is formed in thickness of about 2.0 to 2.5 μm by, for example, sputtering. The formed iron nitride layer is etched by reactive ion etching (hereinbelow, simply referred to as "RIE") with a mask of a predetermined shape and a predetermined material so as to be patterned, thereby selectively forming the bottom pole 9. The details of the process of patterning the formed iron nitride layer as described above will be described hereinlater. The bottom pole 9 corresponds to an example of a "second magnetic layer" in the invention.

As shown in FIGS. 2A and 2B, on the bottom pole 9, for example, an alumina layer is formed in thickness of about 0.5 to 1.0 μm by, for example, sputtering. The alumina layer is etched by RIE with a mask (not shown) made by, for example, a photoresist film and is patterned, thereby selectively forming an insulating film pattern 10. By the etching process, a part of the forward area in the alumina layer and a part of an area in which a magnetic path connection portion 12b will be formed in a later step are selectively removed. Particularly, in the latter area, an opening 10k for connecting the bottom pole 9 and a top pole 12 to be formed in a later step is formed. The insulating film pattern 10 is formed to specify a throat height zero position (TH0 position) as a reference position of determining the throat height (TH). At the time of forming the insulating film pattern 10, for example, the position of the front end of the insulating film pattern 10 (hereinbelow, simply called a "front end") almost coincides with the rear end of the MR film 5 (hereinbelow simply called a "rear end"). For example, it is preferable that at least a portion around the front end of the insulating film pattern 10 have an inclined face. By the arrangement, the flow of a magnetic flux in an upper area of the inclined face of a top pole tip 12a formed in a later step can be made smooth. At the time of performing the etching process, for example, a chlorine-based gas containing $CF_4$ or the like is used.

As shown in FIGS. 2A and 2B, for example, by sputtering, a write gap layer 11 made of alumina or the like is formed on the entire surface in thickness of about 0.15 to 0.2 μm. At the time of forming the write gap layer 11, attention is paid so that the opening 10k formed in the preceding step is not covered with alumina. The write gap layer 11 corresponds to an example of a "gap layer" in the invention.

As shown in FIGS. 2A and 2B, a top pole tip precursor layer 112a made of an iron nitride or the like (hereinbelow, also simply called an "iron nitride layer") is formed in thickness of about 2.5 to 3.5 μm by, for example, sputtering on the entire surface. The top pole tip precursor layer 112a is a preparation layer which becomes the top pole tip 12a (and the magnetic path connection portion 12b) by being patterned by an etching process in a later step. In the following description, the preparation layer to be patterned in a predetermined shape in a later step will be expressed as a "precursor layer". As shown in FIG. 2A, the surface of the top pole tip precursor layer 112a is rough corresponding to the roughness of the underlayer. As a material of the top pole tip precursor layer 112a, except for an iron nitride, for example, an amorphous alloy having high saturated flux density such as iron cobalt zirconium oxide alloy (FeCoZrO), iron zirconium nitride (FeZrN), or iron cobalt nitride (FeCoN) may be used. The top pole tip precursor layer 112a corresponds to an example of a "magnetic material layer" in the invention.

Figure 12:
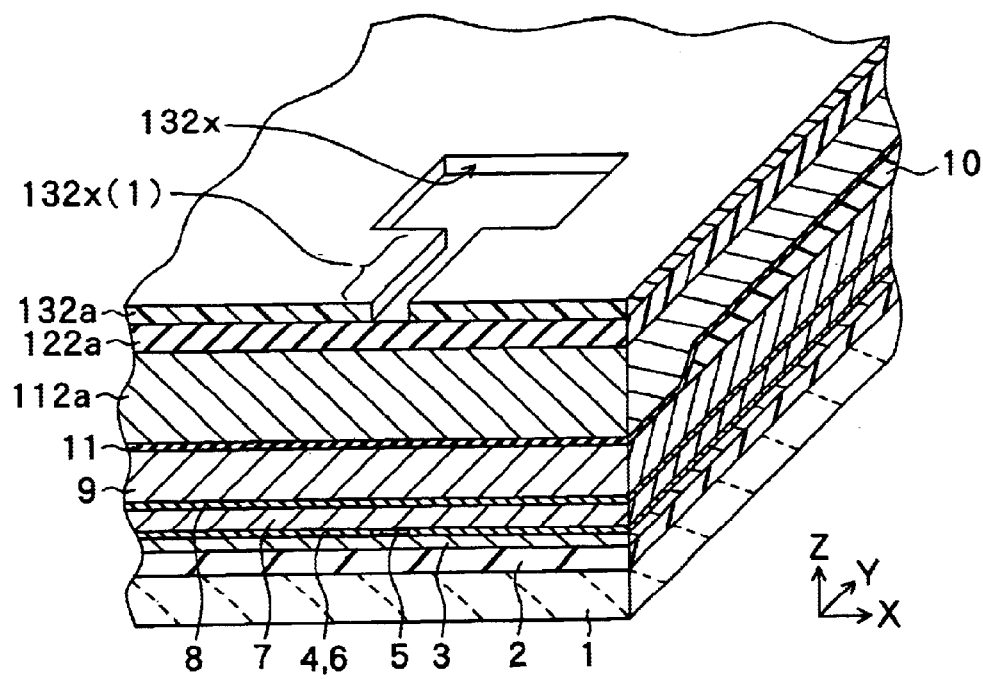
FIG. 12 is a perspective view corresponding to the cross sections of FIGS. 3A and 3B.

As shown in FIGS. 3A and 3B and FIG. 12, the surface of the top pole tip precursor layer 112a is polished by, for example, CMP by about 0.5 to 1.0 μm to be planarized.

As shown in FIGS. 3A and 3B and FIG. 12, on the planarized top pole tip precursor layer 112a, a first mask precursor layer 122a made of an inorganic material such as alumina is formed in thickness of about 1.0 to 2.0 μm by, for example, CVD (Chemical Vapor Deposition). The first mask precursor layer 122a is formed, particularly, in a low-pressure environment of, for example, 100 Pa or lower (by LP (low pressure)-CVD). By employing the LP-CVD, the first mask precursor layer 122a is formed more densely and is not therefore easily etched when the top pole tip precursor layer 112a is etched in a later step. At this time, the surface of the first mask precursor layer 122a is also formed so as to be planarized. As an inorganic material of the first mask precursor layer 122a, except for alumina, for example, aluminium nitride (AlN) may be used. The first mask precursor layer 122a corresponds to an example of a "mask precursor layer" in the invention.

As shown in FIGS. 3A and 3B and FIG. 12, on the planarized first mask precursor layer 122a, Permalloy or the like is deposited in thickness of about 50 nm by, for example, sputtering to form an electrode film (not shown) as a seed layer in electrolyte plating (frame plating). On the electrode film, a photoresist film is formed in thickness of about 1.0 μm and is patterned by photolithography, thereby forming a photoresist pattern 132a having openings 132x and 132y (opening 132y is not shown in FIG. 12) each of a predetermined shape. The plane shapes of the openings 132x and 132y correspond to those of the top pole tip 12a and the magnetic path connection portion 12b to be formed in later steps, respectively.

In this case, since a photoresist film for forming the photoresist pattern 132a is formed on a flat face, different from the case of forming a photoresist film on an underlayer including an inclined area, reflection light which is reflected in the oblique or lateral direction by the surface of the electrode film (seed layer) hardly occurs at the time of exposure. Consequently, a pattern deformation due to expansion, reduction, or the like of an exposed area is suppressed and, particularly, a very narrow area 132x(1) in the opening 132x can be formed with high precision. Since the inorganic material having relatively low reflectance such as alumina is used as the material of the first mask precursor layer 122a, the occurrence itself of reflection light reflected by the surface of the first mask precursor layer 122a can be suppressed at the time of exposure. From this point of view as well, the invention can contribute to higher precision in formation of the opening 132x. The minimum width of the very narrow area 132x(1) which can be formed in such a case (hereinbelow, also simply called "formable limit width") is about 0.3 μm as described above. In the case of making the width narrower than 0.3 μm, the area becomes extremely narrow with respect to the thickness (for example, 1 μm) of the photoresist film, and the very narrow area 132x(1) cannot be formed according to the design dimension. In the case of forming the photoresist pattern 132a, it is not always necessary to use photolithography as in the above case. A photoresist film may be selectively etched by, for example, RIE or ion milling to be patterned.

Figure 13:
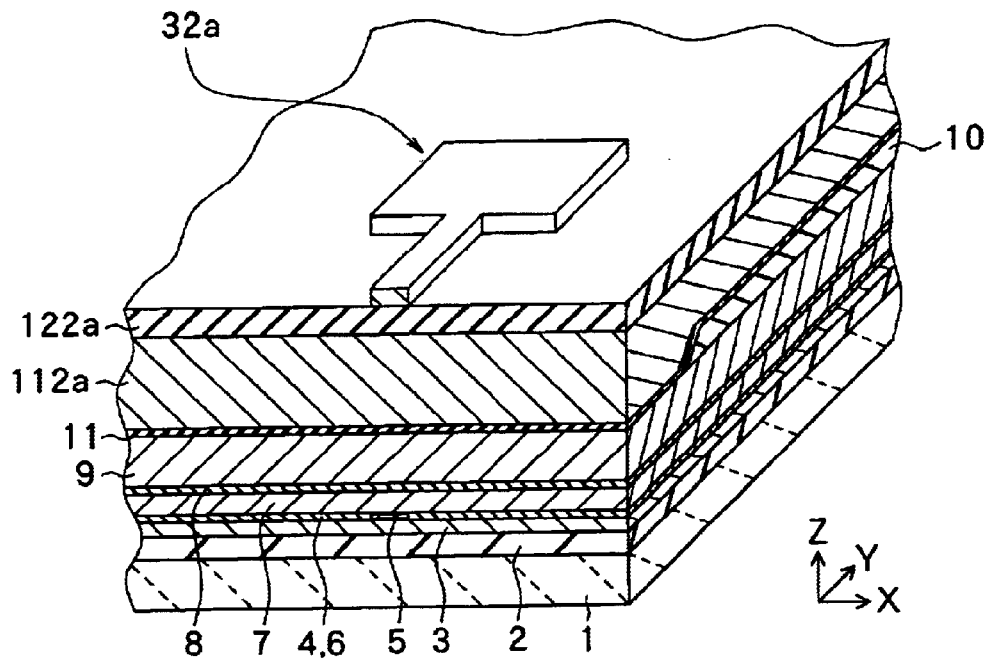
FIG. 13 is a perspective view corresponding to the cross sections of FIGS. 4A and 4B.

A plating film made of, for example, Permalloy, is grown in thickness of about 0.5 to 0.8 μm in the areas of the openings 132x and 132y by frame plating using the above electrode film as a seed layer and using the photoresist pattern 132a as a frame. After that, the photoresist pattern 132a is removed. In such a manner, as shown in FIGS. 4A and 4B and FIG. 13, a second mask 32a and another mask 32b (which is not shown in FIG. 13) made by the plating film are formed on the first mask precursor layer 122a. In this case, since the photoresist pattern 132a is formed with high precision, both the second mask 32a and the another mask 32b can be formed with high precision. Particularly, the portion corresponding to the very narrow area 132x(1) in the second mask 32a can be formed with high precision. As the material of the plating film for forming the second mask 32a and the like, except for Permalloy, for example, nickel copper (NiCu), iron nitride, cobalt iron (CoFe), nickel boron (NiB), nickel phosphor (NiP), and so forth can be used. The second mask 32a corresponds to an example of a "second mask" as a "metal film pattern" made by the plating film in the invention.

Figure 5A:
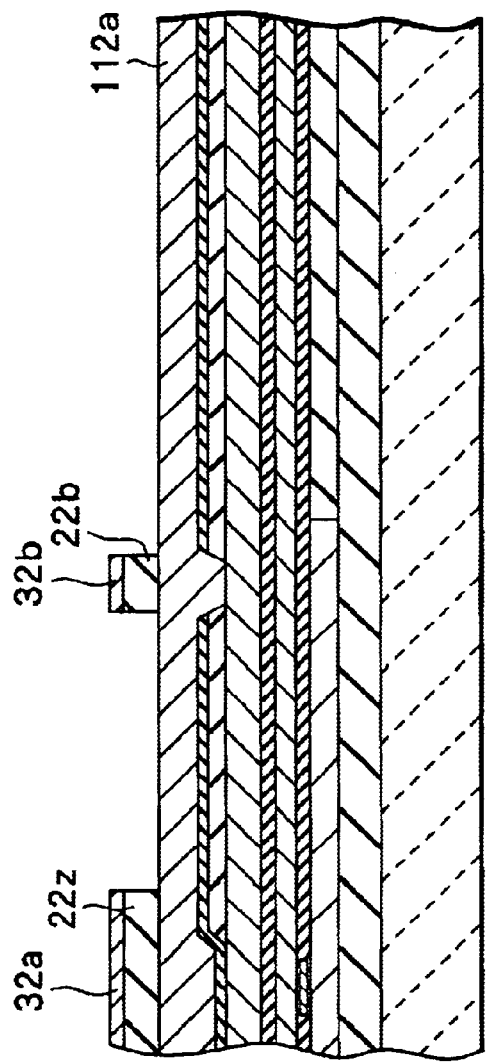
Figure 14:
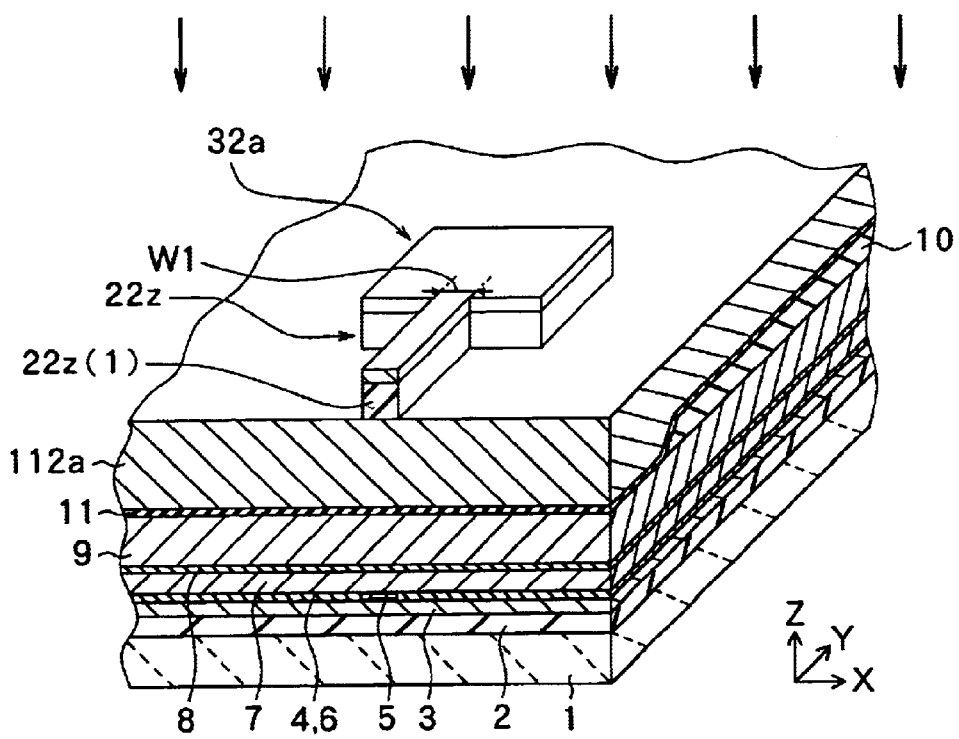
FIG. 14 is a perspective view corresponding to the cross sections of FIGS. 5A and 5B.

As shown in FIGS. 5A and 5B and FIG. 14, by using the second mask 32a and the another mask 32b, the first mask precursor layer 122a is selectively etched by, for example, RIE, thereby forming a mask precursor pattern 22z and another mask 22b (which is not shown in FIG. 14) made of alumina. By the etching process, the area except for the areas in which the second mask 32a and the another mask 32b are formed, respectively, in the first mask precursor layer 122a (refer to FIGS. 4A and 4B and FIG. 13) is selectively removed. The area in the first mask precursor layer 122a is etched, simultaneously, the second mask 32a itself and the another mask 32b itself are also etched, and the thickness of each of the second mask 32a and the another mask 32b is reduced. In the embodiment, the case where the second mask 32a is residue on the first mask 22a even after the etching process for forming the first mask 22a will be described. The invention, however, is not limited to the case but the second mask 32a may be completely removed.

At the time of performing the etching process by RIE, for example, the processing temperature is set in a range from 50 degrees to 300 degrees, and an etching gas obtained by adding hydrogen ($H_2$), oxygen ($O_2$), nitrogen ($N_2$), argon (Ar), and so forth to at least one of chlorine ($Cl_2$), boron trichloride ($BCl_3$), hydrogen chloride (HCl), carbon tetrafluoride ($CF_4$), sulfur hexafluoride ($SF_6$), and boron tribromide ($BBr_3$) is used. By employing such parameters, the etching process by RIE can be performed in a short time. Especially, an etching gas used to etch the first mask precursor layer 122a by RIE preferably contains at least one of chlorine and boron trichloride.

Figure 15:
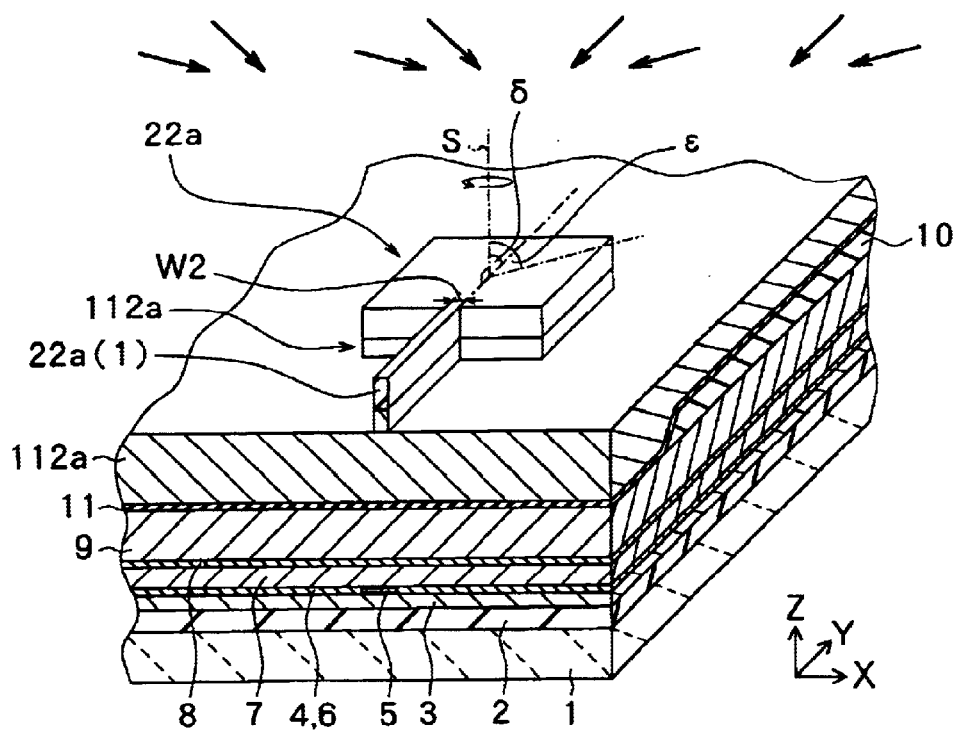
FIG. 15 is a perspective view corresponding to the cross sections of FIGS. 6A and 6B.

As shown in FIGS. 6A and 6B and FIG. 15, the mask precursor pattern 22z (which is not shown in FIGS. 6A and 6B and FIG. 15 but is shown in FIGS. 5A and 14) is irradiated with an ion beam diagonally, thereby being subjected to the etching process (ion milling) so as to form a first mask 22a. In this case, the etching process is performed, for example, while rotating a fixing stand (not shown) for fixing the substrate 1 by using the perpendicular S to a plane parallel to the extending direction of the top pole tip precursor layer 112a as a rotation axis. In the etching process, simultaneously, a layer near the surface of the top pole tip precursor layer 112a in the area which is not covered with the first mask 22a and the another mask 22b (which is not shown in FIGS. 6A and 6B and FIG. 15) is selectively etched down by about 0.5 μm and the second mask 32a over the first mask 22a is etched and removed. By the etching process, the width W2 of a portion 22a(1) of the first mask 22a is narrowed with high precision, and becomes narrower than the width W1 (refer to FIG. 14) of a portion 22z(1) of the mask precursor pattern 22z.

In the case of performing an etching process by ion milling, for example, the irradiation angle of an ion beam in the first half and that of the latter half of the process are made different from each other. Specifically, for example, in the first half, an ion beam is irradiated from a direction at which an angle δ inclined from the perpendicular S is small (for example, angle δ=about plus or minus 15 degrees of 45 degrees). In the latter half, an ion beam is irradiated from a direction at which an angle ε inclined from the perpendicular S is large (for example, angle ε=about plus or minus 15 degrees of 75 degrees). The irradiation of the ion beam in the first half mainly contributes to an etching process in the vertical direction, that is, a process of etching down the top pole tip precursor layer 112a. On the other hand, the irradiation of the ion beam in the latter case mainly contributes to an etching process in the width direction, that is, a process of narrowing the portion 22z(1) of the mask precursor layer 22z (formation of the first mask 22a). As described above, by changing the irradiation angle of an ion beam during the etching process, the irradiation state of the ion beam in the etching area is optimized and processes in both the width and depth directions can be performed with high precision in a short time.

As described above, the second mask 32a and the another mask 32b are removed and do not remain by completion of the etching process by ion milling. Consequently, when the top pole tip precursor layer 112a is patterned by RIE with the first mask 22a and the like in a later process, an increase in width due to re-adhesion of an etching product which is produced when the residue second mask 32a is etched to the side walls of the first mask 22a and the top pole tip precursor layer 112a can be avoided.

Figure 16:
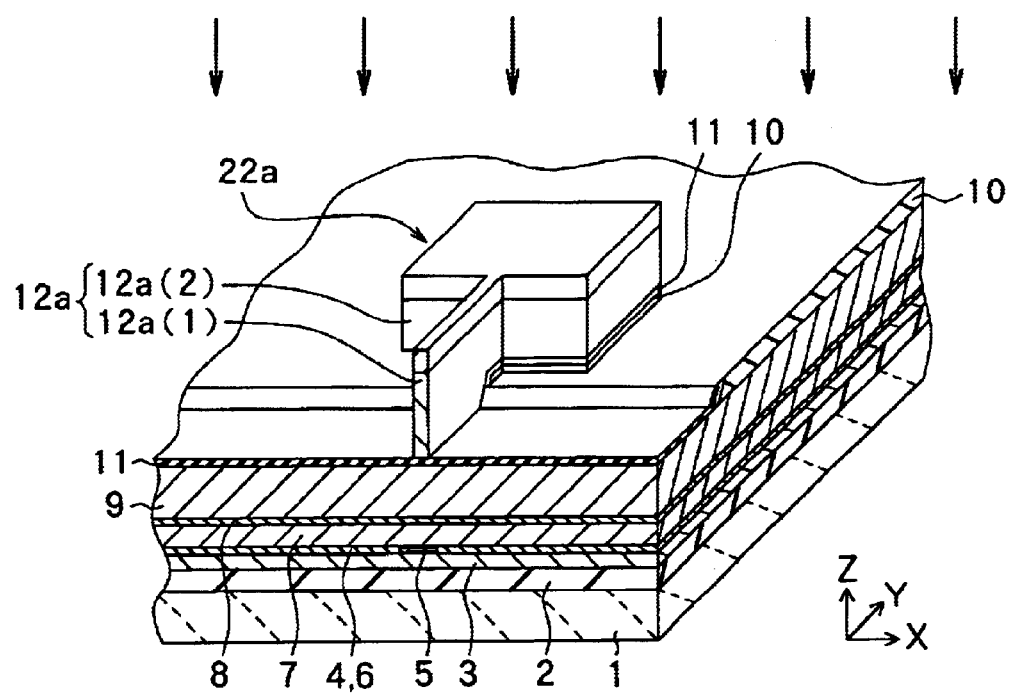
FIG. 16 is a perspective view corresponding to the cross sections of FIGS. 7A and 7B.
Figure 19:
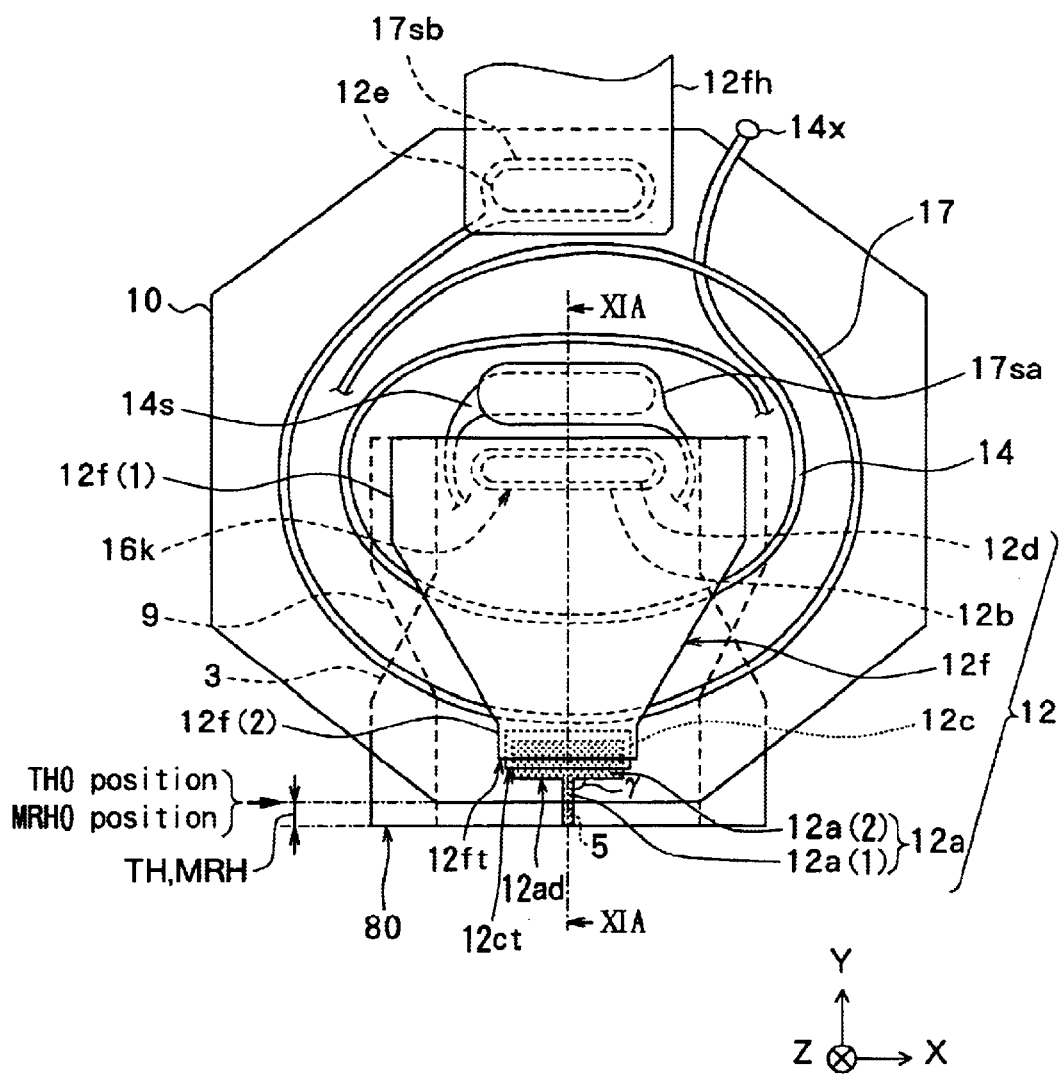
FIG. 19 is a plan view showing the structure of the thin film magnetic head according to the first embodiment of the invention.

By selectively etching and patterning the top pole tip precursor layer 112a by RIE with the first mask 22a, as shown in FIGS. 7A and 7B and FIG. 16, the top pole tip 12a made of iron nitride is selectively formed in a part of the area on the write gap layer 11 and a part of the area on the insulating film pattern 10. By the etching process, the area (except for the portion which becomes the magnetic path connection portion 12b) other than the area of forming the first mask 22a in the top pole tip precursor layer 112a (which is not shown in FIGS. 7A and 7B and FIG. 16) is selectively removed. At the time of forming the top pole tip 12a, simultaneously, the another mask 22b is used and the magnetic path connection portion 12b (not shown in FIG. 16) is formed in the opening 10k. The top pole tip 12a and the magnetic path connection portion 12b construct a part of the top pole 12. The top pole tip 12a has a plane shape as shown in FIG. 19 which will be described hereinlater, and includes a front end portion 12a(1) having an uniform width which specifies the recording track width on a recording medium (not shown) and a rear end portion 12a(2) having a width wider than that of the front end portion 12a(1). The top pole tip 12a corresponds to an example of a "first magnetic layer portion" in the invention, the front end portion 12a(1) corresponds to an example of a "first magnetic pole" in the invention, and the rear end portion 12a(2) corresponds to an example of a "expanded portion" in the invention.

In the case of etching the top pole tip precursor layer 112a, for example, a part corresponding to the above-described area in each of the insulating film pattern 10 and the write gap layer 11 is etched. The invention is not limited to such a case. It is also possible to adjust the etching parameters and etch only the top pole tip precursor layer 112a. By using iron nitride, amorphous alloy (iron cobalt zirconium oxide alloy), and so forth as the material of the top pole tip precursor layer 112a, partial expansion in width of the non-etched portion due to re-adhesion of the etching product to the walls of the non-etched portion or partial reduction in width of the non-etched portion due to excessive etching can be avoided. Consequently, particularly, the front end portion 12a(1) of the top pole tip 12a can be formed with high precision.

In the case of etching the top pole tip precursor layer 112a by RIE, particularly, for example, it is preferable to set the processing temperature within the range from 50 degrees to 300 degrees, more particularly, the range from 150 degrees to 250 degrees. As an etching gas, for example, it is preferable to use at least one of chlorine, boron trichloride, and hydrogen chloride, more preferably, chlorine. In the case of using chlorine, it is preferable to set the supply amount to, for example, 100 to 200 ml/min. The first mask 22a may be left as the residue or may be removed by the time formation of the top pole tip 12a is completed (refer to FIGS. 7A and 7B and FIG. 16). By using the method as described above, the top pole tip 12a can be formed with high precision in a short time. The bottom pole 9 can be also formed with high precision in a short time by using the method similar to that of the top pole tip 12a.

As shown in FIG. 8B and FIG. 17, for example, with parameters similar to those of the case where the top pole tip 12a is formed, by using the first mask 22a and a photoresist film (not shown) selectively formed in an area rearward of the front end of the insulating film pattern 10 as a mask, both a part of the write gap layer 11 and a part of the bottom pole 9 are selectively etched by RIE by about 0.5 μm. By the etching process, in the write gap layer 11 and the bottom pole 9, the area except for the part corresponding to the forward portion (the portion on the front side with respect to the position of the front end of the insulating film pattern 10) of the front end portion 12a(1) in the top pole tip 12a is selectively removed, thereby forming a pole tip portion 100 having the trim structure. The pole tip portion 100 is constructed by the front end portion 12a(1) of the top pole tip 12a, a portion (9F) corresponding to the front end portion 12a(1) in the bottom pole 9, and a part of the write gap layer 11 sandwiched by the front end portion 12a(1) and the portion 9F. Those portions have almost the same width. By performing the etching process of RIE, the pole tip portion 100 can be formed with high precision in a short time. Particularly, in the case of conducting the etching process of RIE to form the pole tip portion 100, it is preferable to use, for example, an etching gas containing about 20 to 40 ml/min of chlorine and about 60 to 80 ml/min of boron trichloride.

Even when the first mask 22a is etched and dissipated during the etching process of RIE, it is not a problem. In such a case, the top pole tip 12a itself functions as an etching mask for the lower layer area (the write gap layer 11 and the bottom pole 9). Since the thickness of the top pole tip 12a is reduced by the etching, it is preferable to set the top pole tip 12a to be thick in consideration of the reduction amount. The portion 9F corresponds to an example of a "second magnetic pole" in the invention.

Subsequently, as shown in FIG. 8A, an insulating film 13 made of, for example, alumina is formed on the whole surface in thickness of about 0.3 to 0.5 μm.

As shown in FIG. 8A, a thin film coil 14 as a first layer for an inductive recording head made of copper (Cu) or the like is selectively formed in thickness of about 1.0 to 2.0 μm by, for example, electrolytic plating on the flat insulating film 13 in the area (except for the area of the magnetic path connection portion 12b) rearward of the area in which the top pole chip 12a is provided. The thin film coil 14 has, for example, the structure of a spiral shape in plan view as shown in FIG. 19 which will be described hereinlater. In FIG. 8A, only a part of the thin film coil 14 is shown. In the case of forming the thin film coil 14, simultaneously, for example, a coil connection portion 14s is formed integrally with the thin film coil 14 on the insulating film 13 at the inner terminating end of the thin film coil 14. The coil connection portion 14s is used to electrically connect the thin film coil 14 to a coil connection portion 17sa (refer to FIG. 10A) which will be formed in a later process. In the case of forming the thin film coil 14, for example, the front end in the outermost peripheral part of the thin film coil 14 is positioned on the rear side of the front end position of the insulating film pattern 10 by about 2.0 to 3.0 μm. The thin film coil 14 in the first layer corresponds to a "first thin film coil layer" in the invention.

As shown in FIG. 8A, a material which fluidizes when being heated, for example, an organic insulating material such as photoresist is deposited in a predetermined pattern in and around the spaces among the turns of the thin film coil 14 (including the coil connection portion 14s) by a high-precision photolithography process. At the time of forming the insulating film 15, a heat treatment is carried out on the photoresist at a temperature of, for example, about 200 degrees so that the photoresist fluidizes to fill the spacing in the turns of the thin film coil 14. When the insulating film 15 is formed, the insulating film 15 may not cover the top faces of the thin film coil 14 and the thin film coil connection portion 14s (refer to FIG. 8A) or may cover the top faces.

Subsequently, for example, an alumina layer is formed on the whole surface in thickness of about 3.0 to 4.0 μm by sputtering so as to bury the uneven structure area constructed by the top pole tip 12a, magnetic path connection portion 12b, thin film coil 14, coil connection portion 14s, and so forth. After that, as shown in FIGS. 9A and 9B, the whole surface of the alumina layer is polished by, for example, the CMP to form an insulating film 16 burying the thin film coil 14 or the like. The polishing process in this case is performed until both of the top pole tip 12a and the magnetic path connection portion 12b are exposed. The surface of alumina is polished so that the thickness of the polished top pole tip 12a becomes, for example, about 1.5 to 2.5 μm. By using an inorganic insulating material such as alumina as the material of the insulating film 16, different from the case of using a soft insulating material such as photoresist, the polishing face of a CMP table can be prevented from being dulled and the polished surface can be formed more smoothly. Each of the insulating films 15 and 16 corresponds to an example of a "first insulating layer portion" in the invention. The flat face formed by the polishing process corresponds to an example of a "first flat face" in the invention.

Figures 10A, 10B:
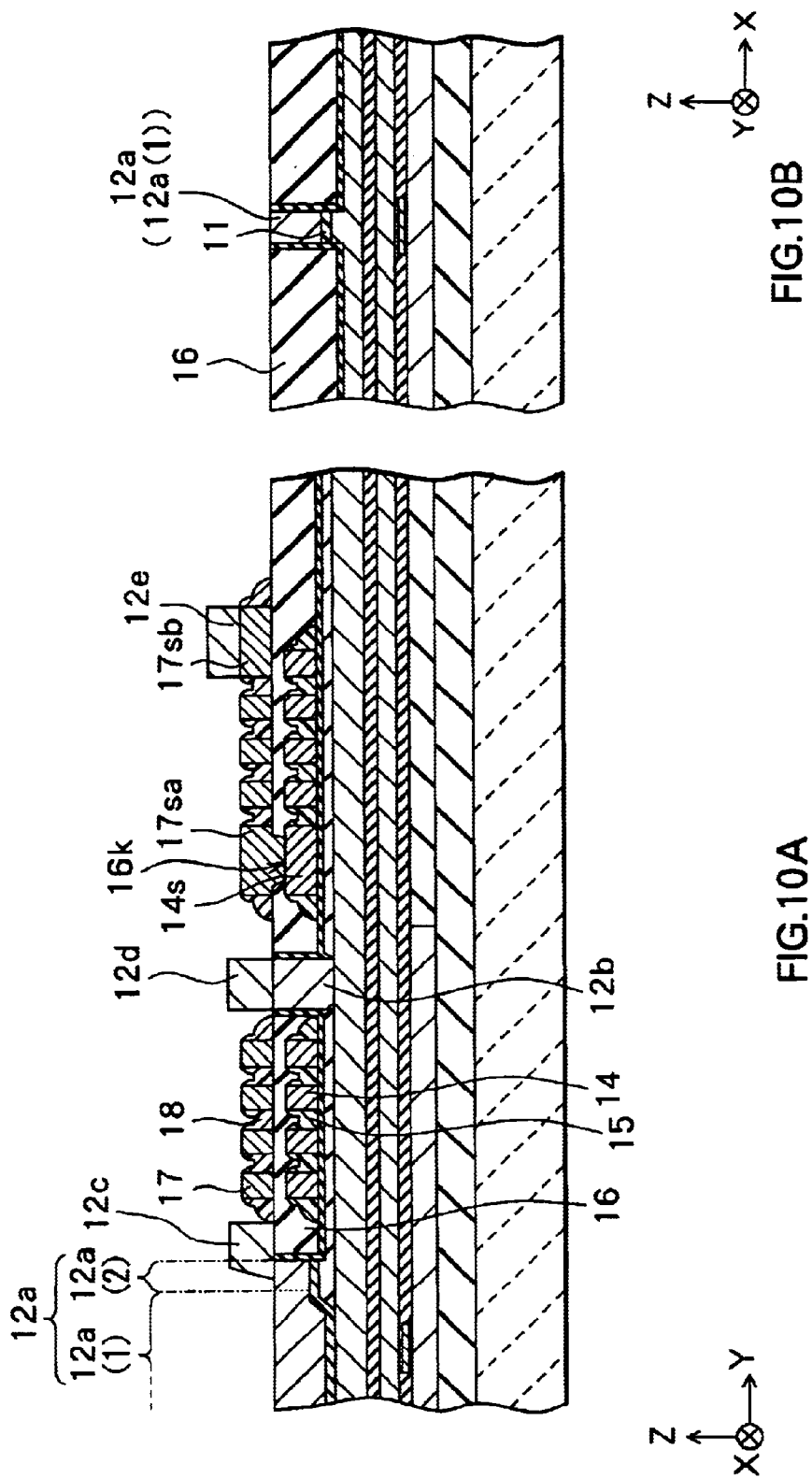
FIGS. 10A and 10B are cross sections for explaining a process subsequent to FIGS. 9A and 9B, respectively.
Figures 11A, 11B:
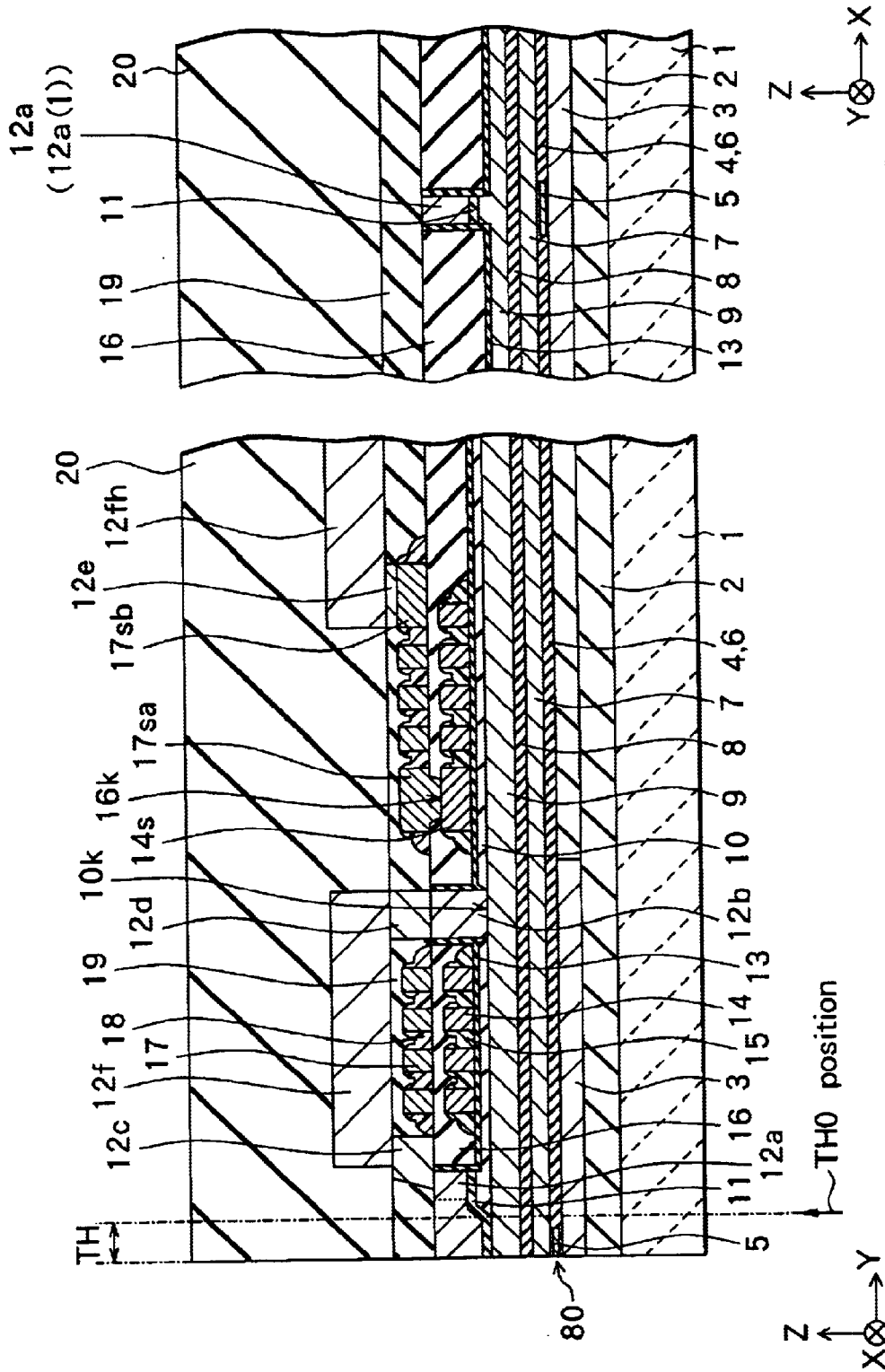
FIGS. 11A and 11B are cross sections for explaining a process subsequent to FIGS. 10A and 10B, respectively.

As shown in FIGS. 10A and 10B, the insulating film 16 covering the coil connection portion 14s is partially etched by, for example, RIE or ion milling to form an opening 16k for connecting the coil connection portion 14s and the coil connection portion 17sa formed in a later process.

As shown in FIGS. 10A and 10B, on the planarized insulating film 16 on the thin film coil 14, a thin film coil 17 made of copper (Cu) or the like as a second layer is selectively formed in thickness of about 1.0 to 2.0 μm by electrolytic plating in a manner similar to the case of forming the thin film coil 14 as the first layer. The thin film coil 17 has a plane structure similar to that of the thin film coil 14. At the time of forming the thin film coil 17, for example, the coil connection portion 17sa is simultaneously formed on the coil connection portion 14s at the internal terminating end and an interconnection portion 17sb is formed on the insulating film 16 at the outer terminating end. The coil connection portion 17sa and the interconnection portion 17sb are integrated with the thin film coil 17. The thin film coils 14 and 17 are electrically connected to each other via the coil connection portions 14s and 17sa in the opening 16k and are also electrically connected to the interconnection portion 17sb. The thin film coil 17 as the second layer corresponds to an example of a "second thin film coil layer" in the invention, and the interconnection portion 17sb corresponds to an example of a "first connection pattern" in the invention.

As shown in FIGS. 10A and 10B, an insulating film 18 is selectively formed between and around the turns of the thin film coil 17 (including the coil connection portion 17sa and the interconnection portion 17sb) by using the material and method similar to those of the case of the insulating film 15. In the case of forming the insulating film 18, the insulating film 18 may not cover the top faces of the thin film coil 17, the coil connection portion 17sa, and the interconnection portion 17sb (refer to FIG. 10A) or may cover the top faces.

Subsequently, as shown in FIG. 10A, on a planarized surface of the insulating film 16 and the rear end portion 12a(2) of the top pole tip 12a, for example, by using a material and a forming method similar to those of the case of forming the top pole tip 12a and the magnetic path connection portion 12b, an intermediate connection portion 12c constructing a part of the top pole 12 is selectively formed in thickness of about 2.0 to 3.0 μm. The intermediate connection portion 12c has, for example, a plane shape as shown in FIG. 19 which will be described hereinlater. The structural characteristics of the intermediate connection portion 12c will be described hereinlater. The intermediate connection portion 12c is partially overlapped with and in contact with a part of the rear end portion 12a(2), and they are magnetically coupled to each other.

At the time of forming the intermediate connection portion 12c, simultaneously, a magnetic path connection portion 12d as a part of the top pole 12 is formed on the magnetic path connection portion 12b, and an intermediate connection pattern 12e is formed on the interconnection portion 17sb. At this time, the thin film coil 17 is covered with the insulating film 18, so that the thin film coil 17 is prevented from being damaged by an etching process or the like on formation of the intermediate connection portion 12c or the like. The intermediate connection pattern 12e is used to electrically connect the thin film coils 14 and 17 to a coil interconnection 12fh (refer to FIG. 11A) to be formed in a later process. The material and method for forming the magnetic path connection portion 12d and the intermediate connection pattern 12e are similar to those of the case of the top pole tip 12a or the like. By using a method similar to that in the case of forming the top pole tip 12a or the like as a method of forming the intermediate connection portion 12c, magnetic path connection portion 12d, and intermediate connection pattern 12e, the portions can be formed with high precision in a short time. In the case of forming the intermediate connection portion 12c, preferably, the front end of the intermediate connection portion 12c is positioned, for example, rearward of the position of the front end of the insulating film pattern 10 by about 0.5 to 1.0 μm. For instance, the front end of the intermediate connection portion 12c is preferably inclined. The front end of the intermediate connection portion 12c has therefore a taper. The intermediate connection portion 12c corresponds to an example of a "third magnetic layer portion" in the invention. The intermediate connection pattern 12e corresponds to an example of a "second connection pattern" in the invention. Each of the thin film coils 14 and 17, coil connection portions 14s and 17sa, interconnection portion 17sb, and intermediate connection pattern 12e corresponds to an example of a "thin film coil portion" in the invention.

An insulating layer made of alumina is formed in thickness of about 3.0 to 4.0 μm on the whole surface and, after that, the entire surface of the alumina insulating layer is polished by, for example, CMP so as to be planarized, thereby forming an insulating film 19 which buries the thin film coil 17 or the like. The surface of the alumina insulating layer in this case is polished until the intermediate connection portion 12c, magnetic path connection portion 12d, and intermediate connection portion 12e are exposed. The insulating films 18 and 19 correspond to an example of a "second insulating layer portion" in the invention. Each of the insulating films 15, 16, 18, and 19 corresponds to an example of an "insulating layer" of the invention. The planarized face formed by the polishing process corresponds to an example of a "second planarized face" in the invention.

As shown in FIG. 11A, in an area extending from the magnetic path connecting portion 12d to the intermediate connection portion 12c on the planarized area, a top yoke 12f as a part of the top pole 12 is selectively formed in thickness of about 2.0 to 3.0 μm. The top yoke 12f has, for example, a plane shape as shown in FIG. 19 which will be described hereinlater and includes a yoke portion 12f(1) extending on the thin film coils 14 and 17 and a connection portion 12f(2) extending so as to partially overlap a part of the intermediate connection portion 12c in front of the yoke portion 12f(1). The structural characteristics of the top yoke 12f will be described hereinlater. The rear portion of the top yoke 12f is magnetically coupled to the bottom pole 9 via the magnetic path connection portions 12b and 12d via the opening 10k. The front portion of the top yoke 12f is also magnetically coupled to the top pole tip 12a via the intermediate connection portion 12c.

On formation of the top yoke 12f, a coil interconnection 12fh is formed on the surface of a region from the intermediate connection pattern 12e to an external circuit (not shown). The coil interconnection 12fh is used to electrically connect the intermediate connection pattern 12e to the external circuit (not shown). The material and method for forming the top yoke 12f and the coil interconnection 12fh are similar to those of the top pole tip 12a and the like. By using such a method, the top yoke 12f and the coil interconnection 12fh can be also formed with high accuracy in a short time. The top yoke 12f is formed so that, for example, its front end is positioned rearward of the position of the upper end in the front end face of the intermediate connection portion 12c, and the position of the rear end almost coincides with the position of the rear end of the magnetic path connection portions 12b and 12d. The stereoscopic structure around the connection portion 12f(2) at this time is as shown in FIG. 18. The top yoke 12c corresponds to an example of a "second magnetic layer portion" in the invention, and the coil interconnection 12fh corresponds to an example of a "conductive layer pattern" in the invention. The top pole 12 constructed by the top pole tip 12a, intermediate connection portion 12c, magnetic path connection portions 12b and 12d, and top yoke 12f corresponds to an example of a "first magnetic layer" in the invention.

As shown in FIGS. 11A and 11B, an overcoat layer 20 made of alumina or the like is formed so as to cover the whole surface. Finally, an air bearing surface 80 of the recording head and the reproducing head is formed by the mechanical process and the polishing process, thereby completing the thin film magnetic head.

<Structure of Thin Film Magnetic Head>

Referring now to FIG. 19, the structure of the thin film magnetic head according to the embodiment will now be described.

FIG. 19 is a plan view schematically showing the structure of the thin film magnetic head manufactured by the method of manufacturing the thin film magnetic head according to the embodiment. In FIG. 19, the insulating films 15, 16, 18 and 19, the overcoat layer 20 and the like are not shown. Only the outermost peripheral part is shown with respect to each of the thin film coils 14 and 17. Only the outline is shown with respect of the insulating film pattern 10. FIG. 11A is a cross section taken along line XIA—XIA of FIG. 19. The X, Y, and Z axes in FIG. 19 denote in a manner similar to FIGS. 1A and 1B to FIG. 18.

As shown in FIG. 19, the position of the front end of the insulating film pattern 10 is the position as a reference of determining the throat height (TH), that is, the throat height zero position (TH0). The throat height (TH) is specified as a length from the position (TH0) of the front end of the insulating film pattern 10 to the position of the air bearing surface 80. "MRH0" in FIG. 19 denotes the position of the rear end of the MR film 5, that is, the MR height zero position. The MR height (MRH) is a length from the MR height zero position to the position of the air bearing surface 80. For example, the throat height zero position (TH0) and the MR height zero position (MRH0) almost coincide with each other.

The top pole 12 is constructed by, for instance, the top pole tip 12a, the intermediate connection portion 12c, the magnetic path connection portions 12b and 12d, and the top yoke 12f which are separately formed. That is, the top pole 12 is an aggregate of those portions.

The top yoke 12f includes the yoke portion 12f(1) having a large area for housing a magnetic flux generated by the thin film coils 14 and 17 and a connection portion 12f(2) having a constant width narrower than that of the yoke portion 12f(1). For example, the rear portion of the yoke portion 12f(1) has almost constant width and the front portion is gradually narrowed toward the air bearing surface 80. The connection portion 12f(2) is wider than, for example, the intermediate connection portion 12c which will be described hereinlater. The invention is not limited to such a case. For example, the connection portion 12f(2) may be narrower than the intermediate connection portion 12c.

The intermediate connection portion 12c has, for example, a rectangle shape in plan view and is wider than the rear end portion 12a(2) of the top pole tip 12a which will be described hereinlater. The intermediate connection portion 12c may be narrower than the rear end portion 12a(2).

The top pole tip 12a includes, for example, the front end portion 12a(1) and the rear end portion 12a(2) in accordance with this order from the air bearing surface 80 side. Each of the portions has a rectangular shape in plan view. The front end portion 12a(1) has an almost uniform width over the entire area, which defines the recording track width at the time of recording. The rear end portion 12a(2) is wider than the front end portion 12a(1). That is, in the coupled portion between the front end portion 12a(1) and the rear end portion 12a(2), a step in the width direction is formed.

A step face 12ad on the rear end portion 12a(2) side in the step of the top pole tip 12a is positioned, for example, rearward of the TH0 position (or the MRH0 position). A front end face 12ct of the intermediate connection portion 12c is positioned, for example, rearward of the step face 12ad, and a front end face 12ft of the top yoke 12f is positioned, for example, rearward of the end face 12ct. That is, both the intermediate connection portion 12c and the top yoke 12f are disposed away from the air bearing surface 80. The positions of the intermediate connection portion 12c and the top yoke 12f are not always limited to the above case. For instance, the position of the end face 12ct may coincide with the position of the step face 12ad or both of the positions of the end faces 12ct and 12ft may coincide with the position of the step face 12ad. The center in the width direction of the top yoke 12f, that of the intermediate connection portion 12c, and that of the top pole tip 12a coincide with each other.

The angle γ at the corner where a side face of the front end portion 12a(1) and the step face 12ad in the top pole tip 12a cross each other is, for example, 90 degrees. The angle γ at the corner is not limited to 90 degrees but is preferably set in a range from 90 degrees to 120 degrees. By setting the angle y in the range, the flow of the magnetic flux entering from the rear end portion 12a(2) the front end portion 12a(1) can be made smooth. The top pole tip 12a can have the structural characteristics as described above when the portion corresponding to the corner in the first mask 22a (refer to FIGS. 6A and 6B and FIG. 15) used to form the top pole tip 12a has an angle similar to the above angle.

As shown in FIGS. 11A, 18, and 19, a part of the front side of the top yoke 12f is overlapped with and magnetically coupled to a part of the intermediate connection portion 12c. A part of the intermediate connection portion 12c is also overlapped with and magnetically coupled to a part of the rear end portion 12a(2) of the top pole tip 12a. On the other hand, as shown in FIG. 11A and FIG. 19, a part of the rear side of the top yoke 12f is also magnetically coupled to the bottom pole 9 via the magnetic path connection portions 12b and 12d through the opening 10k. That is, by connecting the top pole 12 (top pole tip 12a, intermediate connection portion 12c, magnetic path connection portions 12b and 12d, and top yoke 12f) and the bottom pole 9, a propagation path of the magnetic flux, that is, a magnetic path is formed.

As shown in FIG. 19, each of the thin film coils 14 and 17 is a coil member having a spiral shape in plan view. The coil connection portion 14s and a terminal 14x are formed at the inner and outer terminating ends of the thin film coil 14, respectively and are integral with the thin film coil 14. The coil connection portion 17sa and the interconnection portion 17sb are formed at the inner and outer terminating ends of the thin film coil 17, respectively, and are integral with the thin film coil 17. The thin film coils 14 and 17 are electrically connected to each other via the coil connection portions 14s and 17sa. The intermediate connection pattern 12e is formed on the interconnection portion 17sb, and the thin film coils 14 and 17 and the coil interconnection 12fh are electrically connected to each other via the coil connection portion 17sb and the intermediate connection pattern 12e. Both the terminal 14x and the rear end (not shown) of the coil interconnection 12fh are connected to an external circuit (not shown). A current can be passed to the thin film coils 14 and 17 by the external circuit.

<Action of the Thin Film Magnetic Head>

The action of the thin film magnetic head according to the embodiment will be described referring to FIGS. 11A, 18 and 19.

The basic operation of the thin film magnetic head, that is, an operation of recording data onto a recording medium and an operation of reproducing data from the recording medium will be briefly described.

In the thin film magnetic head according to the embodiment, when a current is passed to the thin film coils 14 and 17 via the external circuit (not shown) at the time of recording information, a magnetic flux is accordingly generated. The magnetic flux generated at this time propagates the top yoke 12f from the yoke portion 12f(1) to the connection portion 12f(2) and further propagates via the intermediate connection portion 12c magnetically coupled to the top yoke 12f and the rear end portion 12a(2) of the top pole tip 12a to the front end portion 12a(1). The magnetic flux propagated to the front end portion 12a(1) arrives at the front end of the air bearing surface 80 side to generate a signal magnetic field for recording on the outside of the write gap layer 11. By the signal magnetic field, the magnetic recording medium can be partially magnetized so as to record information.

On the other hand, upon reproduction, a sense current is passed to the MR film 5 in the reproducing head. A resistance value of the MR film 5 changes according to a reproduction signal magnetic field from the magnetic recording medium. By detecting the change in resistance on the basis of a change in the sense current, information recorded on the magnetic recording medium can be read.

<Action and Effect in Method of Manufacturing Thin Film Magnetic Head>

Referring now to FIGS. 12 to 17, the characteristic action and effect of the thin film magnetic head according to the embodiment will be described.

In the embodiment, by using the second mask 32a (refer to FIG. 13) made by a plating film formed by frame plating, the first mask precursor layer 122a is patterned by the RIE, thereby forming the mask precursor pattern 22z (refer to FIG. 14). After that, the portion 22z(1) of the mask precursor pattern 22z is partially etched by ion milling, thereby forming the first mask 22a (refer to FIG. 15). By the ion milling, the width of the portion 22a(1) of the first mask 22a is narrowed with high precision, and the width W2 is narrower than the width W1 of the portion 22z(1) of the mask precursor pattern 22z. The formable limit width of the portion 22z(1) in the mask precursor pattern 22z depends on the formable limit width of the very narrow area 132x(1) of the frame (photoresist pattern 132a, refer to FIG. 12) for forming the second mask 32a as described above and is about 0.3 μm. Specifically, after forming the mask precursor layer 22z, the mask precursor layer 22z is subjected to an etching process by ion milling, the width of the portion 22a(1) of the first mask 22a formed finally can be narrowed as compared with a conventional one. More specifically, the width of the portion 22a(1) can be narrowed to 0.3 μm or less. By using the first mask 22a formed by such a method, the width of the front end portion 12a(1) of the top pole tip 12a and also the width of the pole tip portion 100 can be narrowed with high precision (for example, 0.3 μm or less) (refer to FIGS. 16 and 17).

In the embodiment, the first mask 22a is formed by the etching process of ion milling and, simultaneously, the surface layer portion except for the area in which the first mask 22a is formed in the top pole tip precursor 112a is etched down. The above portion (surface layer portion) in the top pole tip precursor 112a is to be etched by RIE for forming the top pole tip 12a in a later step. Consequently, the etching amount at the time of performing the etching process of RIE in a later step may be small. The time required for the etching process of RIE in a later process can be therefore shortened.

As described above, in the method of manufacturing the thin film magnetic head according to the embodiment, the mask precursor pattern 22z is etched by ion milling, thereby forming the first mask 22a. Consequently, different from the case where the etching process is not performed, the portion 22a(1) of the first mask 22a can be narrowed with high precision. By using the first mask 22a, the width of the front end portion 12a(1) of the top pole tip 12a can be similarly narrowed with high precision.

In the embodiment, the first mask 22a is formed by the etching process of ion milling and, simultaneously, the area except for the area in which the first mask 22a is formed in the top pole tip precursor layer 112a is etched. In a later process, therefore, the time required for the etching process of RIE at the time of forming the top pole tip 12a can be shortened.

In the embodiment, at the time of performing the etching process of ion milling, the irradiation angle of an ion beam is changed during the process so as to be optimized. Consequently, the process of forming the first mask 22a (that is, narrowing the mask width) and the process of etching down the top pole tip precursor layer 112a can be performed with high precision in a short time.

In the embodiment, as a method of forming the first mask precursor layer 122a, CVD, particularly, LP-CVD at a low pressure of 100 Pa or less is used. Consequently, the first mask precursor layer 122a is densely formed. As a result, the first mask 22a is not easily etched in a later process (RIE process).

In the embodiment, at the time of performing an etching process of ion milling to form the first mask 22a, the second mask 32a is also etched so as not to be remained by the time the etching process is completed. Consequently, different from the case where the second mask 32a remains, the top pole tip 12a can be formed with high precision.

In the embodiment, after forming the top pole tip precursor layer 112a, its surface is polished to be planarized. The very narrow area 132x(1) (refer to FIG. 12) in the photoresist pattern 132a for forming the second mask 32a can be therefore formed with high precision.

In the embodiment, as the material of the first mask precursor layer 122a, an inorganic material having relatively low reflectance such as alumina is used. Consequently, reflection light by the underlayer (first mask precursor layer 122a) in the photolithography process for forming the photoresist pattern 132a can also be suppressed. With respect to this point as well, the invention can contribute to improve the accuracy of forming the very narrow area 132x(1) in the photoresist pattern 132a.

In the embodiment, at the time of forming the top pole tip 12a, the RIE is used as a method of patterning the top pole tip precursor layer 112a. The top pole tip 12a can therefore be formed in a much shorter time as compared with the conventional case using ion milling. Such action and effect can also be obtained in the case of forming the other magnetic layer portion (bottom pole 9, intermediate connection portion 12c, magnetic path connection portions 12b and 12d, and top yoke 12f) by a method similar to that in the case of forming the top pole tip 12a. Consequently, the time required to manufacture the whole thin film magnetic head can be shortened. By forming the pole tip portion 100 by the RIE as described above, the processing time can be shortened as compared with that in the case of processing the front end portion 12a(1) and the portion 9F by ion milling and selectively removing the write gap layer 11 by the RIE.

In the embodiment, at the time of forming the mask precursor pattern 22z by the etching process of RIE at least, one of chlorine ($Cl_2$), boron trichloride ($BCl_3$), hydrogen chloride (HCl), carbon tetrafluoride ($CF_4$), sulfur hexafluoride ($SF_6$), and boron tribromide ($BBr_3$) is selected as an etching gas and the temperature at the time of processing is adjusted so as to be in a range from 50 degrees to 300 degrees. Consequently, the etching parameters are optimized and the mask precursor pattern 22z can be formed with higher accuracy in a shorter time.

In the embodiment, when each of the magnetic layer portions such as the top pole tip 12a and the pole tip portion 100 is formed by the etching process of RIE, as an etching gas, at least one of chlorine ($Cl_2$), boron trichloride ($BCl_3$), and hydrogen chloride (HCl) is selected and the temperature at the time of processing is adjusted to be within the range from 50 degrees to 300 degrees. By optimizing the etching parameters, the magnetic layer portions such as the top pole tip 12a and the pole tip portion 100 can be formed with higher precision in a short time.

In the embodiment, as the material of the top pole tip precursor layer 112a, iron nitride, amorphous alloy (iron cobalt zirconium oxide alloy), and so forth is used. The top pole tip precursor layer 112a made of such a material is etched by RIE, thereby forming the top pole tip 12a. Consequently, different from the conventional case where a plating film made of Permalloy is etched by ion milling, the top pole tip 12a can be formed with high precision. Such action and effect can also be obtained in the case of forming a magnetic layer portion other than the top pole tip 12a by using a similar material and method. As a result, as shown in FIG. 17, the pole width of the entire pole tip portion 100 becomes constant, so that stable recording characteristics can be obtained, and the invention can also be adapted to narrow the pole width for increasing the recording density. Particularly, by using iron nitride or the like having high saturated magnetic flux density as the material of the top pole 12 and the bottom pole 9, also in the case of making the width of the pole tip portion 100 very narrow, a magnetic flux saturation phenomenon can be prevented, and an excellent overwrite characteristic can be assured.

In the embodiment, an inorganic material such as alumina which is etched at low etch rate is used as a material of the first mask 22a used for patterning the top pole tip precursor layer 112a. Consequently, as compared with the case of using a soft material such as a photoresist film which is etched at high etch rate, the etch amount of the first mask 22a itself can be reduced, and as a result, the reduction in thickness of the top pole tip 12a formed finally can be suppressed. Such an effect can be produced similarly with respect to the magnetic path connection portion 12b or the like formed by using the another mask 22b made of alumina or the like.

In the embodiment, the mask precursor pattern 22z is formed by the etching process of RIE. Consequently, as compared with the case of using ion milling, the time required to form the mask precursor pattern 22z can be shortened. With this point as well, the invention can contribute to reduction in time of manufacturing the entire thin film magnetic head.

In the embodiment, as shown in FIGS. 10A and 10B and FIGS. 11A and 11B, the intermediate connection pattern 12e is disposed on the interconnection portion 17sb so that the level of the top face of the intermediate connection pattern 12e is higher than that of the top face of both the intermediate connection portion 12c and the magnetic path connection portion 12d. After covering the portions with alumina, when the surface of alumina is polished to form the insulating film 19, both the intermediate connection portion 12c and the magnetic path connection portion 12d and even the intermediate connection pattern 12e can be therefore exposed. Different from the case where the intermediate connection pattern 12e is not formed, in order to connect the interconnection portion 17sb and the coil interconnection 12fh, a process of removing a part of the insulating film 19 to form an opening becomes unnecessary. Moreover, the intermediate connection pattern 12e is formed in the same process as the intermediate connection portion 12c and the magnetic path connection portion 12d, a new process for forming the intermediate connection pattern 12e is not required. Therefore, the number of manufacturing steps can be reduced.

In the embodiment, as the material of the insulating films 15 and 18 filled between the turns of both the thin film coil 14 (including the coil connection portion 14s) and the thin film coil 17 (including the coil connection portion 17sa and the coil interconnection 17sb), an organic insulating material such as photoresist which fluidizes when heated is used. Consequently, different from the case of using an inorganic insulating material such as alumina which does not fluidize when heated, the spaces between the turns of the thin film coils 14, 17, and so forth can be filled with the material and the turns can be insulated from each other with reliability.

In the embodiment, as shown in FIGS. 7A and 7B and FIG. 16, when the top pole tip precursor layer 112a is selectively etched by RIE to form the top pole tip 12a, a part of the insulating film pattern 10 and a part of the write gap layer 11 are also etched, so that the level of the surface of the area where the thin film coil 14 is disposed is lower than the level of the under face of the rear end portion 12a(2) of the top pole tip 12a. Consequently, the insulating film 16 having a sufficient thickness exists on the thin film coil 14. Thus, the thin film coil 14 and the thin film coil 17 which will be formed in a later process can be insulated from each other with reliability.

In the embodiment, the angle of the portion corresponding to the corner portion where the side face of the front end portion 12a(1) of the top pole tip 12a and the step face 12ad cross each other in the first mask 22a is set in the range from 90 degrees to 120 degrees. The angle γ at the corner of the top pole tip 12a can also be set in the same range. The flow of the magnetic flux flowing from the rear end portion 12a(2) of the top pole tip 12a toward the front end portion 12a(1) can be smoothed.

In the embodiment, the portion around the front end of the insulating film pattern 10 is formed in the tapered face. The flow of the magnetic flux in the top pole tip 12a in the upper area of the tapered face can therefore be smoothed.

In the embodiment, the front end face of the intermediate connection portion 12c is formed in the tapered face, so that the flow of the magnetic flux flowing from the intermediate connection portion 12c to the top pole tip 12a can be smoothed.

In the embodiment, the intermediate connection portion 12c and the top yoke 12f are formed on the planarized face formed through the polishing process, so that both of them can be formed with high accuracy.

In the embodiment, the front end of each of the intermediate connection portion 12c and the top yoke 12f is positioned rearward of the air bearing face 80. It can be consequently avoided that the magnetic flux is emitted from the portions directly to the air bearing surface 80 side. Thus, occurrence of a side erase phenomenon can be prevented.

In the embodiment, the irradiation angle of the ion beam is changed once during the etching process of ion milling. The invention is not limited to the case. For example, the irradiation angle of the ion beam may be changed twice or more or may not be changed. The irradiation angle of the ion beam is not limited to the case as described in the foregoing embodiment (for example, about 45 degrees and 75 degrees) but can be arbitrarily set according to the etching state and the like.

In the embodiment, both the etching process (ion milling) for narrowing the width of the portion 22z(1) of the mask precursor pattern 22z to form the first mask 22a and the etching process (ion milling) for selectively etching down the top pole tip precursor layer 112a are performed. The invention is not limited to the embodiment but one of the processes may be performed as described hereinbelow.

In the case of performing only the etching process for forming the first mask 22a, after forming the first mask 22a by the etching process of ion milling, by using the first mask 22a, the top pole tip precursor layer 112a is patterned in a lump by RIE, thereby forming the top pole tip 12a. At the time of performing the etching process (ion milling), for example, it is preferable to emit an ion beam at an inclination angle of about plus or minus 15 degrees of 75 degrees in the width direction from the perpendicular S shown in FIG. 15. In such a case as well, the front end portion 12a(1) of the top pole tip 12a formed finally can be made very narrow with high precision.

In the case of performing only the etching process for selectively etching down the top pole tip precursor layer 112a, the top pole tip precursor layer 112a is selectively etched down by the etching process of ion milling and, after that, while using the mask precursor pattern 22z as a mask, the top pole tip 12a is formed by RIE in a manner similar to the former case. At the time of the etching process (ion milling) in this case, it is preferable to emit an ion beam at an inclination angle of, for example, about plus or minus 15 degrees of 45 degrees in the width direction from the perpendicular S shown in FIG. 15. In such a case, by performing the etching process of ion milling as a pre-treatment, the etching amount in the etching process by the RIE in a later process can be decreased, and the time required for the etching process can be shortened. Consequently, expansion of the etching width in the etching process by the RIE can be prevented for the following reason. When the time required for the etching process of RIE is too long, a re-adhesion phenomenon of an etching product occurs, and the etching width is widened.

In the embodiment, as the material of the magnetic layer for forming each of the magnetic layer portion of the thin film magnetic head, iron nitride, amorphous alloy (iron cobalt zirconium oxide alloy), and so forth is used. Alternately, other materials such as Permalloy may be used. In the case of using Permalloy as the material of the magnetic layer, preferably, nickel (Ni) in the composition is set to 45% or lower. By decreasing the ratio of the nickel in the composition as described above, re-deposition of an etching product in the etching process of RIE can be prevented.

Although the CVD is employed as the method of forming the first mask precursor layer 122a in the embodiment, the invention is not limited to the method but, for example, sputtering may be used. When the etch rates in both of the methods in the case of etching the top pole tip precursor layer 112a by the RIE with the first mask 22a (first mask precursor layer 122a) are considered, it is more preferable to use the CVD.

Although electrolyte plating is used to form the bottom shield layer 3 and the top shield layer 7 in the embodiment, the invention is not always limited to the method. For example, sputtering may be used to form both or one of the bottom shield layer 3 and the top shield layer 7. As the material in such a case, except for the above-described Permalloy, iron nitride may be used. By using a method similar to that in the case of the top pole tip 12a or the like, the portions can be formed with high precision in a short time. From this point of view as well, the invention can contribute to shorten the manufacturing time of the entire thin film magnetic head.

In the foregoing embodiment, the top shield layer 7 and the bottom pole 9 are formed as separate portions and the insulating film 8 is disposed between them. The invention is not limited to the arrangement but, for example, the insulating film 8 may not be disposed between the top shield layer 7 and the bottom pole 9. In such a case, the top shield layer 7 and the bottom pole 9 may be formed integrally as a single layer.

Although the front end portion 12a(1) of the top pole tip 12a constructing the pole tip portion 100 and the portion 9F of the bottom pole 9 are successively formed, the invention is not limited to the formation. For example, the portion 9F may be formed immediately after formation of the bottom pole 9.

In the embodiment, the photoresist is used as the material of the insulating films 15 and 18. The invention is not limited to the material, but a polyimide resin, SOG (Spin on glass), and so forth which fluidizes when heated like a photoresist may be used.

Although alumina is used as the material of the write gap layer 11 and sputtering is employed as the forming method in the embodiment, the invention is not limited to the material and method. The material of the write gap layer 11, may be alumina, an inorganic insulating material such as aluminum nitride (AlN), silicon oxide, or silicon nitride as an alternative to alumina, or a non-magnetic metal such as tantalum (Ta), tungsten titanium (WTi), or titanium nitride (TiN) may be used. As the method of forming the write gap layer 8, except for sputtering, CVD (Chemical Vapor Deposition) may be used. By forming the write gap layer 11 by using such a method, it can be suppressed that a pin hole or the like is contained in the gap layer, so that leakage of a magnetic flux via the write gap layer 11 can be avoided. Such an effect is useful, particularly, when the thickness of the write gap layer 11 is reduced.

In the embodiment, the coil connection portions 14s and 17sa are disposed at the inner terminating ends of the thin film coils 14 and 17, and the interconnection portion 17sb is provided at the outer terminating end of the thin film coil 17. The invention is not limited to the arrangement but, for example, the coil connection portions 14s and 17sa may be provided at the outer terminating ends and the interconnection portion 17sb may be provided at the inner terminating end. In such a case, in association with the change in the position of the interconnection portion 17sb, preferably, the positions of the intermediate connection pattern 12e and the coil interconnection 12fh are similarly changed.

<Modification 1-1>

In the embodiment, as shown in FIG. 17, the coupling position of the front end portion 12a(1) of the top pole tip 12a and the rear end portion 12a(2) is on the rear side of the position of the front end of the insulating film pattern 10.

Figure 20:
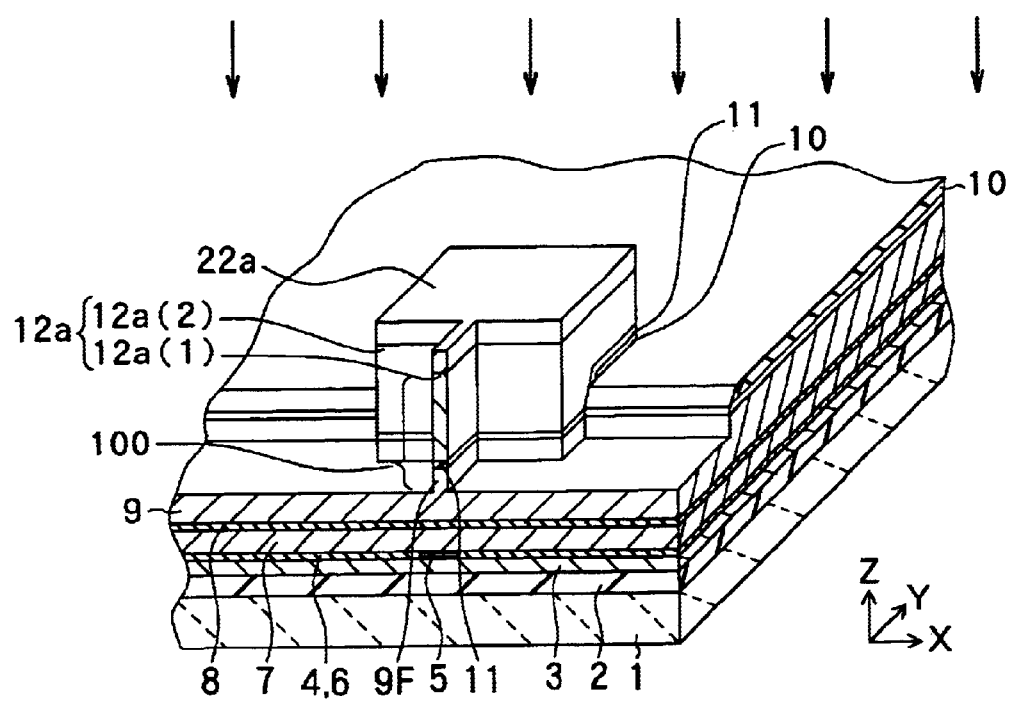
FIG. 20 is a perspective view showing a modification of a portion around the pole portion of the thin film magnetic head according to the first embodiment of the invention.

The invention, however, is not limited to the arrangement. For example, as shown in FIG. 20, the coupling position may be on the front side of the front end of the insulating film pattern 10. In such a case, the length of the front end portion 12a(1) can be shortened, and the rear end portion 12a(2) having a magnetic volume larger than that of the front end portion 12a(1) can be placed closer to the air bearing surface side (front side in FIG. 20). Thus, the overwrite characteristic can be improved. In FIG. 20, the other structural characteristics of the top pole tip 12a or the like that have not been described are similar to those in the case shown in FIG. 17.

<Modification 1-2>

Figure 21:
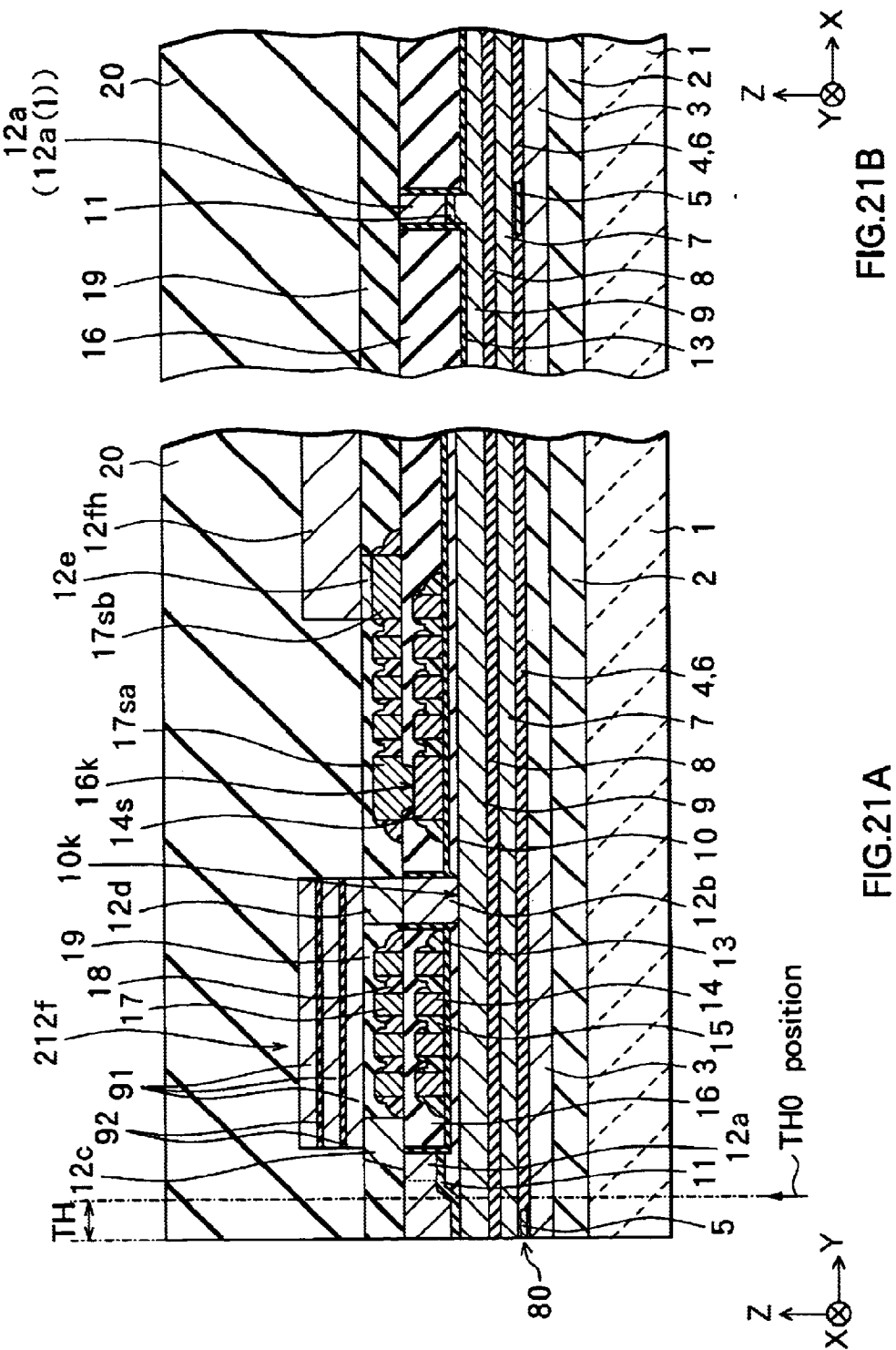
FIGS. 21A and 21B are cross sections showing a modification of a top yoke of the thin film magnetic head according to the first embodiment of the invention.

Although the case where the top yoke (12f) has a structure of a single layer of iron nitride has been described in the embodiment, the invention is not limited to the structure. For example, as shown in FIG. 21A, the top yoke may have a structure (212f) in which a layer 91 made of a high saturated flux density material such as iron nitride and an inorganic insulating layer 92 made of alumina or the like are alternately stacked. By providing the top yoke with such a structure, occurrence of an eddy current in the magnetic path can be prevented, and the high frequency characteristics can be improved. Both the high saturated flux density material layer 91 and the inorganic insulating layer 92 are formed by the RIE, thereby reducing the formation time. In FIGS. 21A and 21B, the portion other than the top yoke 212f is similar to that in the case of FIG. 11.

Although the second mask (32a) is formed as a plating film by electrolyte plating in the embodiment, the invention is not limited to the method. In the following, reference to FIGS. 22 to 25, the case of forming the second mask by using a method other than the electrolyte plating will be described. In FIGS. 22 to 25, the same components as those shown in FIG. 12 are designated by the same reference numerals, and their description will not be repeated as appropriate.

<Modification 1-3>

Figure 22:
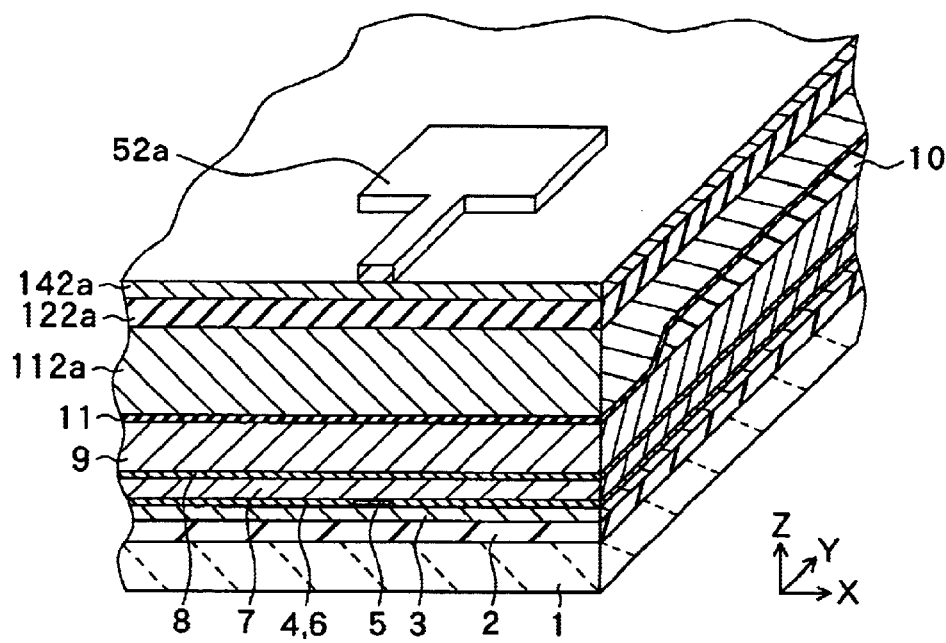
FIG. 22 is a perspective view for explaining a modification of a method of forming a second mask in the first embodiment of the invention.
Figure 23:
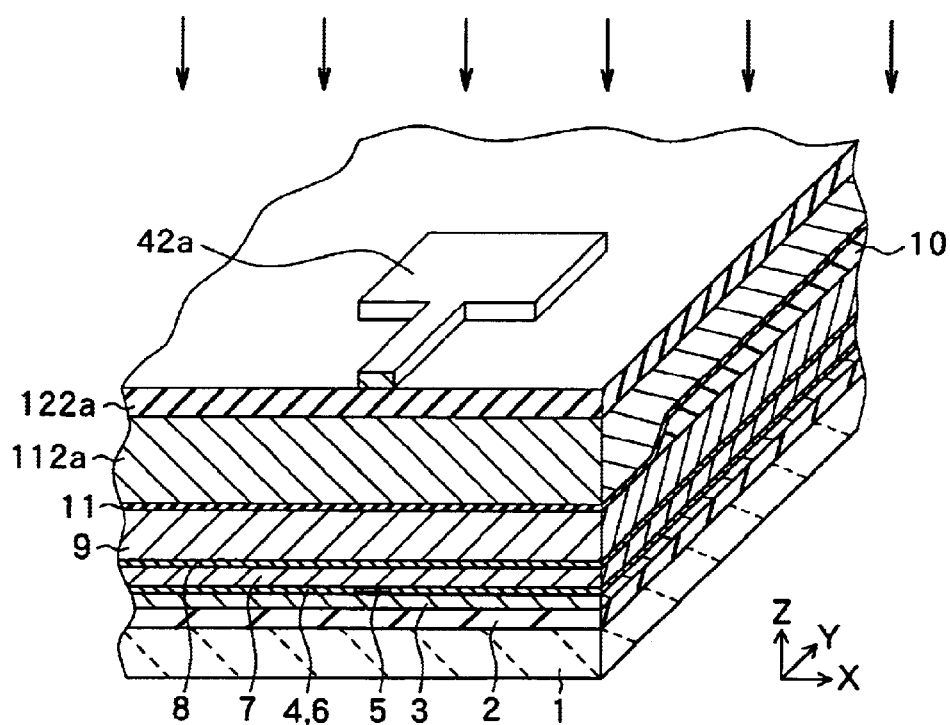
FIG. 23 is a perspective view for explaining a process subsequent to FIG. 22.

FIGS. 22 and 23 are diagrams for explaining a third modification of the embodiment. In the modification, first, as shown in FIG. 22, a second mask precursor layer 142a made of iron nitride or the like is formed by, for example, sputtering on a first mask precursor layer 122a. In a predetermined position on the second mask precursor layer 142a, a third mask 52a made by, for example, a photoresist film is disposed, and the second mask precursor layer 142a is selectively etched by, for example, RIE or ion milling by using the third mask 52a as an etching mask, thereby forming the second mask 42a as shown in FIG. 23. The third mask 52a has a shape corresponding to the plane shape of the top pole tip 12a. The processes after the second mask 42a are similar to those in the foregoing embodiment, so that the description will not be repeated. Also in the case of using such a second mask 42a, an effect similar to that in the foregoing embodiment can be obtained. As the material of the second mask precursor layer 142a, a metal (such as Permalloy) other than iron nitride can be used. In such a case, the second mask precursor layer 142a may be formed by growing Permalloy or the like on the entire surface by electrolyte plating. The second mask precursor layer 142a corresponds to an example of a "metal layer" in the invention. The second mask 42a corresponds to an example of a "second mask" as a "metal film pattern" formed by selectively etching the metal layer in the invention.

<Modification 1-4>

Figure 24:
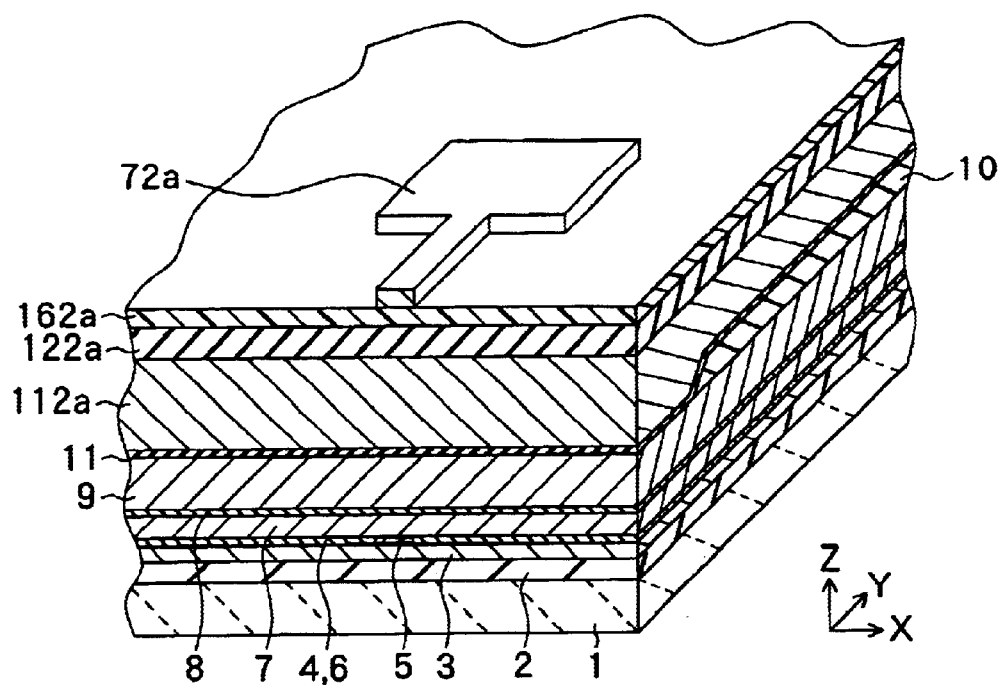
FIG. 24 is a perspective view for explaining another modification of the method of forming a second mask in the first embodiment of the invention.
Figure 25:
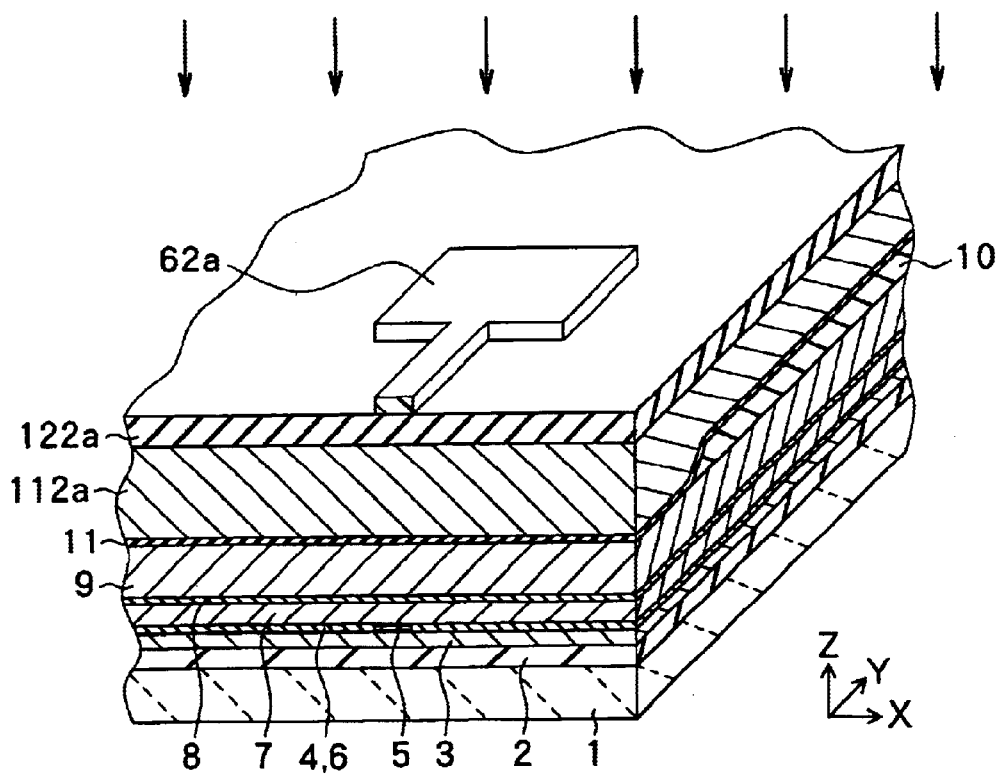
FIG. 25 is a perspective view for explaining a process subsequent to FIG. 24.

FIGS. 24 and 25 are diagrams for explaining a fourth modification of the embodiment. In the modification, first, as shown in FIG. 24, a second precursor layer 162a made by, for example, a photoresist film is formed on the first mask precursor layer 122a. A third mask 72a is provided in a predetermined position on the second mask precursor layer 162a. By using the third mask 72a as an etching mask, for example, by RIE or ion milling, the second mask precursor layer 162a is selectively etched and patterned, thereby forming a second mask 62a as shown in FIG. 25. The third mask 72a in this case has a shape corresponding to the plane shape of the top pole tip 12a. Since the processes after the formation of the second mask 62a are similar to those in the foregoing embodiment, the description will not be repeated. Also in the case of using the second mask 62a, an effect similar to that of the foregoing embodiment can be obtained. When the second mask precursor layer 162a is patterned, it is not always necessary to use the etching process but, for example, a photolithography process may be used. The second mask 62a corresponds to an example of a "second mask" as a "photoresist film pattern" in the invention.

Second Embodiment

A second embodiment of the invention will now be described.

Figure 26A:
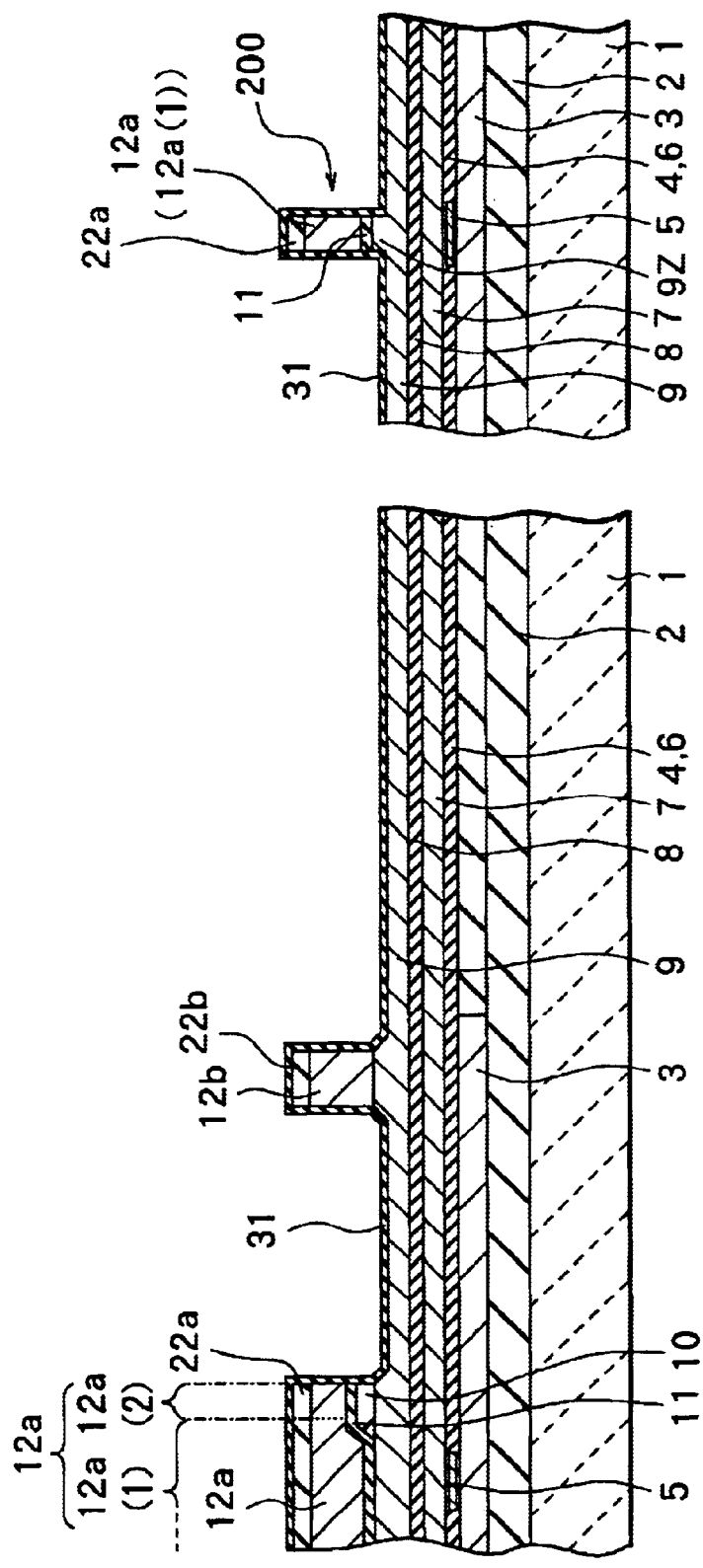
FIGS. 26A and 26B are cross sections for explaining a process in a method of manufacturing a thin film magnetic head according to a second embodiment of the invention.
Figure 26B:
Figure 28A:
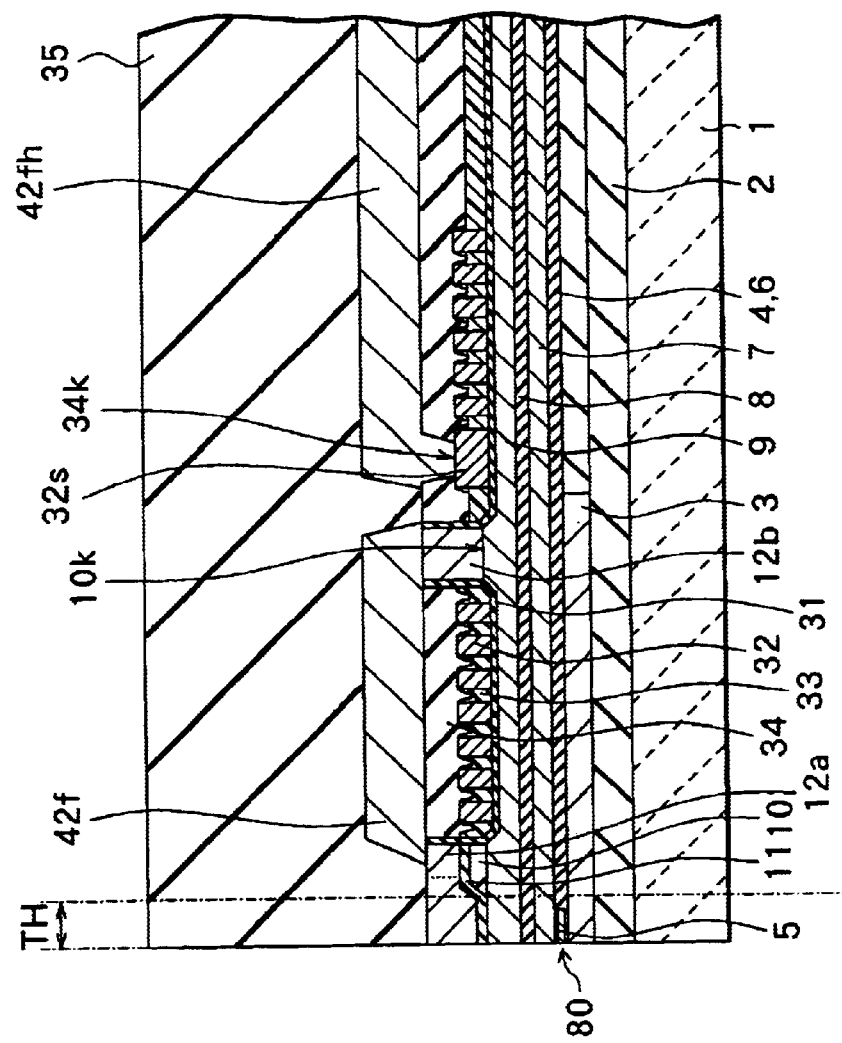
FIGS. 28A and 28B are cross sections for explaining a process subsequent to FIGS. 27A and 27B, respectively.
Figure 28B:
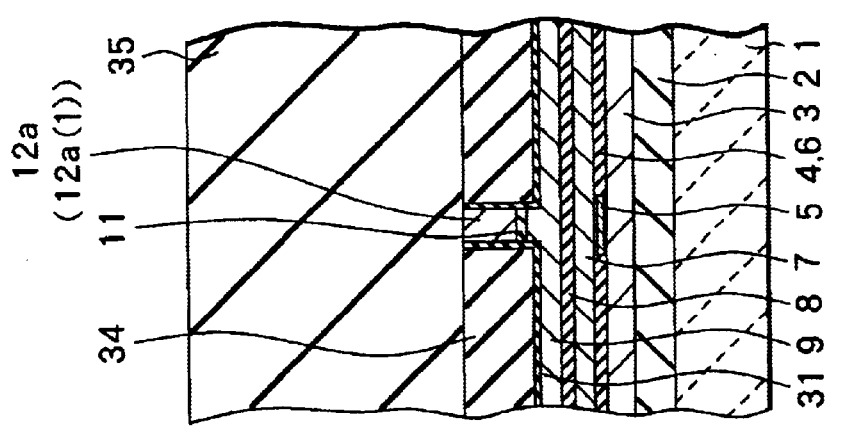
Figure 29:
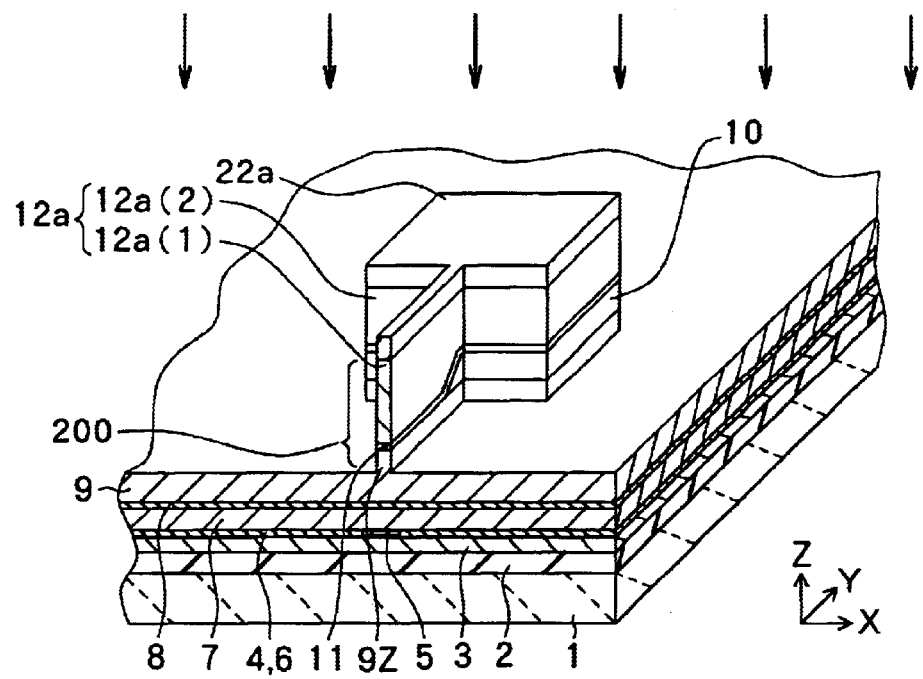
FIG. 29 is a perspective view corresponding to the cross sections of FIGS. 26A and 26B.
Figure 30:
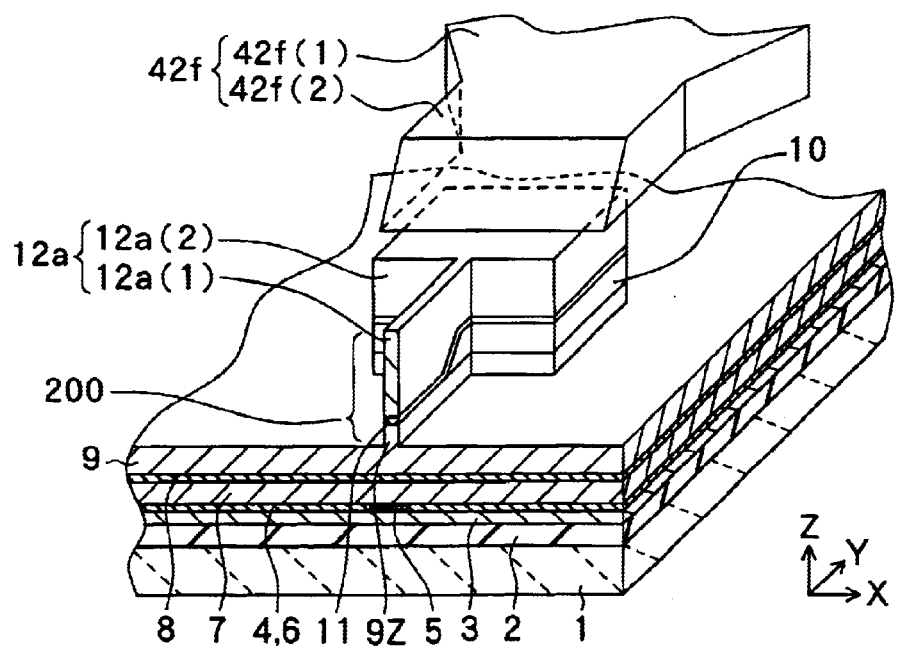
FIG. 30 is a perspective view corresponding to the cross sections of FIGS. 28A and 28B.

First, reference to FIGS. 26A and 26B to FIG. 30, a method of manufacturing a composite thin film magnetic head as a method of manufacturing a thin film magnetic head according to a second embodiment of the invention will be described. Since a thin film magnetic head according to the embodiment is embodied by the method of manufacturing the thin film magnetic head according to the embodiment, it will be also described hereinbelow. FIGS. 26A, 27A, and 28A are cross sections each of which is perpendicular to the air bearing surface and FIGS. 26B, 27B, and 28B are cross sections each of which is parallel to the air bearing surface of the pole portion. FIGS. 29 and 30 are perspective views corresponding to main manufacturing steps. FIG. 29 corresponds to a state shown in FIGS. 26A and 26B, and FIG. 30 corresponds to the state shown in FIGS. 28A and 28B. In FIG. 29, an insulating film 31 or the like in FIGS. 26A and 26B are not shown. In FIG. 30, a thin film coil 32, insulating films 33, and 34, an overcoat layer 35, or the like in FIGS. 28A and 28B are not shown. In FIGS. 26A and 26B to FIG. 30, the expressions of the X, Y, and Z axis directions are similar to those in the first embodiment, and the same components as those in the first embodiment are designated by the same reference numerals.

In the method of manufacturing a thin film magnetic head according to the embodiment, since the processes until the top pole tip 12a and the magnetic path connection portion 12b in FIG. 26A are formed are similar to the same processes shown in FIGS. 7A and 7B in the first embodiment, the description will not be repeated.

In the embodiment, after forming the top pole tip 12a and the magnetic path connection portion 12b, as shown in FIGS. 26A and 26B and FIG. 29, by using both the first mask 22a and another mask 22b as masks, dry etching (RIE) similar to that performed when the pole tip portion 100 is formed in the first embodiment, thereby forming a pole tip portion 200 having a trim structure. By the etching process, a part of each of the write gap layer 11, insulating film pattern 10, and bottom pole 9 in the area other than the portion corresponding to both of the masks is selectively removed. Particularly, the level of the surface of the bottom pole 9 in the etching area becomes lower than the level of the surface in the non-etching area. By using the etching process of RIE, the pole tip portion 200 can be formed with higher precision in a shorter time as compared with the case of using ion milling. The pole tip portion 200 is constructed by the front end portion 12a(1) of the top pole tip 12a, the portion (9Z) corresponding to the front end portion 12a(1) in the bottom pole 9, a part of the write gap layer 11, and a part of the insulating film pattern 10 sandwiched by the front end portion 12a(1) and the portion (9Z). The portions have the same width. At the time of forming the pole tip portion 200, for example, the bottom pole 9 is etched by about 0.3 to 0.5 μm. The portion 9Z corresponds to an example of a "second magnetic pole" in the invention.

As shown in FIGS. 26A and 26B and FIG. 29, the insulating film 31 made of, for example, alumina is formed in thickness of about 0.3 to 0.5 μm.

As shown in FIG. 27A, on the planarized insulating film 31 in an area rearward of the area of the top pole tip 12a (except for the area of the magnetic path connection portion 12b), for example, by electrolyte plating, a thin film coil 32 for an inductive recording head made of copper (Cu) or the like is formed in thickness of about 1.0 to 2.0 μm. The thin film coil 32 has, for example, a structural characteristic similar to that of the thin film coil 14 in the first embodiment. At the time of forming the thin film coil 32, simultaneously, for example, the coil connection portion 32s is formed integrally with the thin film coil 32 on the insulating film 31 at the inner terminating end. The thin film coil 32 corresponds to a "first thin film coil layer" in the invention, and the thin film coil 32 and the coil connection portion 32s correspond to an example of a "thin film coil portion" in the invention.

As shown in FIG. 27A, the insulating film 33 made by, for example, a photoresist is formed between and around turns of the thin film coil 32 (including the coil connection portion 32s) in a predetermined pattern by a high-precision photolithography process. The method of forming the insulating film 33 is similar to that of the insulating film 15 in the first embodiment. Subsequently, on the entire surface, alumina is deposited in thickness of about 3.0 to 4.0 μm by, for example, sputtering. After that, the entire surface of alumina is polished until both the top pole tip 12a and the magnetic path connection portion 12b are exposed by, for example, CMP, thereby forming the insulating film 34 for burying the thin film coil 32 or the like. The planarized face formed by the polishing process corresponds to an example of a "first planarized face" in the invention.

As shown in FIG. 28A, for example, by RIE or ion milling, the insulating film 34 covering the coil connection portion 32s is partially etched, thereby forming an opening 34k for connecting the coil connection portion 32s and a coil interconnection 42fh formed in a later process.

As shown in FIG. 28A, on the area extending from the magnetic path connection portion 12b to the rear end portion 12a(2) of the top pole tip 12a, a top yoke 42f constructing a part of a top pole 42 is selectively formed in thickness of about 2.0 to 3.0 μm. At the time of forming the top yoke 42f, simultaneously, the coil interconnection 42fh is selectively formed on the area from the opening 34k to a rearward position.

Figure 31:
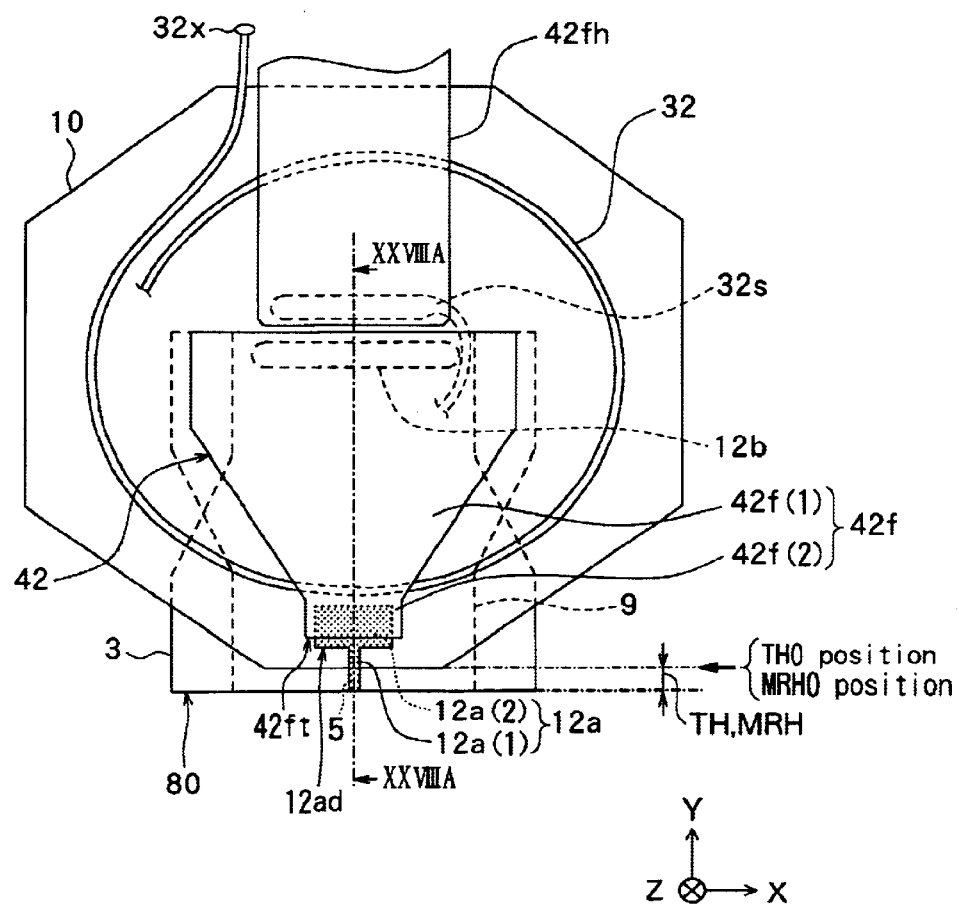
FIG. 31 is a plan view showing the structure of a thin film magnetic head according to the second embodiment of the invention.

The top yoke 42f and the coil interconnection 42fh are formed by a method similar to that of forming the top pole tip 12a or the like in the first embodiment. Specifically, first, an iron nitride layer is deposited on the entire face by sputtering and, after that, the surface of the iron nitride layer is polished by, for example, CMP so as to be planarized. Subsequently, an alumina layer is formed on the planarized iron nitride layer and, after that, a second mask (not shown in FIGS. 28A and 28B) made by a plating film is formed by, for example, frame plating in a predetermined position on the alumina layer. With the second mask, the alumina layer is subjected to an etching process (RIE) under predetermined conditions, thereby forming a mask precursor pattern. The mask precursor pattern is subjected to an etching process (ion milling) under predetermined conditions, thereby forming a first mask. Finally, with the first mask, the ion nitride layer is subjected to an etching process (RIE) under predetermined conditions. By using such a method, a part of the first mask can be narrowed with high precision, and the top yoke 42f and the coil interconnection 42fh can be formed with high precision in a short time. FIGS. 28A and 28B show the case where the first mask itself is etched and dissipated by the etching process for forming the top yoke 42f or the like. The top yoke 42f has a plane shape, for example, as shown in FIG. 31 which will be described hereinlater. The structural characteristics of the top yoke 42f will be described hereinlater. The top yoke 42f is formed so that, for example, its front end is positioned rearward of the position (TH0 position) of the front end of the insulating film pattern 10 by a bout 0.5 to 1.0 μm and, at least, the portion around the front end is tapered. FIG. 30 shows a stereoscopic structure of a portion around the top yoke 42f at this time. The top yoke 42f corresponds to an example of a "second magnetic layer portion" in the invention. The top pole 42 constructed by the top pole tip 12a, magnetic path connection portion 12b, and top yoke 42f corresponds to an example of a "first magnetic layer" in the invention.

As shown in FIGS. 28A and 28B, an overcoat layer 35 made of, for example, alumina is formed so as to cover the entire surface. After that, the air bearing surface 80 is formed by a mechanical process and a polishing process. In such a manner, the thin film magnetic head according to the embodiment is completed.

FIG. 31 is a plan view schematically showing the structure of a thin film magnetic head manufactured by a method of manufacturing a thin film magnetic head according to the embodiment. In FIG. 31, the same components as those shown in FIG. 19 in the first embodiment are designated by the same reference numerals. In FIG. 31, the insulating films 33 and 34, the overcoat layer 35, and so forth are not shown. With respect to the thin film coil 32, only the outermost peripheral portion is shown. FIG. 28A is a cross section taken along line XXVIIIA—XXVIIIA of FIG. 31.

As shown in FIG. 31, the top pole 42 is constructed by, for example, the top pole tip 12a, magnetic path connection portion 12b, and top yoke 42f which are formed separately. The top yoke 42f has a plane shape similar to that of the top yoke 12f in the first embodiment, and includes a yoke portion 42f(1) and a connection portion 42f(2) corresponding to the yoke portion 12f(1) and the connection portion 12f(2) of the top yoke 12f, respectively. A front end face 42ft of the top yoke 42f is positioned, for example, rearward of the position of the step face 12ad of the top pole tip 12a.

As shown in FIGS. 28A, 30, and 31, the top yoke 42f is magnetically coupled to the bottom pole 9 via the magnetic path connection portion 12b in the opening 10k, and is partially overlapped with and magnetically coupled to a part of the rear end portion 12a(2) of the top pole tip 12a. That is, the top pole 42 (top pole tip 12a, magnetic path connection portion 12b, and top yoke 42f) and the bottom pole 9 are connected to each other, thereby forming the magnetic path.

As shown in FIG. 31, the thin film coil 32 and the coil connection portion 32s have the structural characteristics similar to the thin film coil 14 and the coil connection portion 14s in the first embodiment. The thin film coil 32 is electrically connected to the coil interconnection 42fh via the coil connection portion 32s in the opening 34k. The external terminating end 32x of the thin film coil 32 and a rear part (not shown) of the coil interconnection 42fh are connected to an external circuit (not shown). A current can be passed to the thin film coil 32 via the external circuit.

The structural characteristics of portions other than the above shown in FIG. 31 are similar to those of the first embodiment (FIG. 19).

In the embodiment, at the time of performing an etching process for forming the pole tip portion 200, a part of the surface layer of the bottom pole 9 in the area (except for the area of the magnetic path connection portion 12b) rearward of the area of the top pole tip 12a is etched, so that the level of the surface of the underlayer (insulating film 31) in the area where the thin film coil 32 is provided can be made lower than the level of the surface of the bottom pole 9. Since the level of the surface of the underlayer (insulating film 31) in the area of the thin film coil 32 is lower than that of the underlayer (insulating film 13) of the thin film coil 14 in the first embodiment, the insulating film 34 having more sufficient thickness can be assured on the thin film coil 32, and the insulating effect can be further enhanced.

Since the front end face of the top yoke 42f is inclined in the embodiment, the flow of the magnetic flux flowing from the top yoke 42f to the top pole tip 12a can be smoothed.

Since the action, effect, modification, and so forth other than the above regarding the method of manufacturing a thin film magnetic head according to the second embodiment are similar to those in the first embodiment, their description will not be repeated.

Figure 32:
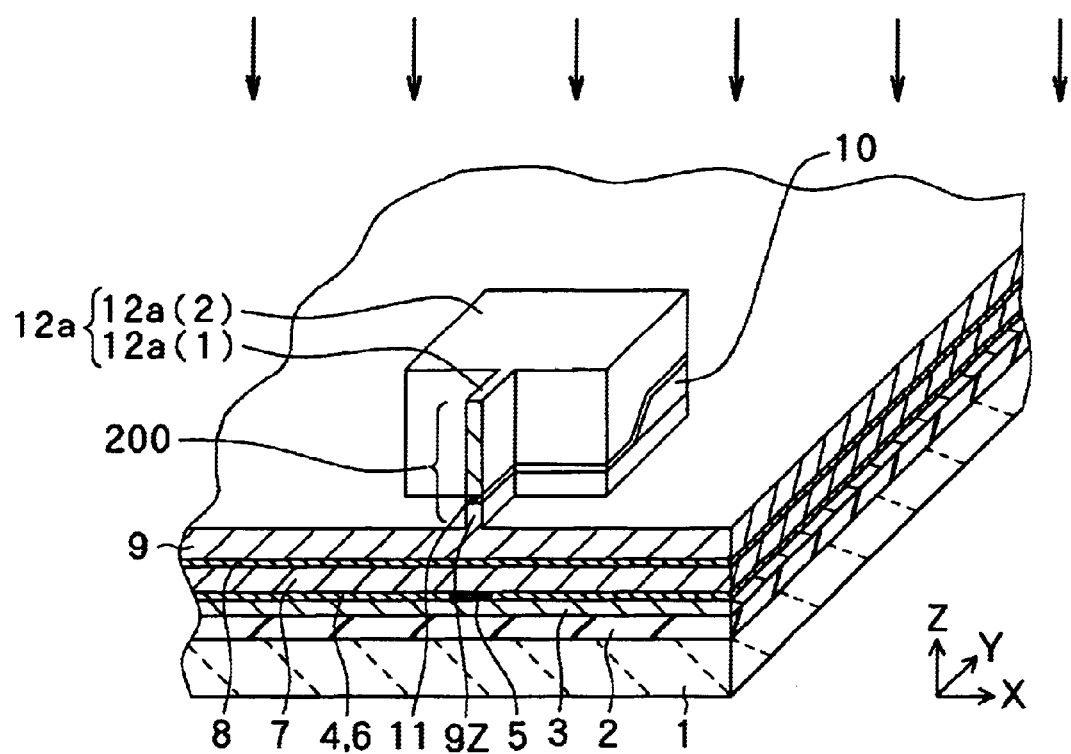
FIG. 32 is a perspective view showing a modification of a portion around the pole portion of the thin film magnetic head according to the second embodiment of the invention.

In the second embodiment, as shown in FIG. 29, the coupling position of the front end portion 12a(1) and the rear end portion 12a(2) of the top pole tip 12a is rearward of the position of the front end of the insulating film pattern 10. The invention, however, is not limited to the arrangement. For example, as shown in FIG. 32, the coupling position may be deviated forward. In such a case as well, by the action similar to that of the modification 1-1 of the first embodiment, the overwrite characteristics can be improved. The structural characteristics of the top pole tip 12a and the like in FIG. 32 are similar to those in the case of FIG. 29.

Third Embodiment

A third embodiment of the invention will now be described.

Figures 33A, 33B:
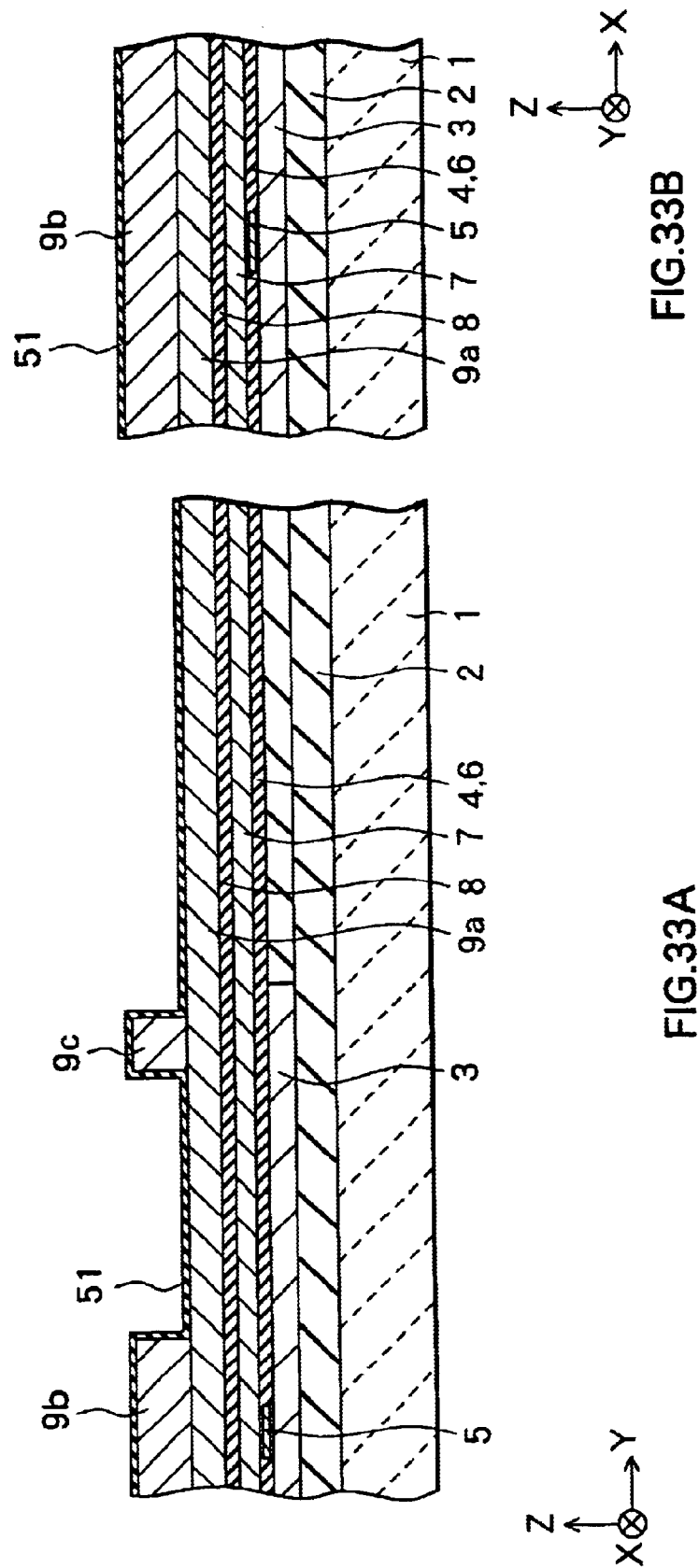
FIGS. 33A and 33B are cross sections for explaining a process in a method of manufacturing a thin film magnetic head according to a third embodiment of the invention.
Figures 34A, 34B:
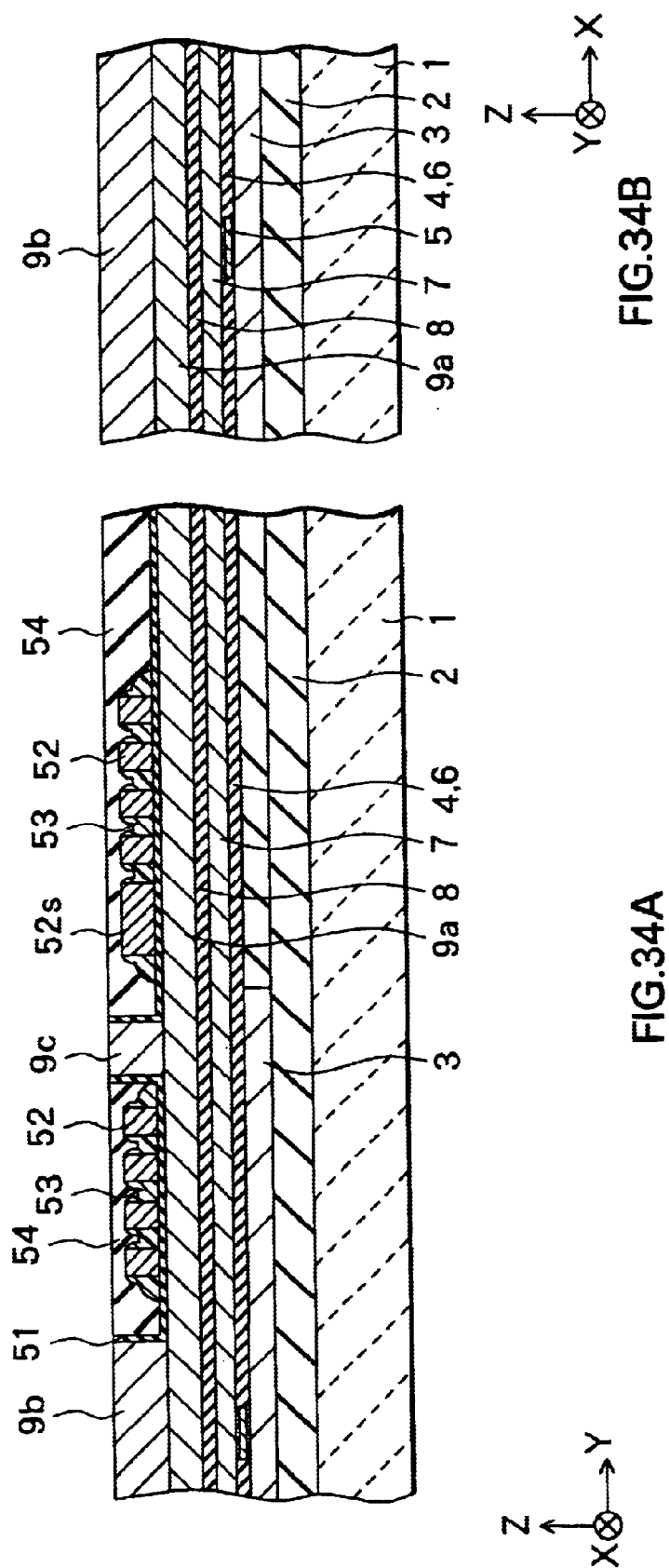
FIGS. 34A and 34B are cross sections for explaining a process subsequent to FIGS. 33A and 33B.
Figures 35A, 35B:
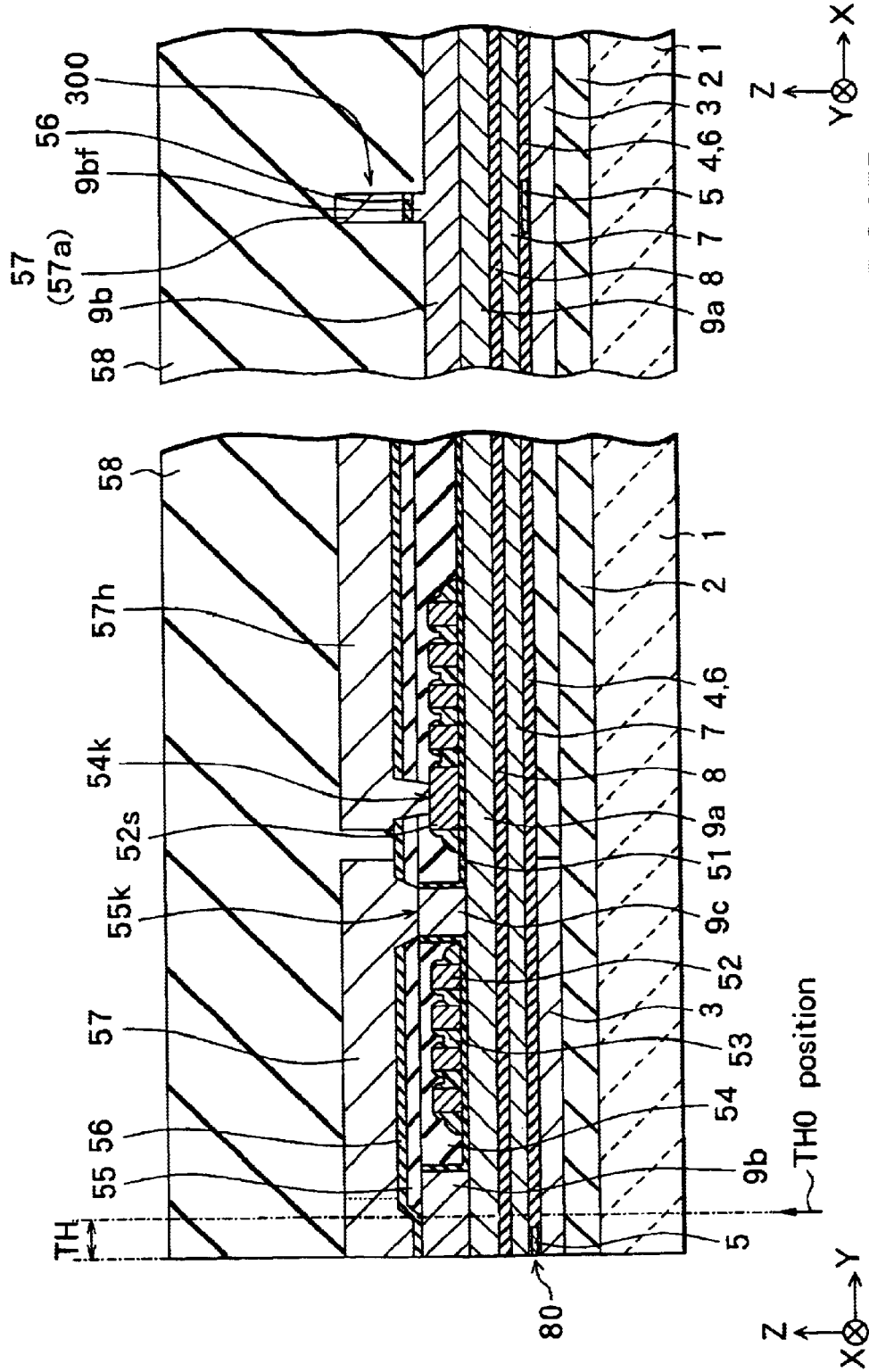
FIGS. 35A and 35B are cross sections for explaining a process subsequent to FIGS. 34A and 34B.

First, reference to FIGS. 33A and 33B to FIGS. 35A and 35B, a method of manufacturing a composite thin film magnetic head as a method of manufacturing a thin film magnetic head according to a third embodiment of the invention will be described. Since a thin film magnetic head according to the third embodiment is embodied by the method of manufacturing the thin film magnetic head according to the embodiment, it will also be described hereinbelow. FIGS. 33A, 34A, and 35A are cross sections each of which is perpendicular to the air bearing surface and FIGS. 33B, 34B, and 35B are cross sections each of which is parallel to the air bearing surface of the pole portion. In FIGS. 33A and 33B to FIGS. 35A and 35B, the expressions of the X, Y, and Z axis directions are similar to those in each of the foregoing embodiments, and the same components as those in the first embodiment are designated by the same reference numerals.

In the method of manufacturing a thin film magnetic head according to the third embodiment, since the processes until the insulating film 8 in FIGS. 33A and 33B are similar to the processes shown in FIGS. 1A and 1B in the first embodiment, the description will not be repeated.

In the embodiment, after forming the insulating film 8, as shown in FIGS. 33A and 33B, a bottom magnetic layer 9a constructing a part of the bottom pole 9 is formed in thickness of about 1.0 to 2.0 µm. In a forward area on the bottom magnetic layer 9a, a bottom pole tip 9b constructing a part of the bottom pole 9 is selectively formed in thickness of about 1.5 to 2.5 µm. Simultaneously, in a rearward area on the bottom magnetic layer 9a, a bottom connection portion 9c constructing a part of the bottom pole 9 is selectively formed in a similar thickness. The bottom magnetic layer 9a, bottom pole tip 9b, and bottom connection portion 9c are formed by a method similar to that in the case of the top pole tip 12a in the first embodiment. By using such a method, a mask (not shown) used to form the portions constructing the bottom pole 9 by the etching process can be formed with high precision. The portions can be formed with high precision in a short time. The bottom pole 9 constructed by the bottom magnetic layer 9a, bottom pole tip 9b, and bottom connection portion 9c corresponds to an example of a "second magnetic layer" in the invention.

As shown in FIGS. 33A and 33B, on the entire face, an insulating film 51 made of, for example, alumina is formed in thickness of about 0.3 to 0.5 µm.

As shown in FIG. 34A, on the planarized insulating film 51 in an area rearward of the area of the bottom pole tip 9b (except for the area of the bottom connection portion 9c), for example, by electrolyte plating, a thin film coil 52 for an inductive recording head made of copper (Cu) or the like is selectively formed in thickness of about 1.0 to 2.0 µm. At the time of forming the thin film coil 52, for example, a coil connection portion 52s is formed integrally with the thin film coil 52 at the inner terminating end. An insulating film 53 made by, for example, a photoresist is formed between and around the turns of the thin film coil 52 (including the coil connection portion 52s). The method of forming the insulating film 53 (including a heat treatment) is similar to that of the insulating film 15 in the first embodiment. On the entire face, alumina or the like is formed in thickness of about 3.0 to 4.0 µm, and the entire surface of alumina is polished by, for example, CMP until the bottom pole tip 9b and the bottom connection portion 9c are exposed, thereby forming an insulating film 54 which buries the thin film coil 52 and the like. The thin film coil 52 corresponds to an example of a "first thin film coil layer" in the invention, and the insulating films 53 and 54 correspond to an example of a "first insulating layer portion" in the invention.

As shown in FIG. 35A, alumina or the like is deposited by, for example, sputtering on the entire face in thickness of about 0.5 to 1.0 µm. After that, the alumina layer is etched by, for example, RIE to be patterned, thereby selectively forming an insulating film pattern 55. By the etching process, a part of the front side area in the alumina layer and the upper area of the bottom connection portion 9c are selectively removed. Particularly, in the latter area, an opening 55k for connecting the bottom connection portion 9c and a top pole 57 to be formed in a later process is formed. The insulating film pattern 55 is used to specify the throat height zero position (TH0 position) in a manner similar to the insulating film pattern 10 in the first embodiment. The details of the area, structural characteristics, and forming method of the insulating film pattern 55 are similar to those of the insulating film pattern 10.

As shown in FIGS. 35A and 35B, for example, by sputtering, a write gap layer 56 made of alumina or the like is formed in thickness of about 0.15 to 0.2 µm. The write gap layer 56 is formed so that the opening 55k formed in a preceding step is not covered with alumina. The write gap layer 56 corresponds to an example of a "gap layer" in the invention.

Figure 36:
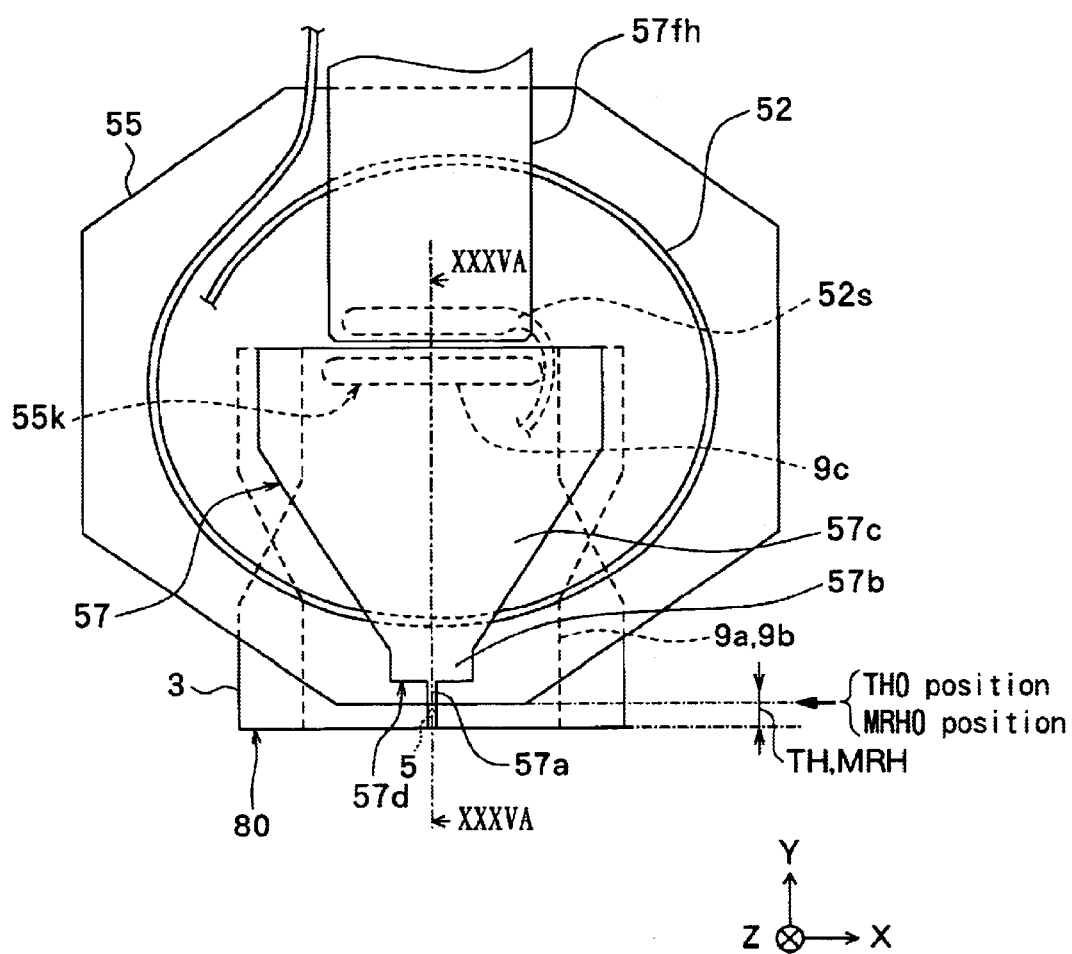
FIG. 36 is a plan view showing the structure of a thin film magnetic head according to the third embodiment of the invention.
Figure 37:
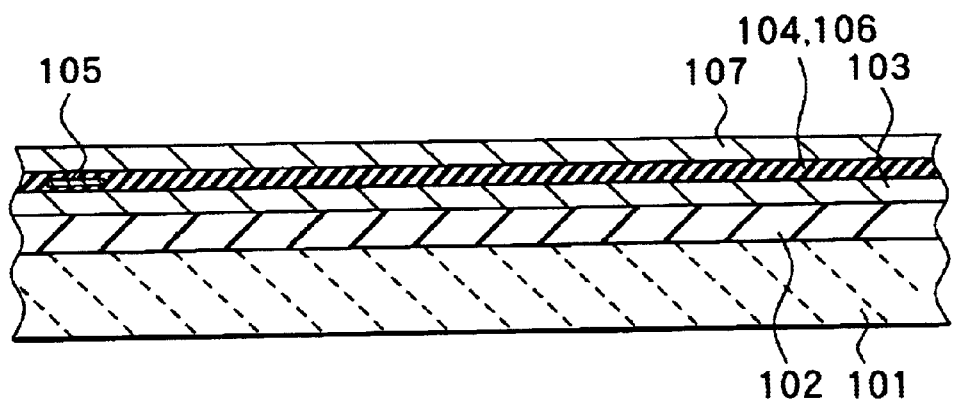
FIG. 37 is a cross section for explaining a process of a conventional method of manufacturing a thin film magnetic head.
Figure 38:
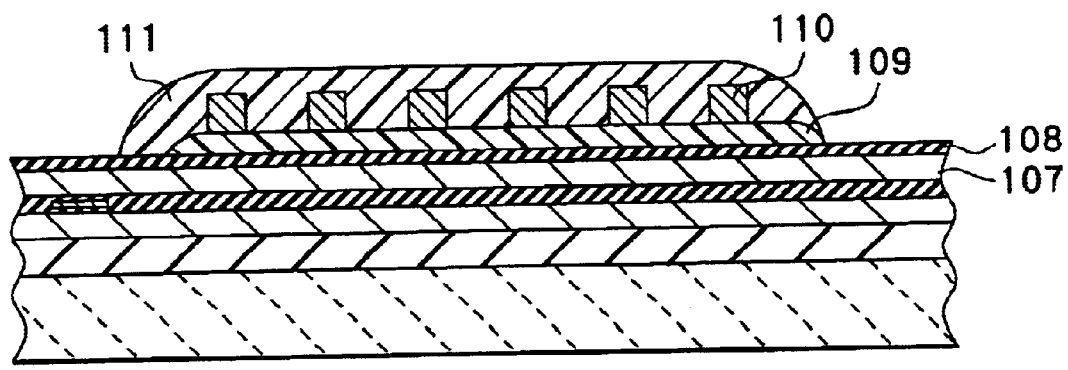
FIG. 38 is a cross section for explaining a process subsequent to FIG. 37.
Figure 39:
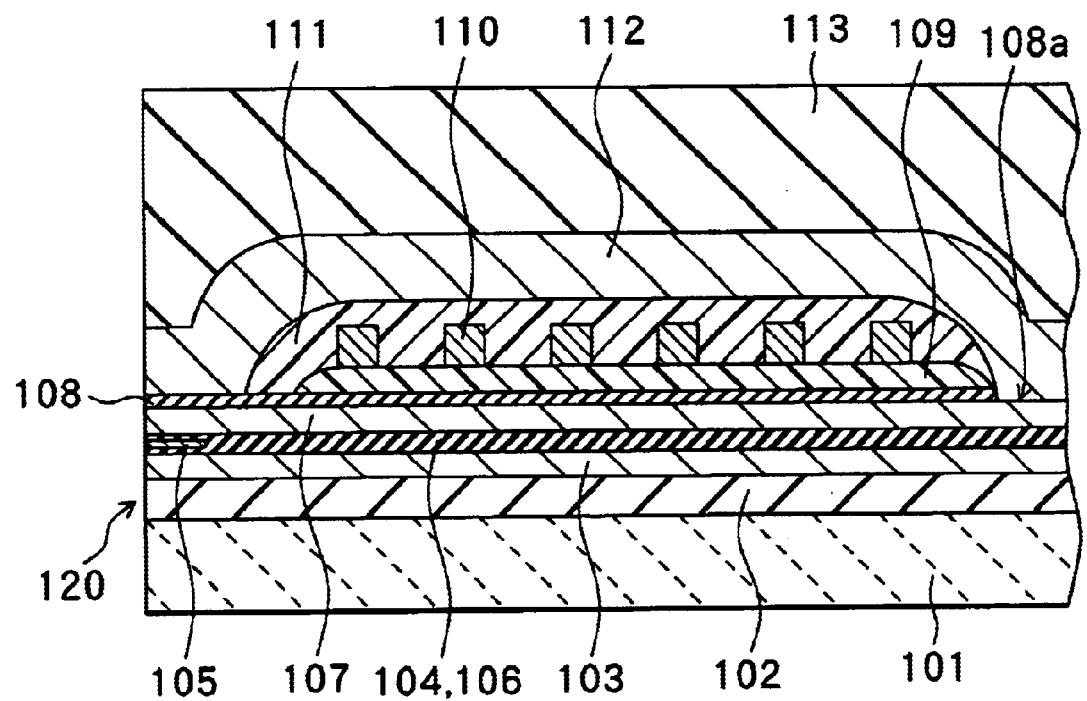
FIG. 39 is a cross section for explaining a process subsequent to FIG. 38.
Figure 40:
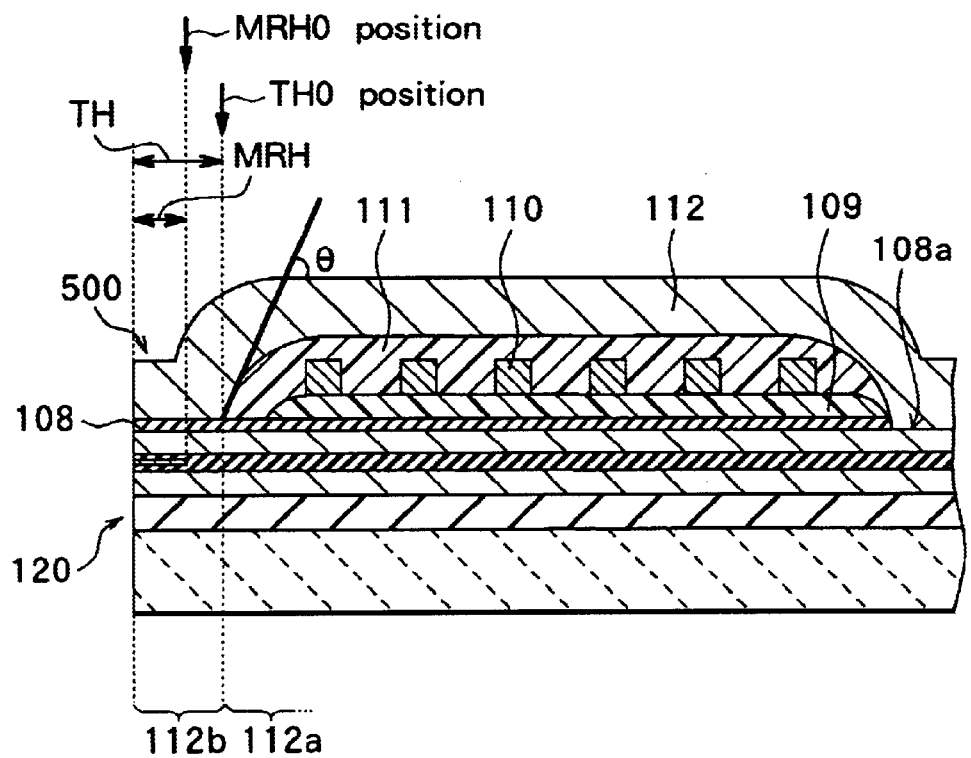
FIG. 40 is a cross section showing the structure of a main portion of a conventional thin film magnetic head.
Figure 41:
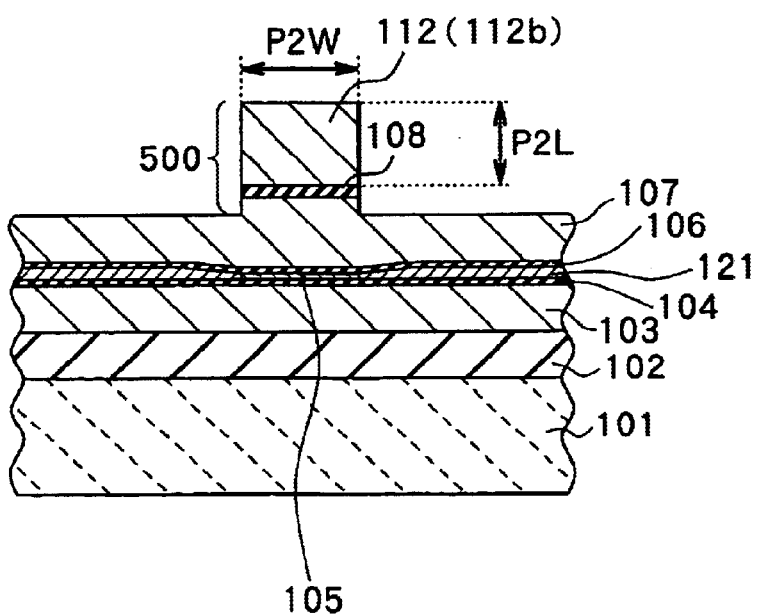
FIG. 41 is a cross section parallel to the air bearing surface of a pole portion in the thin film magnetic head shown in FIG. 40.
Figure 42:
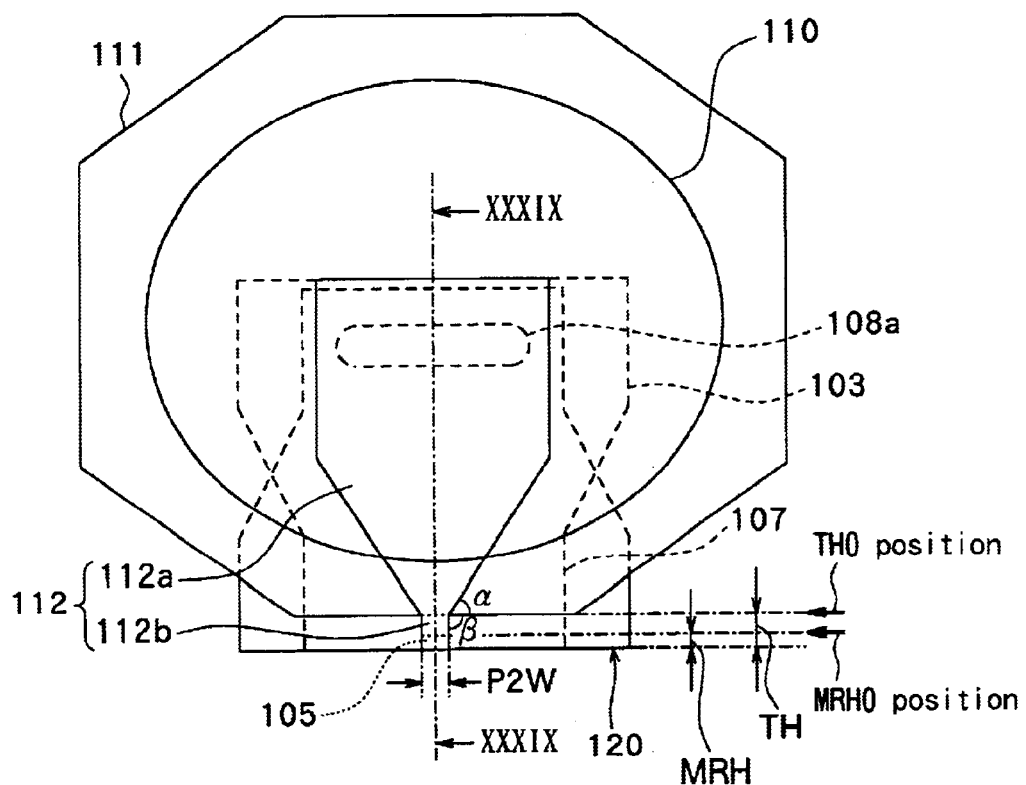
FIG. 42 is a plan view showing the structure of a conventional thin film magnetic head.
Figure 43:
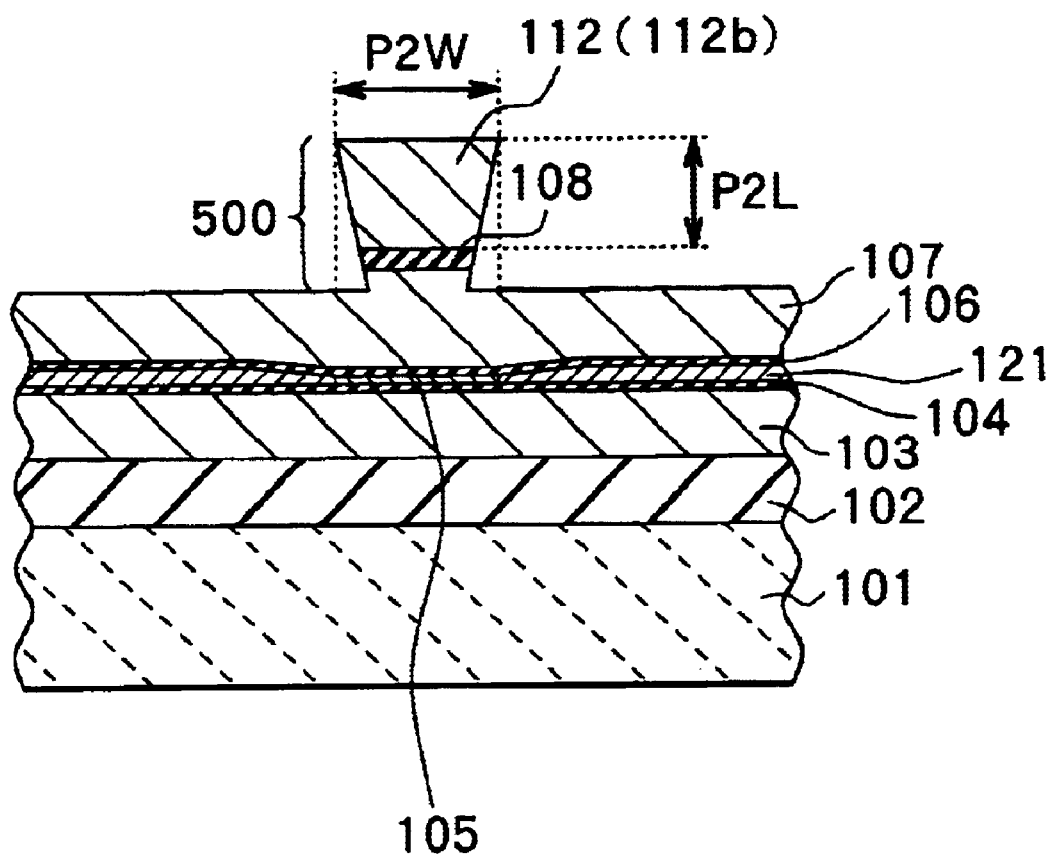
FIG. 43 is a cross section parallel to the air bearing surface of the pole portion, for explaining problems in the case of forming the pole portion of the conventional thin film magnetic head.

As shown in FIG. 35A, a part of each of the write gap layer 56, insulating film pattern 55, and insulating film 54 on the coil connection portion 52s is selectively etched by, for example, RIE or ion milling, thereby forming an opening 54k for connecting the coil connection portion 52s and a coil interconnection 57h to be formed in a later process to each other. In an area on the bottom connection portion 9c to a side which becomes the air bearing surface 80 (left side in the diagram) in a later process, the top pole 57 is selectively formed in thickness of about 1.5 to 3.0 µm. At the time of forming the top pole 57, simultaneously, the coil interconnection 57h is selectively formed in an area on the opening 54k to the rearward. The top pole 57 and the coil interconnection 57h are formed by, in a manner similar to the top pole tip 12a or the like in the first embodiment, forming an iron nitride layer and patterning the iron nitride layer by RIE under predetermined conditions with a mask formed by an etching process of both RIE and ion milling. By using such a method, a part of the mask can be narrowed with high precision, and the top pole 57 and the coil interconnection 57h can be formed with high precision in a short time. The top pole 57 has, for example, a plane shape as shown in FIG. 36 which will be described hereinlater, and includes a front end portion 57a defining a recording track width on a recording medium, an intermediate portion 57b wider than the front end portion 57a, and a yoke portion 57c having wider width and larger area as compared with the intermediate portion 57b. The details of the structural characteristics of the top pole 57 will be described hereinlater. The top pole 57 corresponds to an example of a "first magnetic layer" in the invention.

As shown in FIG. 35B, by dry etching (RIE) similar to the case of forming the pole tip portion 100 in the first embodiment, a pole tip portion 300 having a trim structure is formed by etching the write gap layer 56 and the bottom pole tip 9b by about 0.5 µm. By using such an etching process (RIE), the pole tip portion 300 can be formed with higher precision in a shorter time as compared with the case of using ion milling or the like. The etching process is performed by using a photoresist film (not shown) formed rearward of the rear end position of the front end portion 57a in the top pole 57 as a mask. The pole tip portion 300 is constructed by the front end portion 57a of the top pole 57, a portion (9bF) corresponding to the front end portion 57a of the bottom pole tip 9b, and a part of the write gap layer 56 sandwiched by the front end portion 57a and the portion (9bF). The portions have almost the same width. The front end portion 57a corresponds to an example of a "first magnetic pole" in the invention, and the portion 9bF corresponds to an example of a "second magnetic pole" in the invention.

As shown in FIG. 35A, an overcoat layer 58 made of, for example, alumina is formed so as to cover the entire surface. After that, the air bearing surface 80 is formed by a mechanical process and a polishing process. In such a manner, the thin film magnetic head according to the embodiment is completed.

FIG. 36 is a plan view schematically showing the structure of a thin film magnetic head manufactured by a method of manufacturing a thin film magnetic head according to the third embodiment. In FIG. 36, the same components as those shown in FIG. 31 in the second embodiment are designated by the same reference numerals. In FIG. 36, the insulating films 53 and 54, the insulating film pattern 55, the overcoat layer 58, and the like are not shown. With respect to the thin film coil 52, only the outer peripheral portion is shown. FIG. 35A is a cross section taken along line XXXVA—XXXVA of FIG. 36.

As shown in FIG. 36, the top pole 57 includes the front end portion 57a, intermediate portion 57b, and yoke portion 57c in accordance with the order from the air bearing surface 80, which are formed integrally. The front end portion 57a is a portion determining the recording track width on a recording medium at the time of recording, that is, the width of the front end portion 57a defines the track width. The intermediate portion 57b is wider than the front end portion 57a, and the yoke portion 57c is wider than the intermediate portion 57b. The yoke portion 57c has a structure almost similar to that of the yoke portion 12f(1) of the top yoke 12f in the first embodiment. A step in the width direction is formed in the coupling portion between the front end portion 57a and the intermediate portion 57b, and a step face 57d on the intermediate portion 57b side of the step portion is positioned rearward of the TH0 position (or MRH0 position). The position is not limited to the above but the step face 57d may be positioned forward of the TH0 position (or MRH0 position), or both the step face 57d and the TH0 position may coincide with each other.

As shown in FIGS. 35A and 36, a rear part of the top pole 57 is magnetically coupled to the bottom magnetic layer 9a and the bottom pole tip 9b via the bottom connection portion 9c in the opening 55k. That is, by connecting the top pole 57 and the bottom pole 9 (bottom magnetic layer 9a, bottom pole tip 9b, and bottom connection portion 9c) to each other, a magnetic path is formed. The thin film coil 52, coil connection portion 52s, and coil interconnection 57h have structural characteristics similar to those of the thin film coil 32, coil connection portion 32s, and coil interconnection 42fh shown in FIG. 31, respectively.

The structural characteristics regarding the portions other than the above shown in FIG. 36 are similar to those in the case of the second embodiment (FIG. 31).

In the embodiment, the portions (front end portion 57a, intermediate portion 57b, and yoke portion 57c) of the top pole 57 are formed integrally. Consequently, as compared with the case where the portions of the top pole 12 (first embodiment) or 42 (second embodiment) are formed separately in each of the foregoing embodiments, the manufacturing process can be simplified. Since the action, effect, modification, and so forth other than the above of the method of manufacturing a thin film magnetic head according to the third embodiment are similar to those of each of the foregoing embodiments, their description will not be repeated.

Although the polishing of the surface of the insulating film 54 is finished when the bottom pole tip 9b and the magnetic path connection portion 9c are exposed in the third embodiment, the invention is not limited to this timing but the polishing may be performed until, for example, not only the bottom pole tip 9b and the magnetic path connection portion 9c but also the thin film coil 52 are exposed. Even if the thin film coil 52 is exposed at this time point, insulating portions such as the insulating film pattern 55 and the write gap layer 56 are formed on the thin film coil 52 in later processes, so that the thin film coil 52 and the top pole 57 can be insulated from each other.

Although the invention has been described above by the embodiments, the invention is not limited to the embodiments but can be variously modified. For example, in each of the foregoing embodiments, after forming a precursor layer (iron nitride layer) for forming the top pole tip 12a or the like, the surface of the precursor layer is polished and planarized. The invention, however, is not limited to the method but the polishing process may not be performed when the underlayer in the area of the precursor layer is flat.

In each of the foregoing embodiments, in order to improve the forming precision and forming speed, each of the magnetic layer parts constructing the thin film magnetic head is recommended to be formed by selectively etching (RIE) an iron nitride layer. It is not, however, always necessary to apply this method to all of the magnetic layer portions. For example, a part of the magnetic layer portions may be formed by using Permalloy or the like as a material by electrolyte plating. It is preferable to form portions requiring high formation precision, that is, the portions constructing the pole portion (the top pole tip 12a and the bottom pole 9 in the first and second embodiments and the top pole 57 and the bottom pole tip 9b in the third embodiment) by at least selectively etching (RIE) the ion nitride.

The plane shapes of the magnetic layer portions constructing the top pole described in each of the foregoing embodiments (top pole tip 12a, intermediate connection portion 12c, top yokes 12f and 42f, top pole 57, and so forth) are not limited to those shown in FIGS. 19, 31, and 36, but can be freely changed as long as the magnetic flux generated by the thin film coil can be sufficiently supplied to the front end portion (12a(1) or 57a).

Although the method of manufacturing the composite thin film magnetic head has been described as an example in each of the foregoing embodiments and modifications, the invention can also be applied to a recording-only thin film magnetic head having an inductive magnetic transducer for writing and a thin film magnetic head having an inductive magnetic transducer for both recording and reproduction. The invention can also be applied to a thin film magnetic head of a structure in which the device for writing and the device for reading are stacked in the order opposite to that in the above description.

As described above, according to the method of manufacturing a thin film magnetic head of the invention, at least one of the step of forming the first magnetic pole and the step of forming the second magnetic pole includes: the step of forming a magnetic layer; the step of forming a mask precursor pattern on the magnetic layer; the first etching step of forming a first mask having a narrower width by etching a part of the mask precursor pattern by ion beam etching and, simultaneously, partially etching a layer near the surface of the magnetic layer in an area other than an area of forming the first mask; and the second etching step of forming at least one of the first and second magnetic poles by etching the magnetic layer by reactive ion etching by using the first mask. Consequently, at least one of the first and second magnetic poles can be narrowed with high precision, and the time required to form the portions can be shortened.

According to the method of a thin film magnetic head of one aspect of the invention, during the first etching step, the angle in the width direction between a direction orthogonal to an extending direction of the magnetic material layer and an irradiation direction of the ion beam is changed from a first angle (plus or minus 15 degrees of 45 degrees) to a second angle (plus or minus 15 degrees of 75 degrees). Consequently, the etching process by ion beam etching can be performed with high precision in a short time.

According to the method of manufacturing a thin film magnetic head in another aspect of the invention, at least one of the step of forming the first magnetic pole and the step of forming the second magnetic pole includes: the step of forming a magnetic layer; the step of forming a mask precursor pattern on the magnetic material layer; the first etching step of forming a first mask having a narrower width by etching a part of the mask precursor pattern by ion beam etching; and the second etching step of forming at least one of the first and second magnetic poles by selectively etching the magnetic layer by reactive ion etching with the first mask. Thus, at least one of the first and second magnetic poles can be narrowed with high precision.

According to the method of manufacturing a thin film magnetic head in still another aspect of the invention, in the first etching step, an ion beam is irradiated from a direction at an angle plus or minus 15 degrees of 75 degrees in the width direction, the angle being defined as an angle between the direction of the ion beam and a direction orthogonal to an extending direction of the magnetic material layer. Consequently, the etching process by ion beam etching can be conducted with high precision in a short time.

According to the method of manufacturing a thin film magnetic head in still another aspect of the invention, at least one of the step of forming the first magnetic pole and the step of forming the second magnetic pole includes: the step of forming a magnetic material layer; the step of forming a mask precursor pattern on the magnetic material layer; the first etching step of etching the magnetic material layer to a depth in an area other than an area where the mask precursor pattern is formed, the first etching step being performed with the mask precursor pattern as a mask by ion beam etching; and the second etching step of forming at least one of the first and second magnetic poles by selectively etching the magnetic material layer by reactive ion etching with the mask precursor pattern as a mask. At least one of the first and second magnetic poles can therefore be narrowed with high precision.

According to the method of manufacturing a thin film magnetic head of still another aspect of the invention, in the first etching step, an ion beam is irradiated from a direction at an angle plus or minus 15 degrees of 45 degrees in the width direction, the angle being defined as angle between the direction of the ion beam and a direction orthogonal to an extending direction of the magnetic layer. Consequently, the etching process by the ion beam etching can be performed within high precision in a short time.

According to the method of manufacturing a thin film magnetic head of still another aspect of the invention, the method further includes the step of polishing the surface of the magnetic material layer so as to planarize the surface thereof between the step of forming the magnetic material layer and the step of forming the mask precursor pattern. Consequently, even when the underlayer in the area of forming the magnetic layer has a rough structure, the surface of another layer (such as a precursor layer for forming a mask precursor pattern) to be formed on the underlayer can be planarized.

According to the method of manufacturing a thin film magnetic head of still another aspect of the invention, in the first etching step, the second mask is etched to be removed. Consequently, re-adhesion of an etching product expected in the case of performing a later process in a state where the second mask is residual can be prevented, and at least one of the first and second magnetic poles can be formed with high precision.

According to the method of manufacturing a thin film magnetic head of still another aspect of the invention, the mask precursor layer is deposited by chemical vapor deposition under a pressure of 100 Pa or lower. The etch amount of the first mask formed by patterning the mask precursor layer can therefore be reduced.

According to the method of manufacturing a thin film magnetic head of still another aspect of the invention, an inorganic material such as a material containing aluminum oxide or aluminum nitride is used as the material of the first mask. As compared with the case of using a material which is etched at a high etch rate such as a photoresist film, reduction in the thickness of the first magnetic layer portion can be suppressed more.

According to the method of manufacturing a thin film magnetic head of still another aspect of the invention, an angle at a part corresponding to the corner of the first magnetic layer portion lies in a range from 90 degrees to 120 degrees. Thus, the angle in the corresponding portion of the first magnetic layer portion to be formed can be in a similar range. In the first magnetic layer portion having such structural characteristics, the flow of the magnetic flux flowing from the expanded portion to the first magnetic pole can be made smooth.

According to the method of manufacturing a thin film magnetic head of still another aspect of the invention, the mask precursor layer is patterned by reactive ion etching, so that the time required to form the first mask can be reduced.

According to the method of manufacturing a thin film magnetic head of still another aspect of the invention, in the third etching step, an etching process is performed at a temperature in a range from 50 degrees to 300 degrees. Thus, the time required for the etching process can be further shortened.

According to the method of manufacturing a thin film magnetic head of still another aspect of the invention, formation of the first magnetic pole in the first magnetic layer, selective removal of the area other than the area for forming the first magnetic pole in the gap layer, and formation of the second magnetic pole in the second magnetic layer are continuously performed in the same step. Consequently, the time required for manufacturing the entire thin film magnetic head can be shortened.

According to the method of manufacturing a thin film magnetic head of still another aspect of the invention, the second magnetic layer portion is formed so that the second magnetic layer portion is partially overlapped with a part of the first magnetic layer portion, and an end on the side close to the recording medium facing surface, of the second magnetic layer portion is positioned apart from the position of the recording medium facing surface. Consequently, the second magnetic layer portion formed is positioned apart from the recording medium facing surface. Occurrence of a side erase due to the second magnetic layer portion can therefore be avoided.

According to the method of manufacturing a thin film magnetic head of still another aspect of the invention, the second magnetic layer portion is formed on the first planarized face. Thus, the second magnetic layer portion can be formed with high precision.

According to the method of manufacturing a thin film magnetic head of still another aspect of the invention, the third magnetic layer portion is formed on the first planarized face by reactive ion etching. Consequently, the third magnetic layer portion can be formed with high precision in a short time.

According to the method of manufacturing a thin film magnetic head of still another aspect of the invention, the third magnetic layer portion is overlapped with both a part of the first magnetic layer portion and a part of the second magnetic layer portion and an end on the side close to the recording medium facing surface, of the third magnetic layer portion is positioned apart from the position of the recording medium facing surface. The third magnetic layer portion which is to be formed is therefore positioned apart from the recording medium facing surface. Thus, occurrence of a side erase due to the third magnetic layer portion can be avoided.

According to the method of manufacturing a thin film magnetic head of still another aspect of the invention, the method includes the step of forming the third magnetic layer portion and forming the second connection pattern serving as a part of the thin film coil portion on the first connection pattern. Different from the case where no second connection pattern is formed on the first connection pattern, a step of forming an opening by removing a part of the insulating layer for electrically connecting the second conductive layer pattern and a conductive layer pattern becomes unnecessary. The number of manufacturing steps can therefore be reduced.

According to the method of manufacturing a thin film magnetic head of still another aspect of the invention, the second magnetic layer portion is formed in another part on the second planarized face. In this case as well, the second magnetic layer portion can be formed with high precision.

According to the method of manufacturing a thin film magnetic head of still another aspect of the invention, the third magnetic layer is formed by patterning using reactive ion etching. The third magnetic layer can therefore be formed with high precision in a short time. Thus, the manufacturing time of the entire thin film magnetic head can therefore be shortened.

According to the method of manufacturing a thin film magnetic head of still another aspect of the invention, as a magnetic material, a material containing iron nitride or a material (amorphous alloy) containing iron cobalt zirconium oxide alloy is used. As compared with the case of using Permalloy or the like as the material of the magnetic layer, re-adhesion at the time of etching the magnetic layer by RIE is reduced, so that high-precision patterning can be realized.

According to the method of manufacturing a thin film magnetic head of still another aspect of the invention, in the second etching step, an etching process is performed at a temperature in a range from 50 degrees to 300 degrees. Consequently, the time required for the etching process can be shortened.

Obviously many modifications and variations of the present invention are possible in the light of the above teachings. It is therefore to be understood that within the scope of the appended claims the invention may be practiced otherwise than as specifically described.

What is claimed is:

1. A method of manufacturing a thin film magnetic head including first and second magnetic layers magnetically coupled to each other and having first and second magnetic poles which face each other, with a gap layer in between, in a recording-medium-facing surface to be faced with a recording medium, a thin film coil provided between the two magnetic layers, and an insulating layer for insulating the thin film coil from the two magnetic layers, wherein at least one step of forming the first magnetic pole and a step of forming the second magnetic pole includes:

a step of forming a magnetic material layer;

a step of forming a mask precursor pattern on the magnetic material layer;

a first etching step of forming a first mask by narrowing a part of the mask precursor pattern by ion beam etching and, simultaneously, etching the magnetic material layer to a depth in an area other than an area where the first mask is formed; and a second etching step of forming at least one of the first and second magnetic poles by selectively etching the magnetic material layer by reactive ion etching with the first mask, where the first magnetic pole extends in a direction apart from the recording-medium-facing surface and defines a recording track width of the recording medium, and the first magnetic layer includes a first magnetic layer portion having the first magnetic pole and a second magnetic layer portion which covers an area of the thin film coil and is magnetically coupled to the first magnetic layer portion, the first mask is formed so that a plane shape thereof includes at least a portion corresponding to the first magnetic pole in the first magnetic layer portion.

2. A method of manufacturing a thin film magnetic head according to claim 1, further comprising a step of polishing the surface of the magnetic material layer so as to planarize the surface thereof between the step of forming the magnetic material layer and the step of forming the mask precursor pattern.

3. A method of manufacturing a thin film magnetic head according to claim 1, where the first magnetic layer portion further includes an expanded portion which is magnetically coupled to the first magnetic pole on the side far from the recording medium facing surface and is wider than the first magnetic pole, a step in the width direction is formed in a position where the first magnetic pole and the expanded portion are coupled to each other, and a corner is formed at a part where a side face of the first magnetic pole and a step face of the expanded portion in the step cross each other, the first mask is formed so that the plane shape thereof includes a part corresponding to a plane shape of the expanded portion, and an angle at a part corresponding to the corner of the first magnetic layer portion lies in a range from 90 degrees to 120 degrees.

4. A method of manufacturing a thin film magnetic head according to claim 1, wherein in the second etching step, at least the second magnetic pole in the second magnetic layer is formed.

5. A method of manufacturing a thin film magnetic head according to claim 1, wherein in the second etching step, an etching process is performed in a gas atmosphere containing at least one of chlorine, boron trichloride, and hydrogen chloride.

6. A method of manufacturing a thin film magnetic head according to claim 1, wherein in the second etching step, an etching process is performed at a temperature in a range from 50 degrees to 300 degrees.

7. A method of manufacturing a thin film magnetic head according to claim 1, wherein a predetermined inorganic material is used as a material of the first mask.

8. A method of manufacturing a thin film magnetic head according to claim 7, wherein a material containing aluminum oxide or aluminum nitride is used as the inorganic material.

9. A method of manufacturing a thin film magnetic head according to claim 8, wherein an irradiation angle of an ion beam is changed at least once during the first etching step.

10. A method of manufacturing a thin film magnetic head according to claim 9, wherein during the first etching step, an angle in the width direction between a direction orthogonal to an extending direction of the magnetic material layer and an irradiation direction of the ion beam is changed from a first angle to a second angle which is larger than the first angle.

11. A method of manufacturing a thin film magnetic head according to claim 10, wherein in the first etching step, the first angle is set to an angle plus or minus 15 degrees of 45 degrees, and the second angle is set to an angle plus or minus 15 degrees of 75 degrees.

12. A method of manufacturing a thin film magnetic head according to claim 1, wherein in the second etching step, at least the first magnetic pole in the first magnetic layer is formed.

13. A method of manufacturing a thin film magnetic head according to claim 12, wherein an area in the gap layer other than an area where the first magnetic pole is formed, is selectively removed by reactive ion etching.

14. A method of manufacturing a thin film magnetic head according to claim 12, wherein formation of the first magnetic pole in the first magnetic layer, selective removal of the area in the gap layer other than the area where the first magnetic pole is formed, and formation of the second magnetic pole in the second magnetic layer are continuously performed in a series of steps.

15. A method of manufacturing a thin film magnetic head according to claim 14, wherein the first magnetic pole in the first magnetic layer is formed with a first mask made of a predetermined inorganic material as a mask, and the selective removal of the gap layer and formation of the second magnetic pole in the second magnetic layer are performed with at least one of the first mask and the first magnetic pole as a mask.

16. A method of manufacturing a thin film magnetic head according to claim 1, wherein the magnetic material layer is deposited by sputtering with a predetermined magnetic material.

17. A method of manufacturing a thin film magnetic head according to claim 16, wherein a material containing iron nitride is used as the predetermined magnetic material.

18. A method of manufacturing a thin film magnetic head according to claim 16, wherein an amorphous alloy is used as the predetermined magnetic material.

19. A method of manufacturing a thin film magnetic head according to claim 18, wherein a material containing iron cobalt zirconium oxide alloy is used as the amorphous alloy.

20. A method of manufacturing a thin film magnetic head according to claim 1, wherein in the step of forming the first magnetic layer, the second magnetic layer portion is formed separately from the first magnetic layer portion by reactive ion etching.

21. A method of manufacturing a thin film magnetic head according to claim 20, wherein the second magnetic layer portion is formed so that the second magnetic layer portion is partially overlapped with a part of the first magnetic layer portion, and an end on the recording-medium-facing surface side of the second magnetic layer portion is positioned apart from the recording-medium-facing surface.

22. A method of manufacturing a thin film magnetic head according to claim 20, where the thin film coil has a first thin film coil layer pattern and the insulating layer has a first insulating layer portion which buries at least the first thin film coil layer pattern, the method comprises:

a step of forming the first insulating layer portion so as to cover at least the first magnetic layer portion and the first thin film coil layer pattern; and a step of forming a first planarized face by polishing a surface of the first insulating layer portion until at least the first magnetic layer portion is exposed.

23. A method of manufacturing a thin film magnetic head according to claim 22, wherein the second magnetic layer portion is formed on the first planarized face.

24. A method of manufacturing a thin film magnetic head according to claim 22, where the first magnetic layer includes a third magnetic layer portion between the first and second magnetic layer portions, the third magnetic portion magnetically coupling the first magnetic layer portion and the second magnetic layer portion the third magnetic layer portion is patterned on the first planarized face by reactive ion etching.

25. A method of manufacturing a thin film magnetic head according to claim 24, wherein the third magnetic layer portion is formed so that the third magnetic layer portion is overlapped with both a part of the first magnetic layer portion and a part of the second magnetic layer portion and an end on the recording-medium-facing surface side of the third magnetic layer portion is positioned apart from the recording-medium-facing surface.

26. A method of manufacturing a thin film magnetic head according to claim 24, where the thin film coil further has a second thin film coil layer pattern disposed in a layer different from the first thin film coil layer pattern, and the insulating layer further has a second insulating layer portion for burying at least the second thin film coil layer pattern, the method comprises:

a step of forming the second thin film coil layer pattern on the first planarized face and forming a first connection pattern serving as a part of the thin film coil integrally with the second thin film coil layer pattern at an end;

a step of forming the third magnetic layer portion and forming a second connection pattern on the first connection pattern, the second connection pattern serving as a part of the thin film coil;

a step of forming the second insulating layer portion so as to cover at least the third magnetic layer portion, the second thin film coil layer pattern, and the second connection pattern;

a step of forming a second planarized face by polishing a surface of the second insulating layer portion until at least both of the third insulating layer portion and the second connection pattern are exposed; and a step of forming a conductive layer pattern so as to be electrically connected to an exposed face of the second connection pattern on the second planarized face.

27. A method of manufacturing a thin film magnetic head according to claim 26, wherein the second magnetic layer portion is further formed on the second planarized face.

28. A method of manufacturing a thin film magnetic head according to claim 1, wherein a step of forming the mask precursor pattern includes:

a step of forming a mask precursor layer on the magnetic layer; and a third etching step of forming the mask precursor pattern by selectively etching the mask precursor layer by reactive ion etching.

29. A method of manufacturing a thin film magnetic head according to claim 28, wherein in the third etching step, an etching process is performed in a gas atmosphere containing at least one of chlorine, boron trichloride, hydrogen chloride, carbon tetrafluoride, sulfur hexafluoride, and boron tribromide.

30. A method of manufacturing a thin film magnetic head according to claim 28, wherein in the third etching step, an etching process is performed at a temperature in a range from 50 degrees to 300 degrees.

31. A method of manufacturing a thin film magnetic head according to claim 28, wherein the mask precursor layer is deposited by chemical vapor deposition.

32. A method of manufacturing a thin film magnetic head according to claim 31, wherein the mask precursor layer is deposited under a pressure of 100 Pa or lower.

33. A method of manufacturing a thin film magnetic head according to claim 28, wherein in the third etching step, a second mask having a shape corresponding to a plane shape of the mask precursor pattern is used.

34. A method of manufacturing a thin film magnetic head according to claim 32, wherein a photoresist film pattern having a predetermined plane shape is formed on the mask precursor layer and is used as the second mask.

35. A method of manufacturing a thin film magnetic head according to claim 33, wherein a metal film pattern having a predetermined plane shape is formed on the mask precursor layer and is used as the second mask.

36. A method of manufacturing a thin film magnetic head according to claim 35, wherein the metal film pattern is formed by selectively growing a plating film on the mask precursor layer.

37. A method of manufacturing a thin film magnetic head according to claim 35, wherein a metal layer is formed on the mask precursor layer and is selectively etched to thereby form the metal layer pattern.

38. A method of manufacturing a thin film magnetic head according to claim 35, wherein either nickel iron or nickel copper is used as a material of the metal film pattern.

39. A method of manufacturing a thin film magnetic head according to claim 35, wherein either iron nitride or cobalt iron is used as a material of the metal film pattern.

40. A method of manufacturing a thin film magnetic head according to claim 35, wherein nickel boron is used as a material of the metal film pattern.

41. A method of manufacturing a thin film magnetic head according to claim 35, wherein nickel phosphor is used as a material of the metal film pattern.

42. A method of manufacturing a thin film magnetic head according to claim 33, wherein in the third etching step, the second mask is etched to be removed.

43. A method of manufacturing a thin film magnetic head including first and second magnetic layers magnetically coupled to each other and having first and second magnetic poles which face each other, with a gap layer in between, in a recording-medium-facing surface to be faced with a recording medium, a thin film coil provided between the two magnetic layers, and an insulating layer for insulating the thin film coil from the two magnetic layers, wherein at least one of a step of forming the first magnetic pole and a step of forming the second magnetic pole includes:
a step of forming a magnetic material layer;
a step of forming a mask precursor pattern on the magnetic material layer;
a first etching step of forming a first mask by narrowing a part of the mask precursor pattern by ion beam etching; and
a second etching step of forming at least one of the first and second magnetic poles by selectively etching the magnetic layer by reactive ion etching with the first mask,
where the first magnetic pole extends in a direction apart from the recording-medium-facing surface and defines a recording track width of the recording medium, and the first magnetic layer includes a first magnetic layer portion having the first magnetic pole and a second magnetic layer portion which covers an area of the thin film coil and is magnetically coupled to the first magnetic layer portion,
the first mask is formed so that a plane shape thereof includes at least a portion corresponding to the first magnetic pole in the first magnetic layer portion.

44. A method of manufacturing a thin film magnetic head according to claim 43, wherein in the first etching step, an ion beam is irradiated from a direction at an angle plus or minus 15 degrees of 75 degrees in the width direction, the angle being defined as an angle between the direction of the ion beam and a direction orthogonal to an extending direction of the magnetic material layer.

45. A method of manufacturing a thin film magnetic head including first and second magnetic layers magnetically coupled to each other and having first and second magnetic poles which face each other, with a gap layer in between, in a recording-medium-facing surface to be faced with a recording medium, the first and second magnetic poles defining a recording track width of the recording medium, a thin film coil provided between the two magnetic layers, and an insulating layer for insulating the thin film coil from the two magnetic layers, wherein at least one of a step of forming the first magnetic pole and a step of forming the second magnetic pole includes:
a step of forming a magnetic material layer;
a step of forming a mask precursor pattern on the magnetic material layer;
a first etching step of etching the magnetic material layer to a depth in an area other than an area where the mask precursor pattern is formed, the first etching step being performed with the mask precursor pattern as a mask by ion beam etching; and a second etching step of forming at least one of the first and second magnetic poles by selectively etching the magnetic material layer by reactive ion etching with the mask precursor pattern as a mask,
where the first magnetic pole extends in a direction apart from the recording-medium-facing surface and defines a recording track width of the recording medium, and the first magnetic layer includes a first magnetic layer portion having the first magnetic pole and a second magnetic layer portion which covers an area of the thin film coil and is magnetically coupled to the first magnetic layer portion,
the first mask is formed so that a plane shape thereof includes at least a portion corresponding to the first magnetic pole in the first magnetic layer portion.

46. A method of manufacturing a thin film magnetic head according to claim 45, wherein in the first etching step, an ion beam is irradiated from a direction at an angle plus or minus 15 degrees of 45 degrees in the width direction, the angle being defined as an angle between the direction of the ion beam and a direction orthogonal to an extending direction of the magnetic layer.

* * * * *